Feb. 2, 1971       JAMES E. WEBB       3,560,161
ADMINISTRATOR OF THE NATIONAL AERONAUTICS
AND SPACE ADMINISTRATION
AUTOMATED FLUID CHEMICAL ANALYZER
Filed March 14, 1968                                21 Sheets-Sheet 1
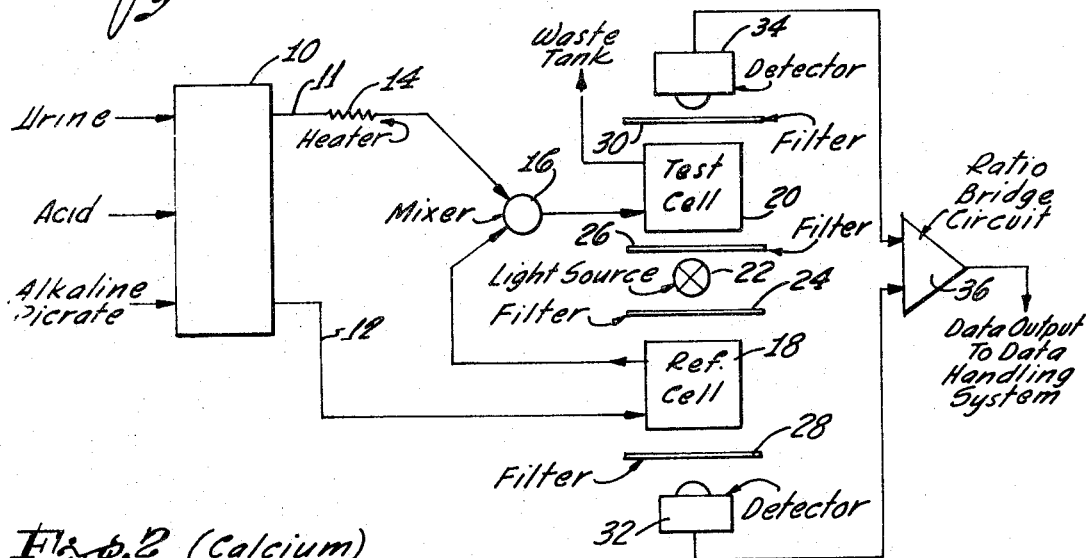
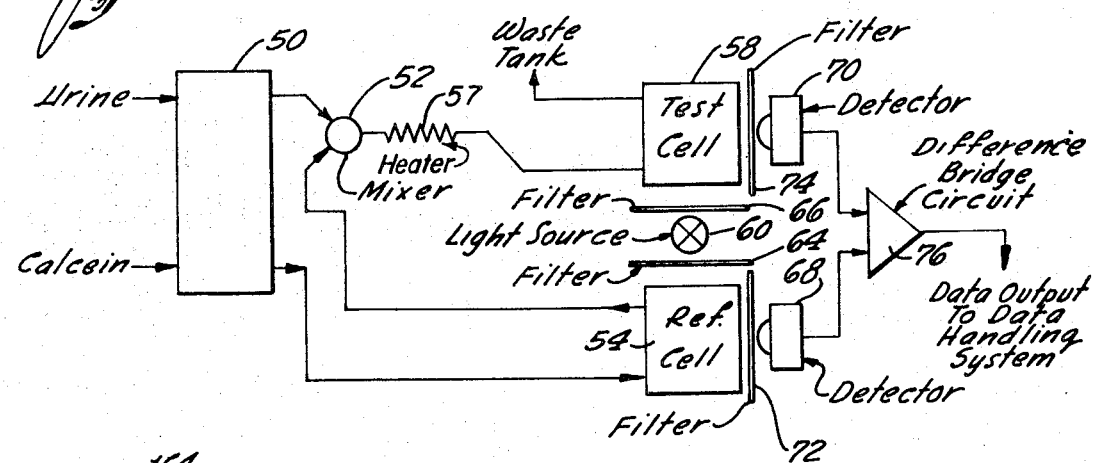
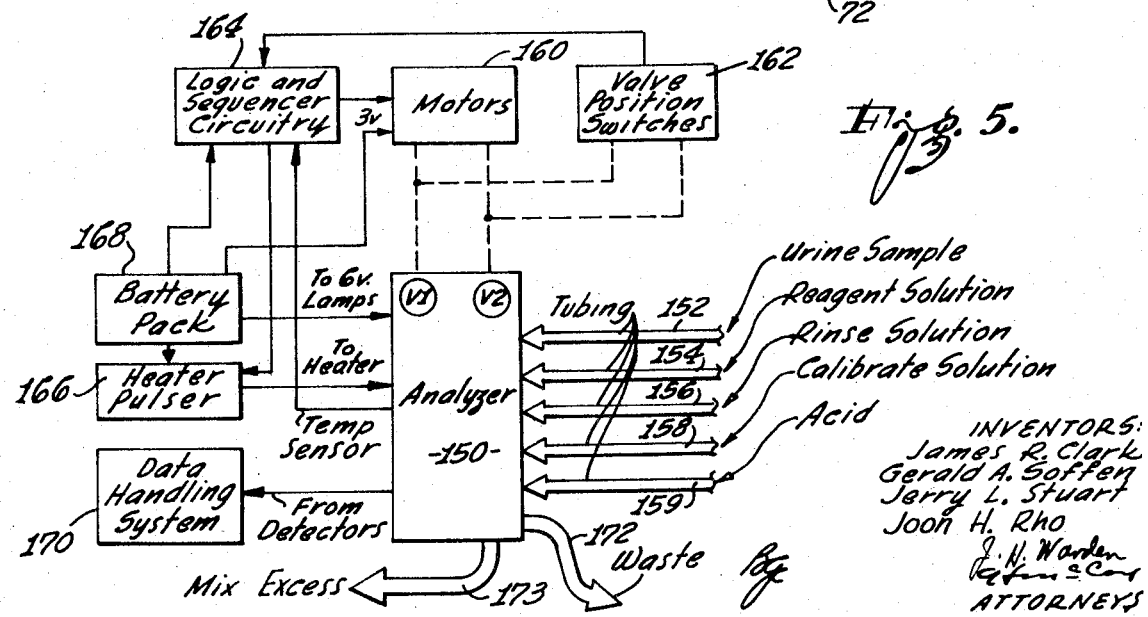
INVENTORS:
James R. Clark
Gerald A. Soffen
Jerry L. Stuart
Joon H. Rho
ATTORNEYS

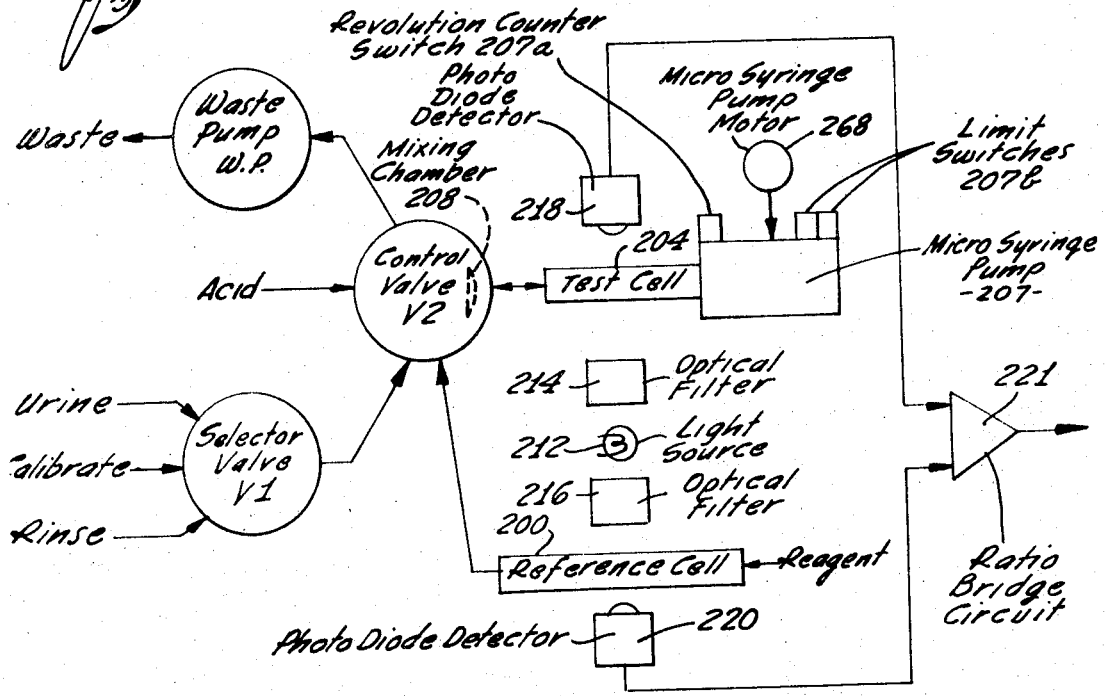
Fig. 3. (Functional Schematic of Present Embodiment (Creatinine/Creatine))
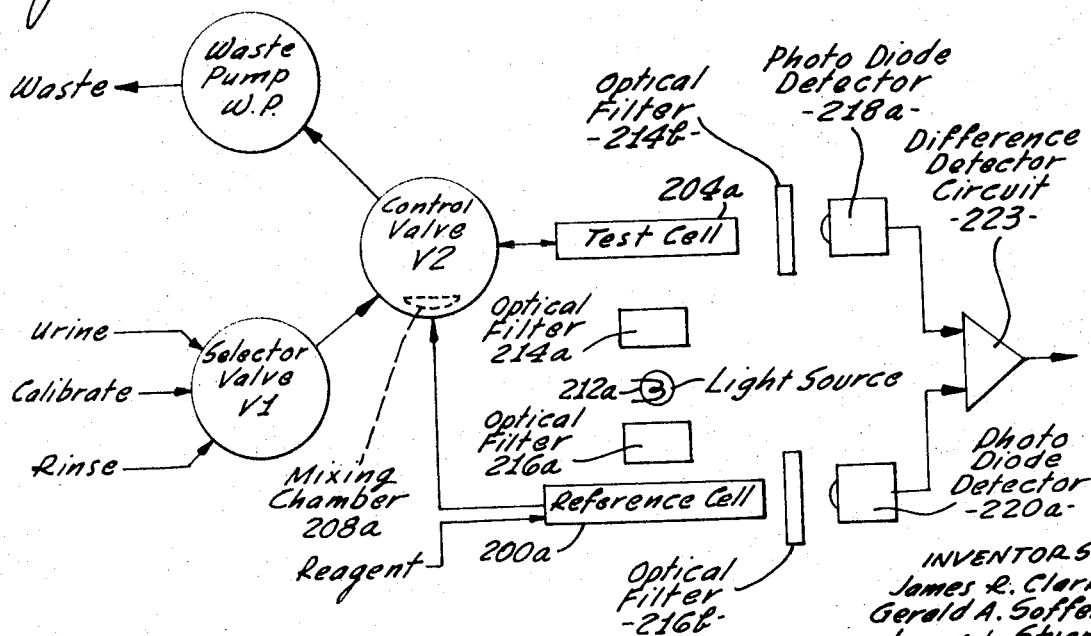
Fig. 4. (Functional Schematic of Present Embodiment (Calcium))
INVENTORS:
James R. Clark
Gerald A. Soffen
Jerry L. Stuart
Joon H. Rho
ATTORNEYS

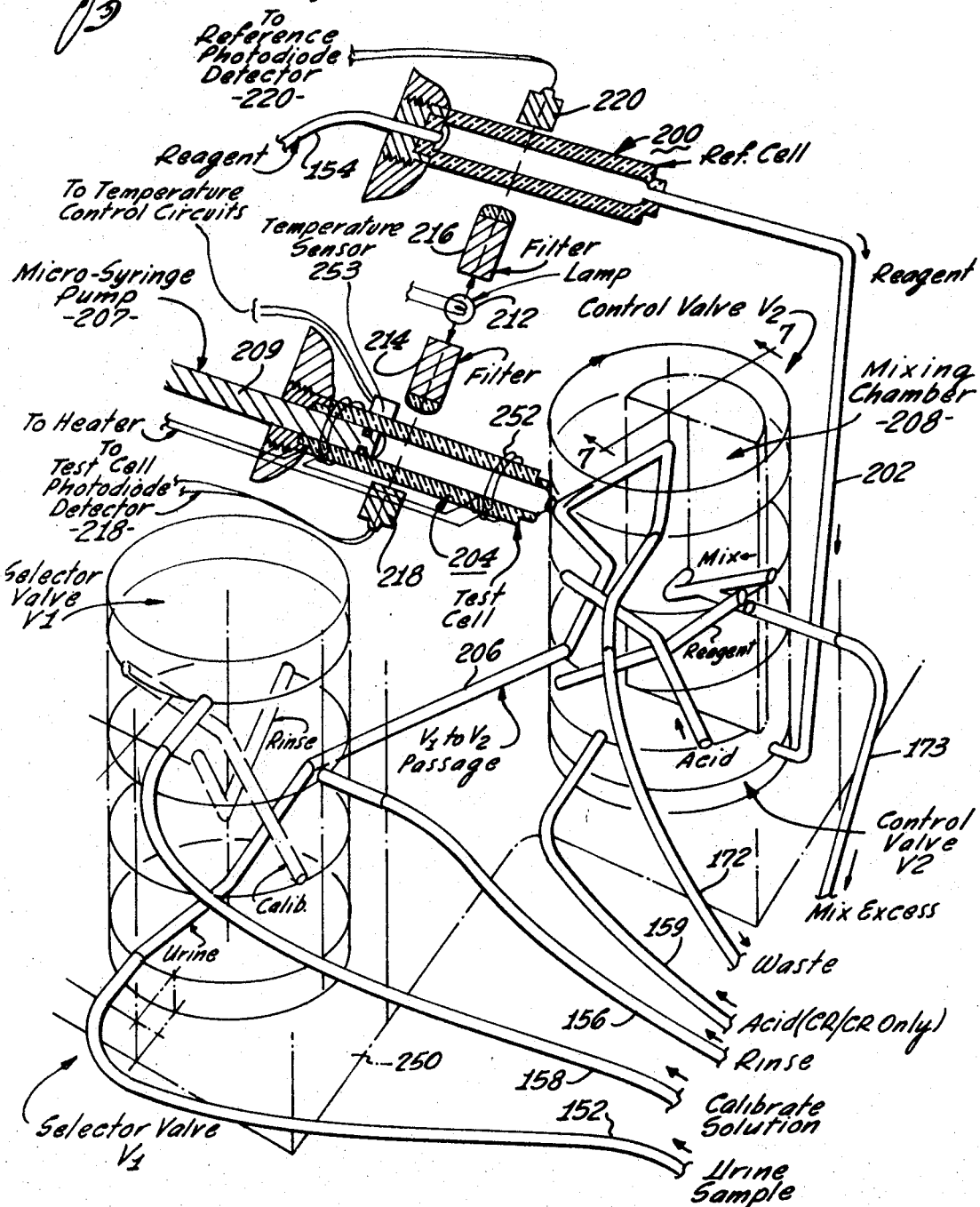

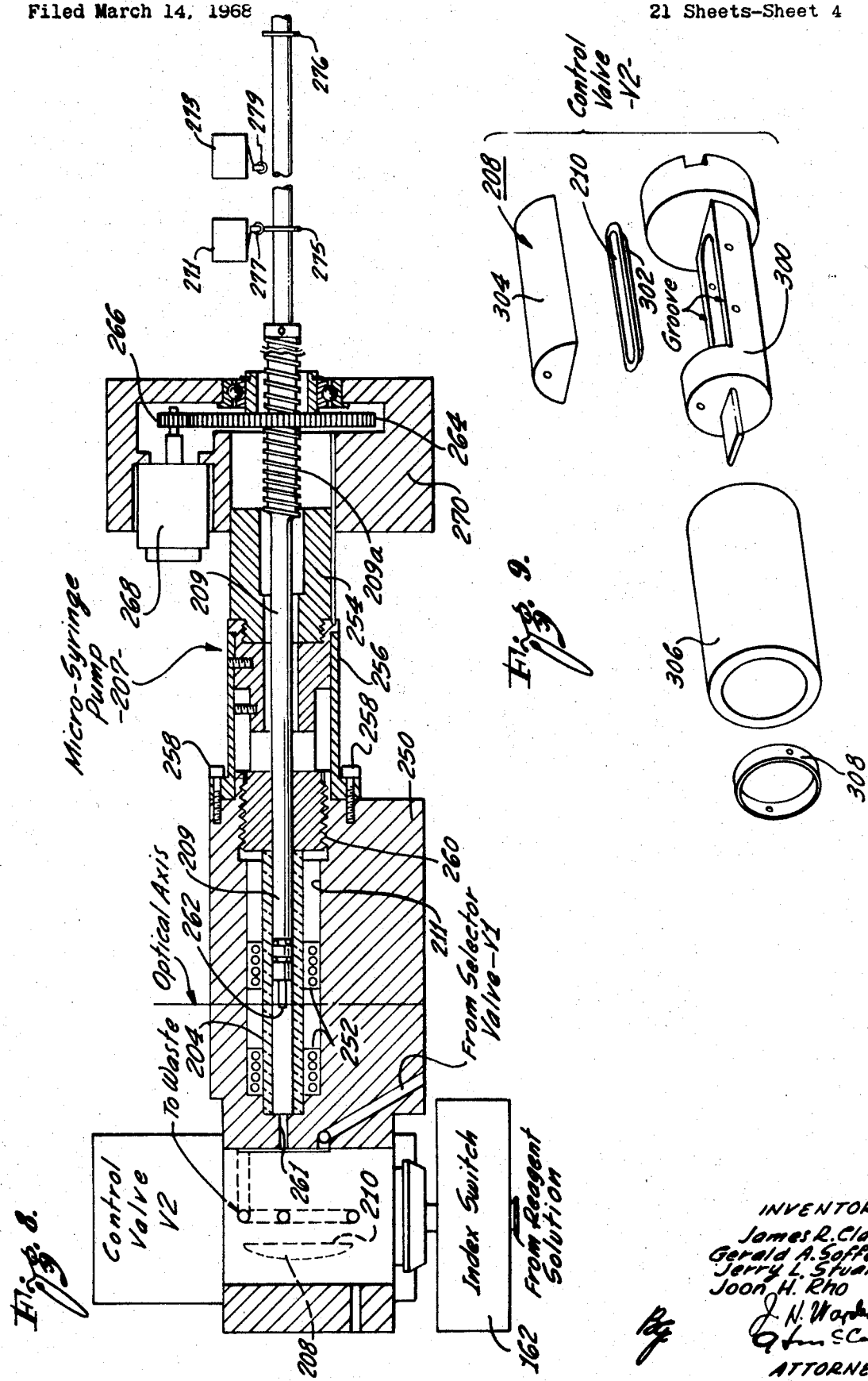

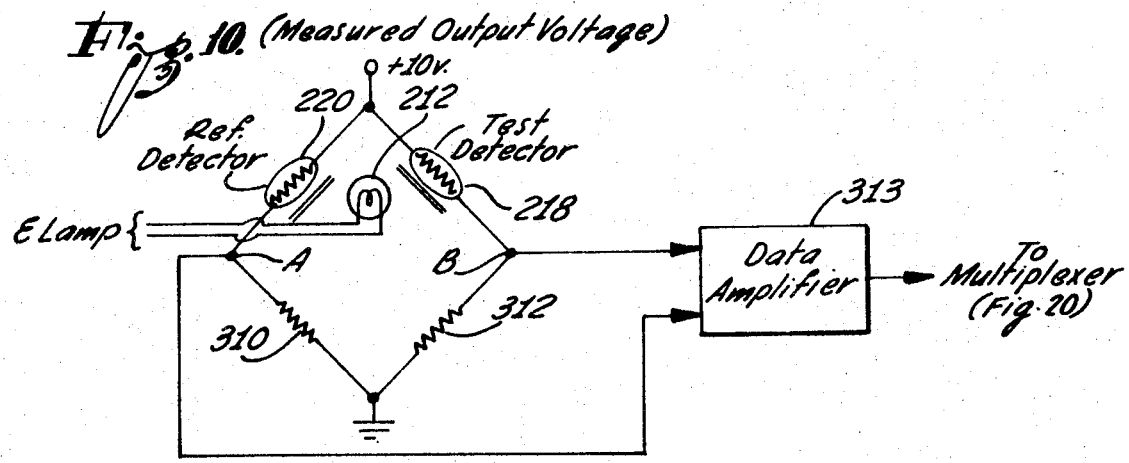
Fig. 10. (Measured Output Voltage)
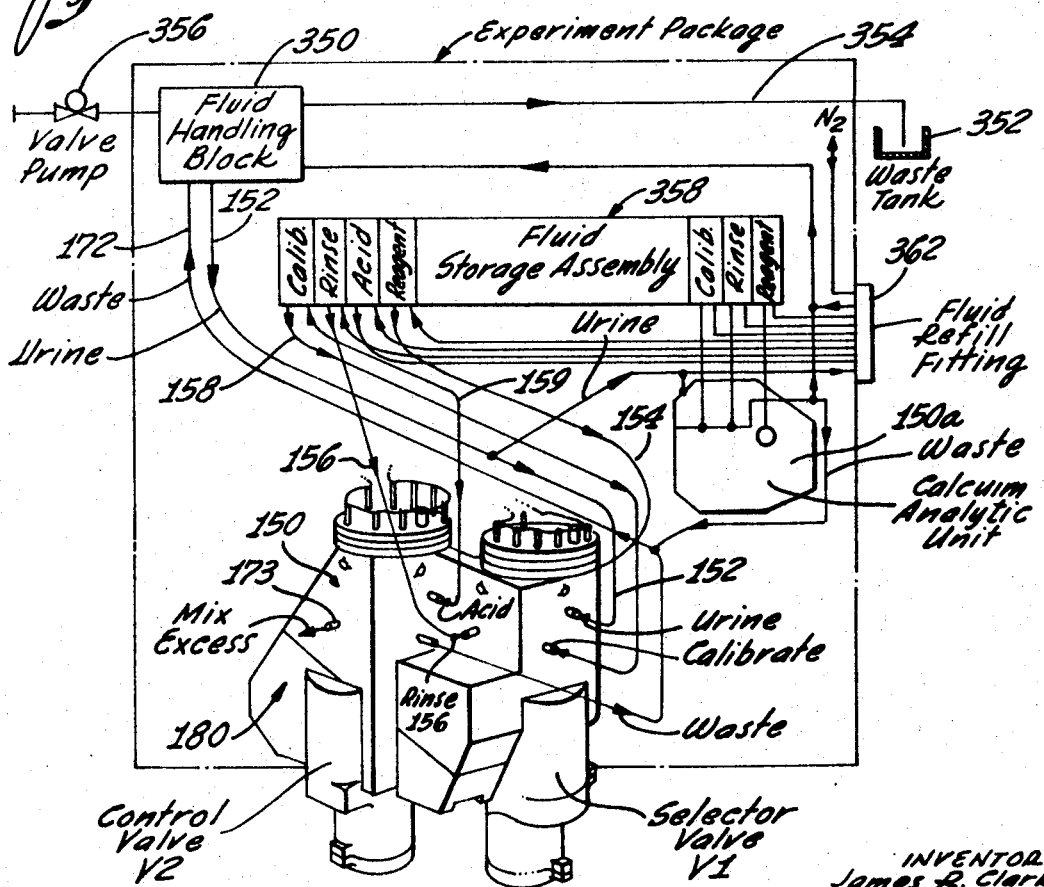
Fig. 11.

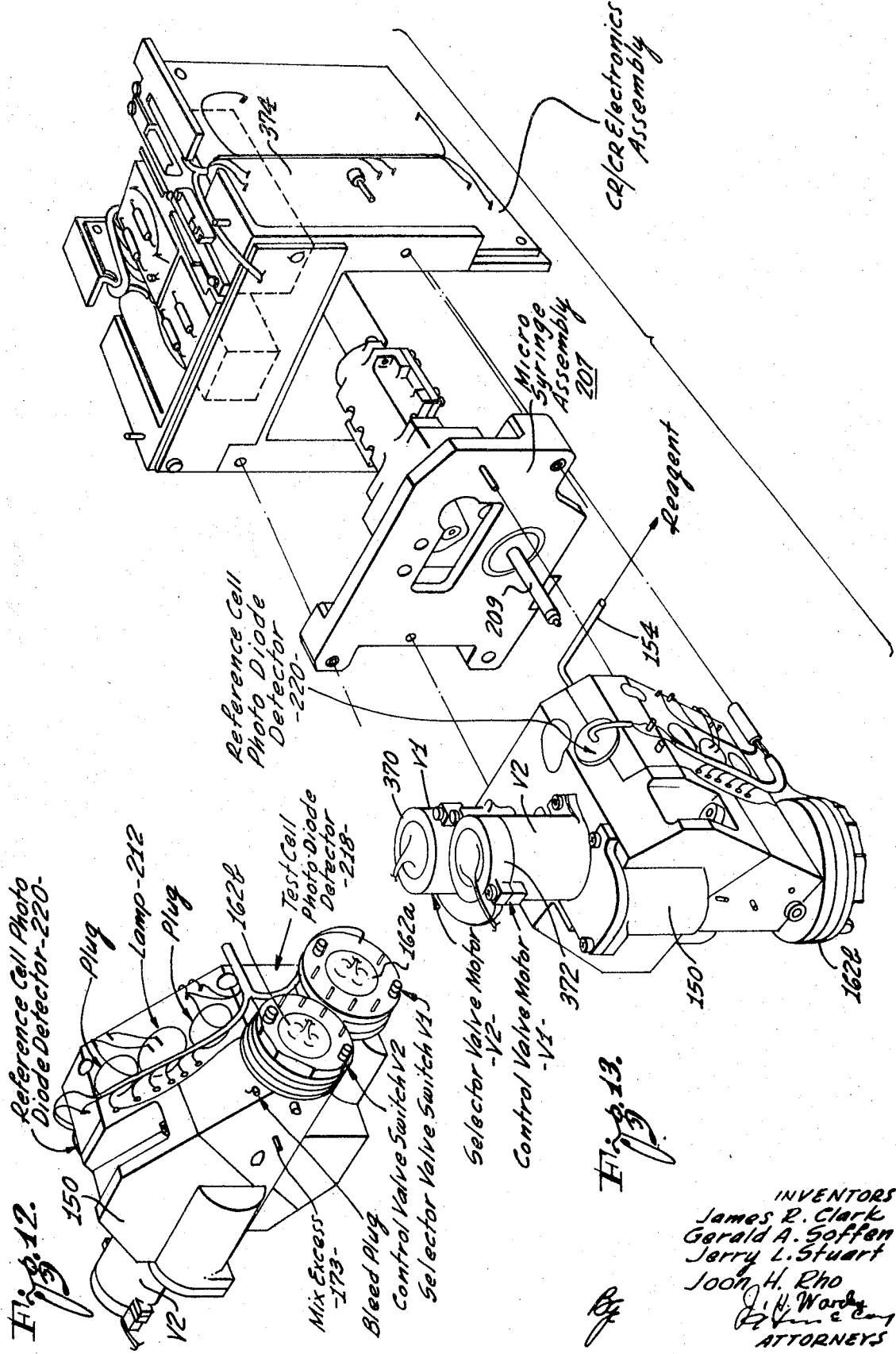

Feb. 2, 1971  JAMES E. WEBB  3,560,161
ADMINISTRATOR OF THE NATIONAL AERONAUTICS
AND SPACE ADMINISTRATION
AUTOMATED FLUID CHEMICAL ANALYZER
Filed March 14, 1968  21 Sheets-Sheet 7
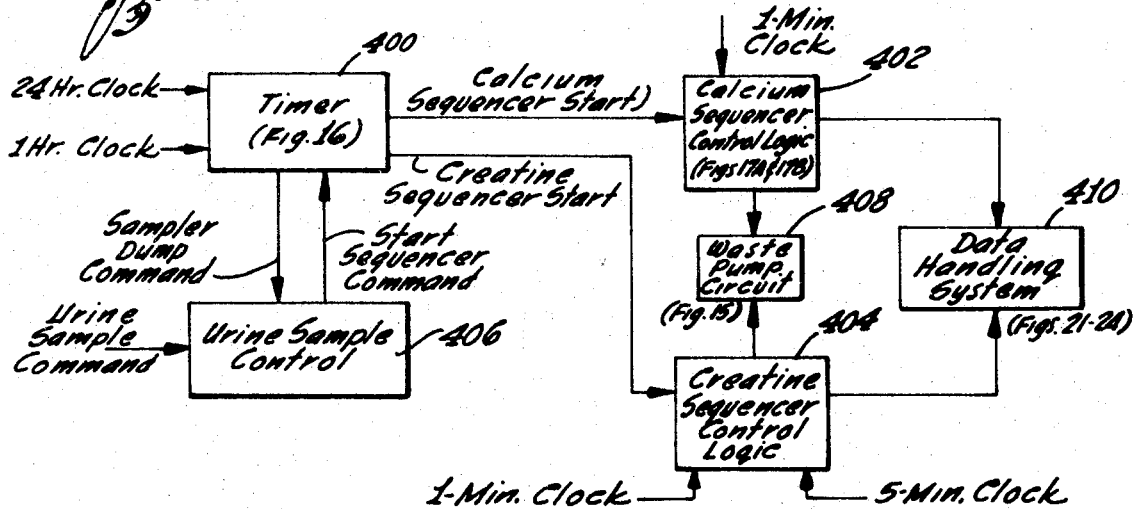
Fig. 14.
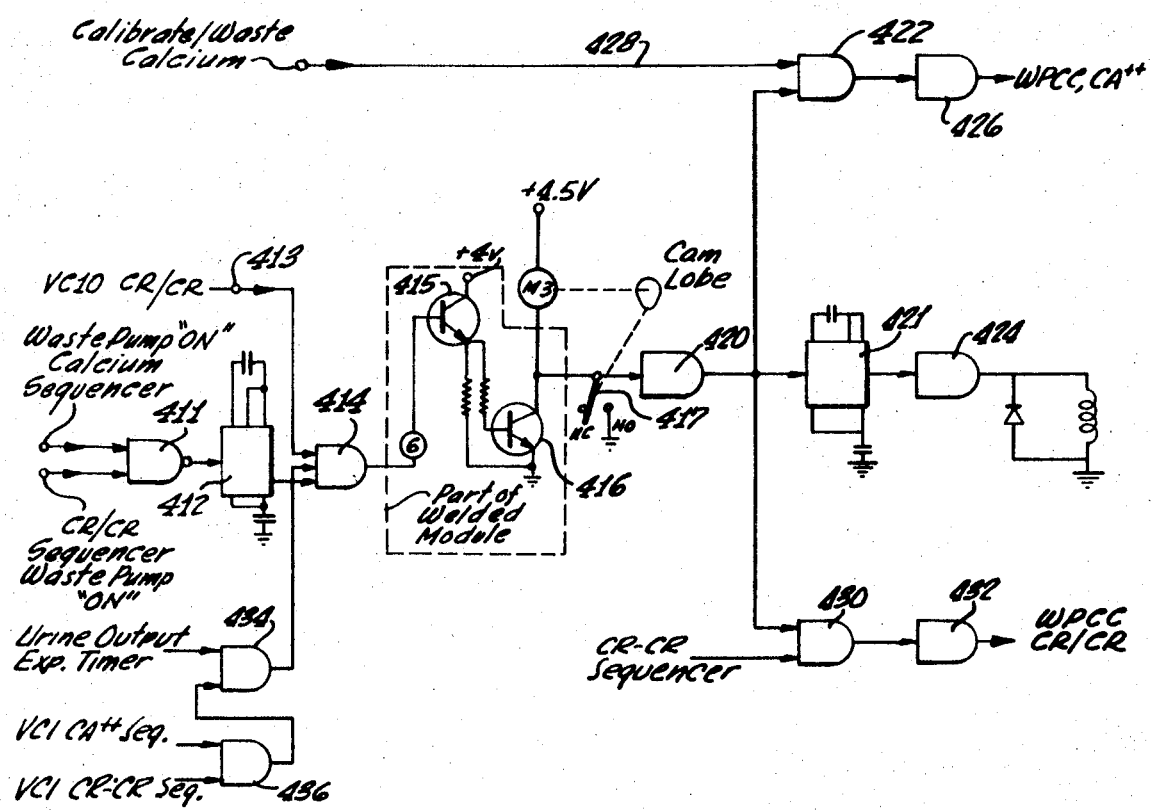
Fig. 15. (Waste Pump Circuit-408)
INVENTORS
James R. Clark
Gerald A. Soffen
Jerry L. Stuart
Joon H. Rho
ATTORNEYS

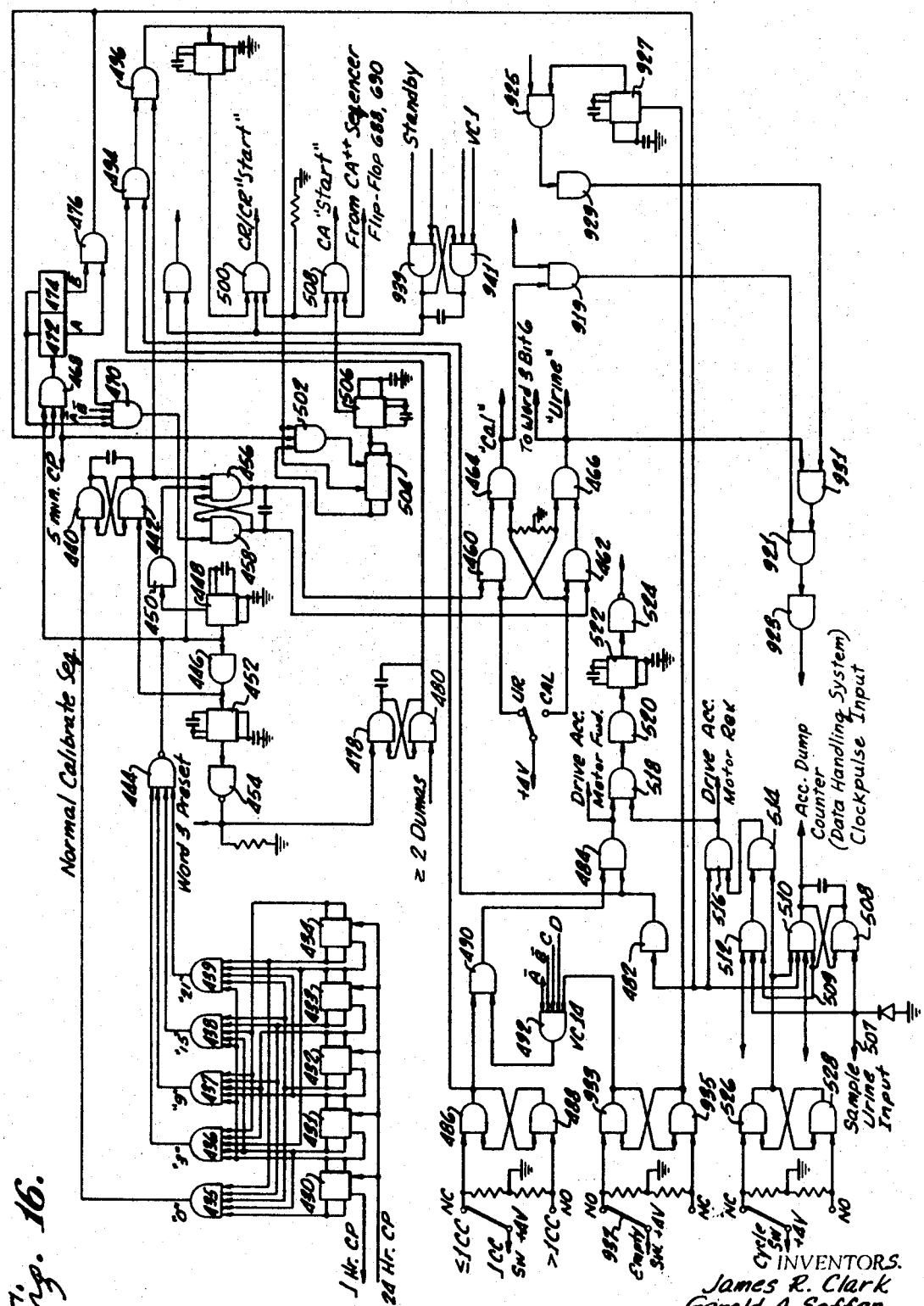

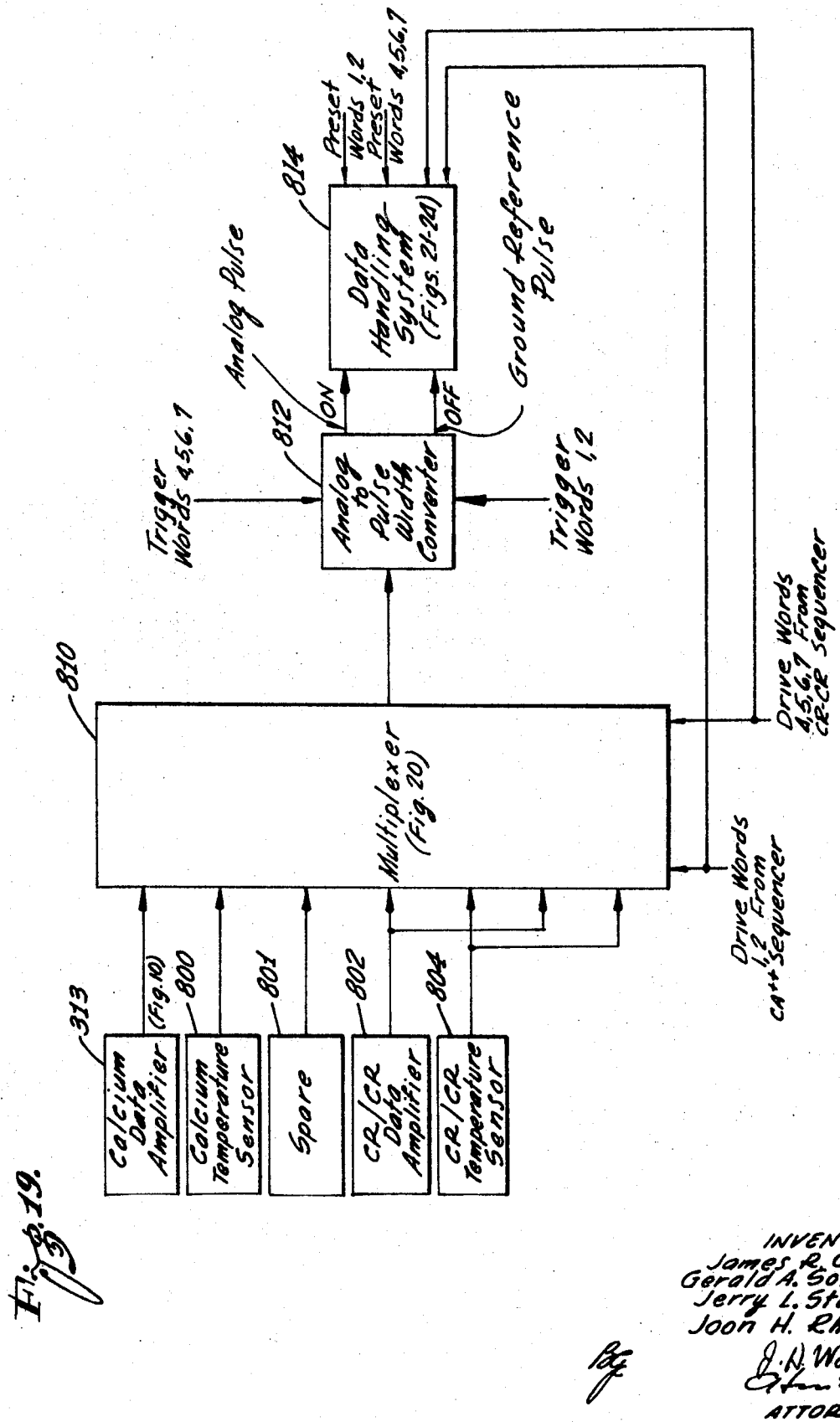

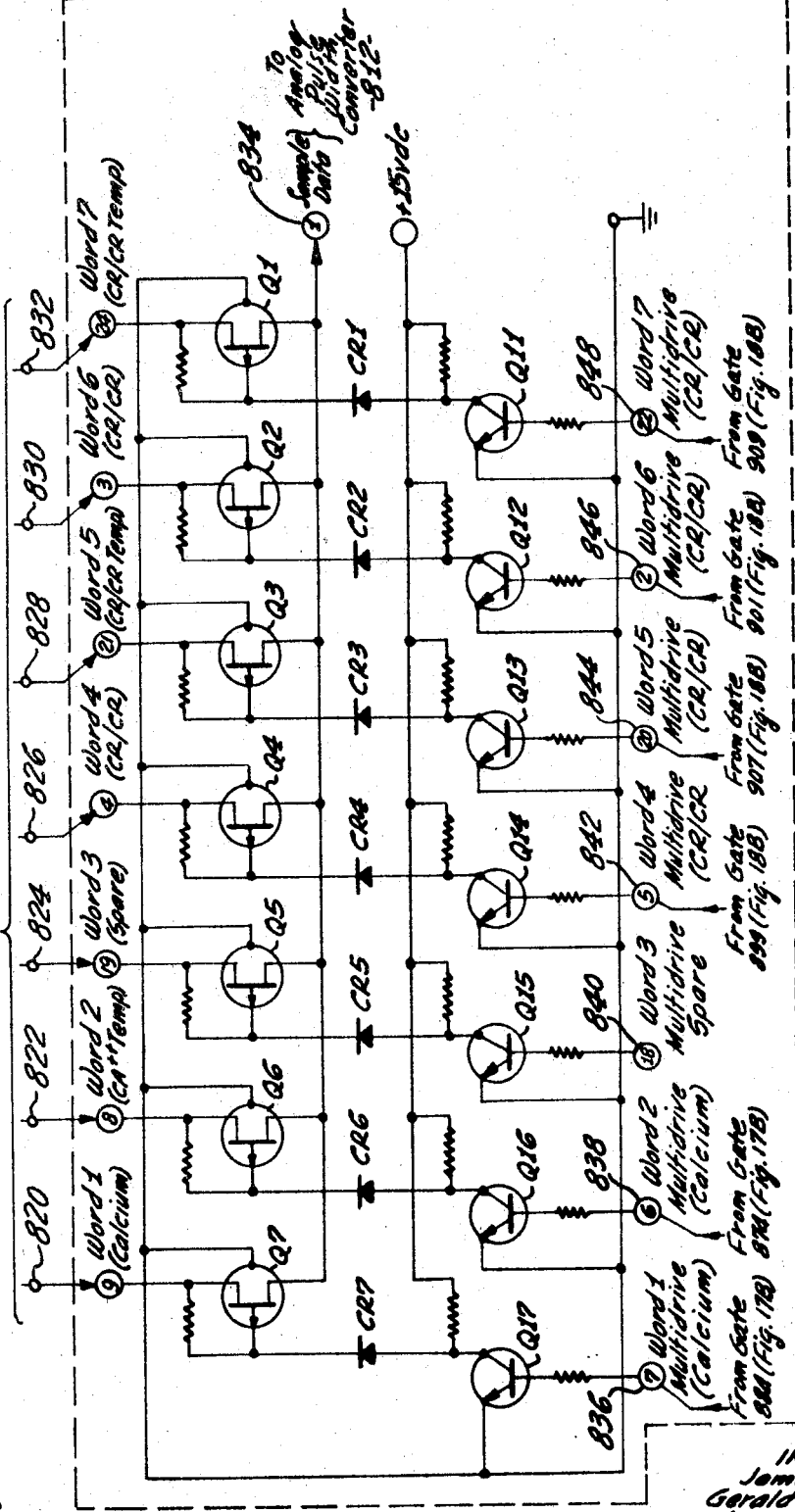

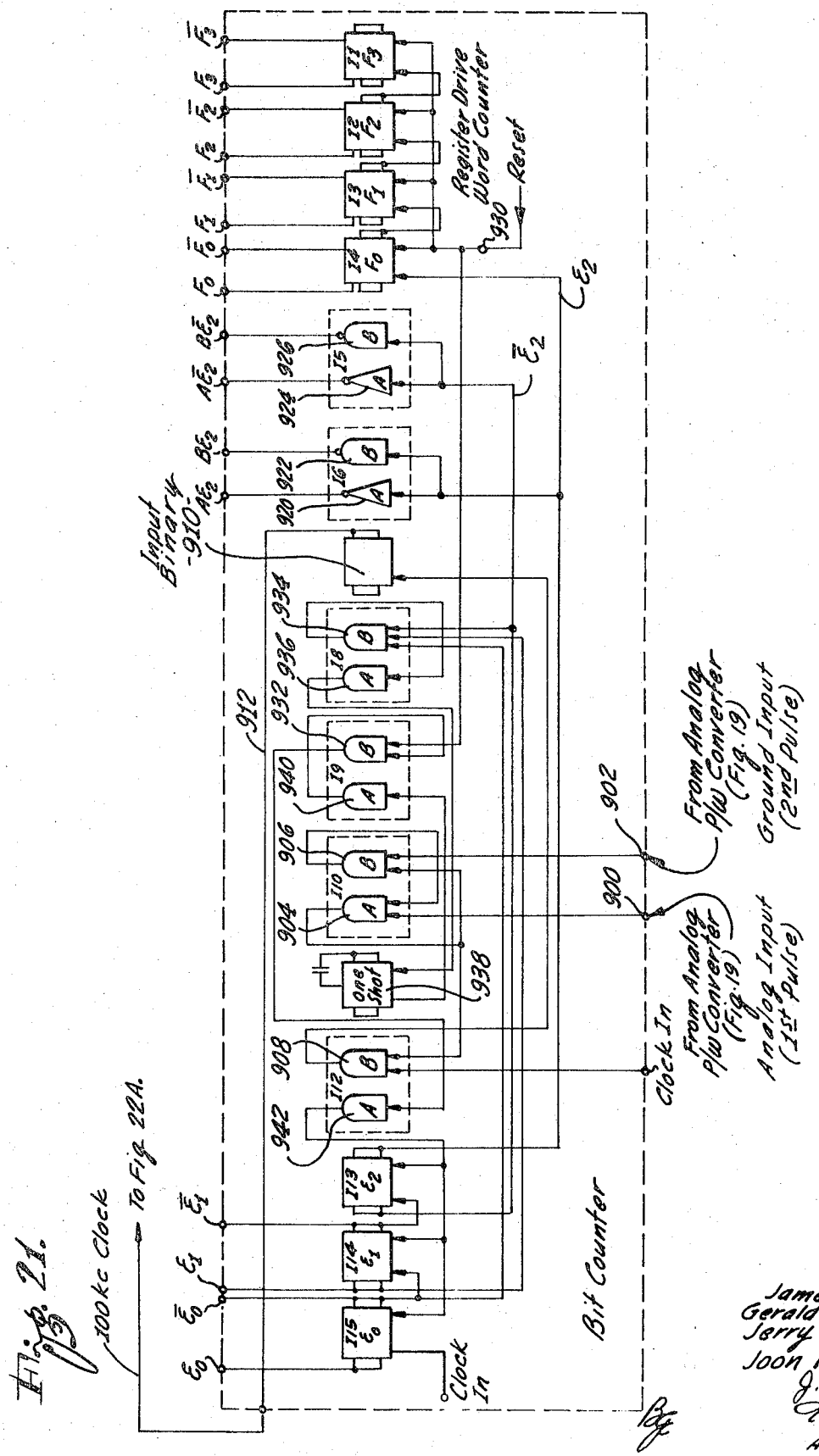

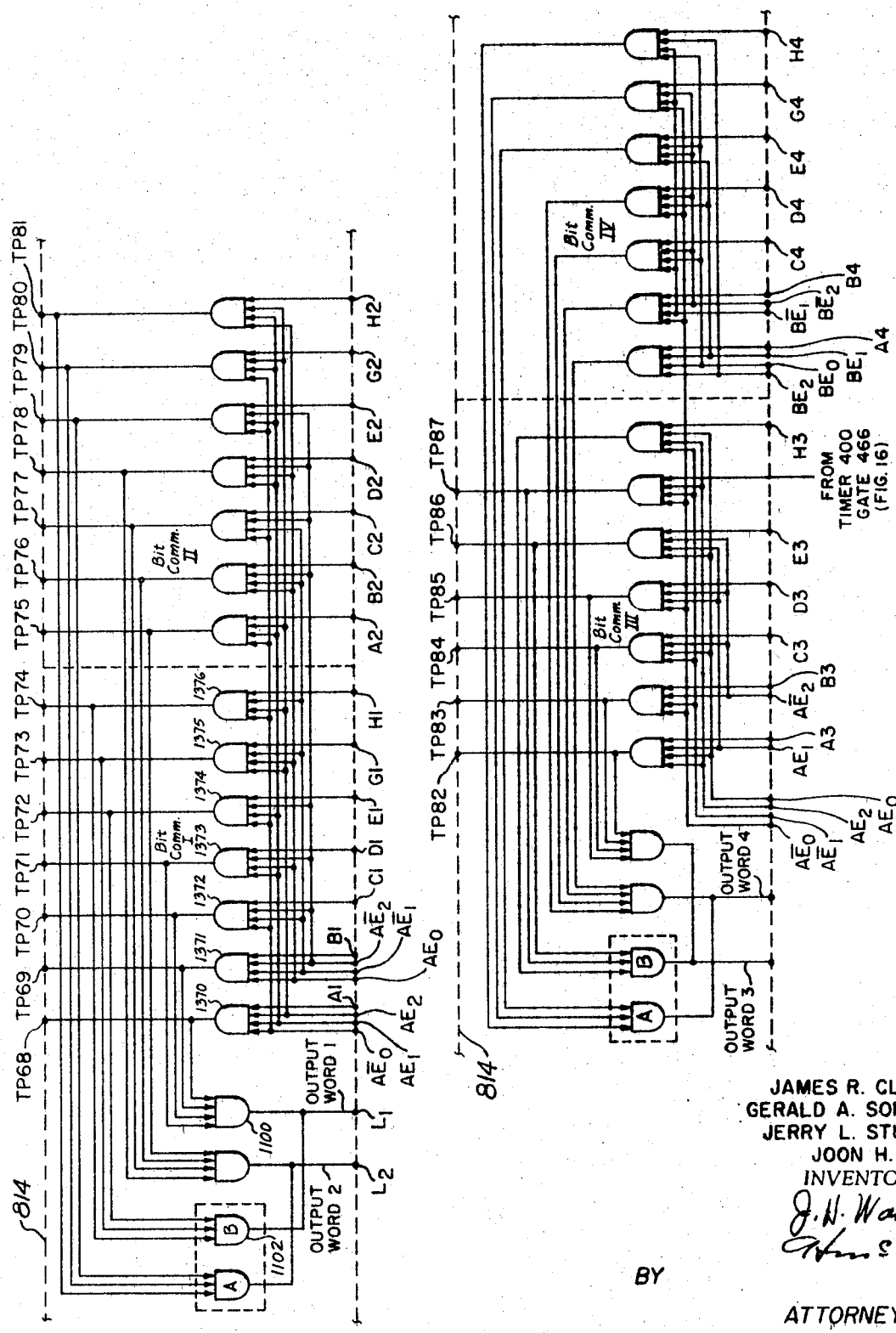

JAMES R. CLARK
GERALD A. SOFFEN
JERRY L. STUART
JOON H. RHO
INVENTORS.

ATTORNEYS.

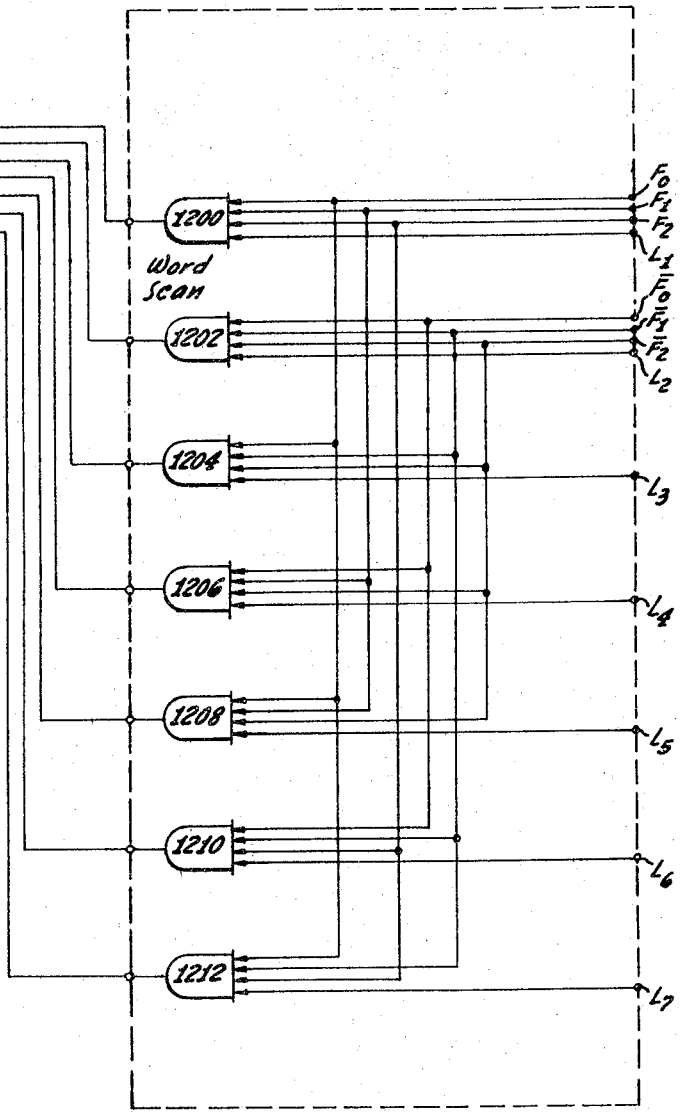

United States Patent Office 3,560,161
Patented Feb. 2, 1971

1

3,560,161
AUTOMATED FLUID CHEMICAL ANALYZER
James E. Webb, Administrator of the National Aeronautics and Space Administration, with respect to an invention of James R. Clark, Glendale, Gerald A. Soffen, Los Angeles, Jerry L. Stuart, La Canada, and Joon H. Rho, Altadena, Calif.
Filed Mar. 14, 1968, Ser. No. 713,162
Int. Cl. G01n 31/00, 33/16
U.S. Cl. 23—253       50 Claims

ABSTRACT OF THE DISCLOSURE

A fully automated fluid chemical analyzer including at least one analyzer unit having the analytical equipment for performing an analysis of a fluid-reagant mixture and generating an electrical signal proportional to the quantity of a selected constituent in the fluid. The apparatus is operated and controlled by an electronic logic and sequencer circuit which drives valve motors to connect a selector and a control valve in each analyzer unit to a fluid to be analyzed, reagent solutions, calibrate solutions, and rinse solutions. The solutions needed for the analysis of a fluid are self-contained within the apparatus. Also self-contained within the apparatus are all the drive motors and timing mechanisms necessary for automated operation of the analyzer apparatus. A data handling system is also included within the apparatus for receiving and processing the electrical signals produced by the analyzer units. Each analyzer unit in addition to the selector and control valves includes a test cell for receiving a mixture of the fluid to be analyzed and the chemical reagents and any chemical modifying solutions needed for the analysis. The various fluids are drawn into the test cell and expelled therefrom by a microsyringe pump included in each analyzer. Each analyzer unit contains an appropriate analytical device such as a colorimeter or fluorometer for performing the actual analysis and generating the electrical signal which is transmitted to the data handling system. A heater and temperature sensor may be associated with the test cell to control its temperature during the analysis. For the analysis of a fluid for the quantitative determination of creatine and creatinine, a single chemical reagent consisting essentially of picric acid, a metal hydroxide, and a metal salt stabilizer is used. The analysis is performed after the pH of the fluid being analyzed has been adjusted by the apparatus to from 0.1 to 1.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to a fully automated microchemical analyzer apparatus. More particularly this invention relates to an analyzer apparatus which is automated to provide a complete, accurate, and fully automatic microchemical analysis of extremely small quantities of liquids by the use of selected chemical reagents and analyzer units, such as fluorometers or colorimeters, and the accompanying electronic and mechanical components and chemical reagents and processes necessary for accomplishing such analysis.

A completely automated microchemistry analytical apparatus which is portable, accurate, and fully reliable has many potential commercial, scientific and medical uses. For example, there is need for a small, portable, self-contained system to serve as an on-the-spot diagnostic facility for field analysis of urine, blood or other body fluids for military hospitals and emergency rescue facilities. Additionally, many commercial medical clinics and diagnostic facilities presently require skilled personnel to perform chemical analysis of samples of body fluids taken from various patients. Often these analyses take a considerable amount of the skilled personnel's time and energy which might be better used in other areas. In scientific applications, such as aerospace experiments, an automated apparatus is needed for handling liquid chemicals and monitoring selected chemical constituents in the body fluids of test animals while in space.

Such apparatus should provide a self-contained source of liquid chemical reagents, a source of cleansing solutions for maintaining the analyzers in a contaminant free condition, and calibrate solutions for periodically determining the reliability of the apparatus and the chemical constituents. It should include mechanical and electrical components for directing, controlling and performing the analytical functions as well as performing automatic calibrations and continually monitoring the strength of the reagents and the reliability of the system. Moreover, it should be capable of performing several analyses over a long period of time without the need for operating personnel. Thus, the electronic circuitry and mechanical arrangements for the fluid sampling block should be capable of automatically receiving the fluids to be analyzed and periodically transferring them into the analyzers.

Particularly in space applications, the entire system must be capable of being made into a compact, lightweight unit including the analyzer units, the fluid storage compartments, the fluid handling mechanisms, and the electronic circuitry for directing and controlling the analysis. To conserve weight and space, the mechanical pump and valving arrangement should utilize a minimum number of valves for connecting the various analyzers with liquid reagents and fluids to be analyzed.

An exemplary use for such an apparatus is the analysis of primate urine for the selected constituents urea, calcium, creatine, and creatinine.

Creatine ($C_4H_9N_3O_2$) and its anhydride creatinine ($C_4H_7N_3O$) are nitrogen containing compounds produced in the urine of primates as a result of muscle deterioration or disintegration. The content of these compounds in primate urine is indicative of the accumulative amount of deterioration. Thus, the effects of long periods of inactivity, weightlessness or other adverse factors on the condition of the muscles of a primate may be monitored by determining the quantity of these constituents in the urine at various time intervals.

In prior art processes for determination of the presence and the quantity of creatinine and creatine in urine, the creatinine content is usually determined by the "Jaffe" colorimetric method which consists of producing an optically determinable reaction product of alkaline picrate and creatinine by mixing picric acid and sodium hydroxide with a urine sample. The optical density of an alkaline picrate and creatinine containing solution for certain wave lengths varies linearly with the quantity of creatinine in the solution.

To determine the creatine content, acid is added to an equivalent urine sample. The sample is then heated to convert all the creatine therein to creatinine by driving a molecule of water from each mole of creatine. After the acid addition and heating step, a second determination of creatinine is made by subtracting the first determination of creatinine from the second determination, after acidifying and heating, an estimate of the creatine concentration in the urine can be obtained.

Normally, in these prior art processes the amount of creatinine is determined colorimetrically in the "Jaffe" reaction by adding picric acid and sodium hydroxide to the urine sample from separate sources or by premixing these reagents immediately before the addition step so that the process is not readily automated. It generally has been found that it is undesirable and impractical to premix picric acid and sodium hydroxide and let the premixture stand for any length of time before their addition to the urine sample since the reaction product of these substances degrades reducing the amount of alkaline picrate available for reaction with the creatinine and changing the optical characteristics of the reagent. Additionally, the results obtained by the use of these prior art systems are not usually accurate for the creatine determination since the effect of the added acid on the colorimetric determination of creatinine is entirely ignored and no compensation is made therefor.

Thus there is need for a chemical process by which a simple, rapid, colorimetric determination of both creatine and creatinine can be made wherein the acid addition is automatically compensated for, and a single reagent addition step accomplishes the results of the previously required two or more addition steps. Preferably such a process should provide an accurate, and extremely simple determination of creatine and creatinine which is readily amenable to automation and can be carried out with microchemical proportions of sample and reagent. Particular benefits can be obtained with such an improved process in space experiments where accurate determinations are essential and the weight of the testing apparatus is limited.

SUMMARY OF THE INVENTION

This invention, in its broadest aspect, is directed to an electronically controlled and operated apparatus for the analysis of a fluid for a selected constituent. The apparatus includes a test cell for receiving a fluid to be analyzed and a source of reagent for mixing with the fluid. A fluid feed means, such as a pump, is coupled to the test cell and to the fluid source and reagent source in sequence so that predetermined proportions of fluid and reagent can be fed into the test cell to form the desired mixture. The feed means are selectively coupled to the source of fluid and the reagent by an electrically controlled means, such as a valve system. The feed means and electrically controlled means are automatically activated and sequenced by electrical control circuitry included within the apparatus. The test cell is operatively associated in the apparatus with a mechanism for quantitatively measuring a characteristic of the fluid and reagent mixture and for producing an electrical signal which is representative of the amount of a selected constituent in the fluid. This apparatus is ideally adapted to the microchemistry involved in the analysis of extremely small fluid samples since all of the functions are electronically controlled. The actual analysis of the chemical reactants may be made by an electro-optical device such as a colorimeter or a fluorometer or by electrical resistivity measuring devices or by any other liquid chemical analyzer unit which produces an electrical signal.

In one embodiment of the apparatus of this invention, the fluid to be analyzed and the reagent are contained within the apparatus in collapsible compartments. The collapsible compartments are connected to a pair of ducted cylindrical valve members which, when properly oriented, provide a through passage from the compartments to the test cell. The apparatus in this embodiment is internally pressurized to about 7 to 14 p.s.i.a so that when the valves, for example, are oriented to provide a through passage from the reagent compartment to the test cell, the internal pressure of the apparatus collapses the reagent compartment forcing reagent up to the entrance of the test cell.

Reagent is metered into the test cell by means of a microsyringe pump which comprises a piston reciprocally mounted within the test cell. In the test cell "empty" position the piston completely occupies all the space in the test cell. After reagent, as in this example, has been forced into fluid communication with the entrance to the test cell by means of the internal pressure of the apparatus, it is metered into the test cell by reciprocal movement of the piston away from the test cell entrance. The piston is motor driven through a gear linkage and includes limit switches which define the test cell "empty" and test cell "fill" positions of the piston. The size and drive mechanism of the piston enable microliter quantities of fluids to be metered into the test cell for microchemistry analysis. The drive motor is dynamically braked to prevent coasting of the piston and enable accurate metering of fluids.

To compensate for temperature variations in using the apparatus, a temperature control device including a temperature sensing mechanism and a heater mechanism may be mounted on the test cell.

The electronic sequencing circuitry of this invention sequentially operates the analyzer valves for alternately connecting them to the fluid to be analyzed, the reagent solution, the rinse solution, and the calibrate solution and for operating the pump when the valves are properly oriented. This circuitry includes an electrical component for counting which will assume progressive configurations. A decoding member is operatively connected to the counting component for generating valve positioning signals when the counting component is in a predetermined configuration. The electronic circuitry also includes component which are responsive to the decoding member for driving the valves of the analyzers to particular valve positions. A second decoding member is responsive to the valve positions and generates an output when the valves have been oriented in a particular manner. These outputs initiate operation of the microsyringe pump for metering the fluid, reagent, calibrate solution, or rinse solutions, etc. (depending upon orientation of the valve) into the test cell for analysis.

Electronic circuitry for initiating a mixing cycle may also be responsive to the valve position decoding member for mixing the contents of the test cell for particular valve positions. In this instance a mixing chamber is provided in one of the valves and the electronic circuitry cycles the mixed fluids from the test cell into the mixing chamber and back into the test cell for a series of mix cycles. The heater may also be operatively connected to the valve along with electronic circuitry for actuating the heater for particular valve positions.

Each analyzer of the apparatus of this invention produces an electrical output corresponding to the quantity of a selected constituent in the fluid being analyzed. For example, the electro-optical analyzer used for the analysis of urine for creatine and creatinine produces an electro-optical signal in analog form which is sent to a data handling block in the apparatus.

The data handling block includes an analog-to-pulse-width converter which converts the analog signal into a pair of pulses having a time interval dependent upon the magnitude of the analog signal. The data handling block includes a clock pulse source which acts as the input to a gate. The gate is enabled by the first pulse from the analog-to-pulse-width converter and is disabled by the second pulse so that the output of the gate follows the clock pulse source input as long as the gate is enabled. The gate output is fed into a counter which then counts the gate outputs as long as the gate is enabled thereby converting the analog signal into a binary representation.

A multiplexer including a plurality of input channels may be connected in the data handling block with the analog signals from the analyzer connected to the input channels. In this arrangement an electronic channel selector is connected to the multiplexer for selectively enabling the input channels as output signals from the multiplexer to the analog-to-pulse-width converter.

The counter used in this invention may comprise a plurality of binary counters each having a gate associated with it. The gates are further enabled by the channel selector so that a particular input to the multiplexer selected by the channel selector will cause a particular counter to advance in response to the gate. The counter may include a bit commutator for serially reading out the numbers contained therein.

The apparatus of this invention further includes an accumulator for receiving fluids to be analyzed, such as the urine of primates, and electronic circuitry and components for performing the analysis at predetermined time intervals. Circuitry is provided so that in the event that a sufficient quantity of fluid has not been received in the accumulator for performing the analysis, a calibrate sequence is initiated instead using calibrate solution rather than the accumulated fluids. This circuitry includes a fluid sensor for indicating the presence of a predetermined amount of fluid in the accumulator, a counter which sequentially advances from one count configuration to another at predetermined time intervals, and counter decoding means for generating test time signals for particular count configurations of the counting means. The test time signals are received by a binary element which has a first and second state and which is set to its first state at each test time. Time delay circuitry in the system generates an output a predetermined time after each test time signal has been generated by the decoding means. The outputs of the fluid sensor and the time delay circuitry are received by a gate which is connected as an input to the binary element. The gate generates an input to the binary element a predetermined time after a test time occurs if the sensor indicates that an adequate amount of fluid has been accumulated, setting the binary element to its second state. The second state of the binary element represents a command to the analyzers to perform an analysis of the fluid from the accumulator. The first state of the binary element represents a command to the analyzers to perform an analysis of the calibration solution in the apparatus. Once the indication of the presence or absence of sufficient accumulated fluids has been received by the circuitry of the apparatus the proper sequence, i.e. either a calibration sequence or a fluid analysis sequence, as determined by the state of the binary element, is performed by the sequencing circuitry of the apparatus.

This invention is also directed to a process for determination of creatinine and creatine in a liquid solution of these materials. The process is carried out by first providing a creatinine or creatine containing liquid to be analyzed. A sufficient amount of acid is added to the liquid to adjust the pH to a range most favorable for conversion of creatine to creatinine. A reagent consisting essentially of a premixture of picric acid, a metal salt stabilizer, and a metal hydroxide is then added to the liquid. The reagent is added to the liquid in an amount sufficient to provide an excess of alkaline picrate over creatinine. A sample of the liquid and reagent are then thoroughly mixed and placed in a test vessel. Light of a selected wave length is passed through the mixture and into contact with a detector which measures the optical density of the mixture for determination of the amount of creatinine present in the liquid by comparing the optical density with that of a standard curve determined with known quantities of creatinine in a pH adjusted fluid.

For determining the amount of creatine present in the liquid, the liquid is heated to a temperature of about 95 to 105° centigrade for from 20 to 35 minutes prior to addition of the reagent. This converts all creatine in the liquid to creatinine. Another equivalent sample of the liquid is mixed with reagent and placed in the test vessel and the amount of creatinine is again determined. The actual amount of creatine is then determined by subtracting the amount of creatinine found without heating from the amount of creatinine found after the heating step. By adding the acid to adjust the pH prior to the original creatinine determination and by preparing the standard curve using an acid-containing fluid, the creatine determination is made to be extremely accurate.

It has been discovered that, contrary to prior belief, the addition of an acid such as hydrochloric acid or sulfuric acid to the urine sample in sufficient quantity to adjust the pH to from about 0.1 to 1 does not adversely affect the colorimetric determination of creatinine. When the sample is heated, however, the conversion of creatine to creatinine is very complete within the pH range.

Additionally it has been discovered that the creatine and creatinine content of a fluid can be determined with a single reagent addition step by using a premixed alkaline picrate reagent produced by forming a stable mixture of picric acid, metal hydroxide, and a metal salt stabilizer such as sodium chloride. This premixture of the picric acid and hydroxide with the metal salt stabilizer has been found to be stable when stored at temperatures from 4 to 25° centigrade for periods of at least 35 days. In an automated system the use of a single reagent has the advantage of reducing the plumbing, the fluid storage space, and electronic control requirements. It has the further advantage of requiring the monitoring of the condition of only a single reagent rather than several.

To determine the quantity of creatine in a urine sample, with the process and apparatus of this invention, it is not necessary to go through a complex series of reagent addition steps such as utilized by the prior art. The urine sample is acidified for both the creatine and creatinine determinations with an increase in the process reliability since the optical characteristics of the samples are affected equally by the acid. The determination of creatine is made by heating a second acidified urine sample equivalent to the first sample used in the creatinine determination to a temperature from 95 to 105° centigrade to drive off water and convert the creatine to creatinine. The same reagent is added in a single step in an amount sufficient to provide excess alkaline picrate. The results obtained after heating the second sample are then compared with the results obtained without heating of the first sample and the latter is subtracted from the former to give an accurate, simple determination of creatine in the urine. Any acid which does not adversely affect the properties of the reagent can be used to adjust the pH of the urine sample. Additionally any base and metal salt can be used which do not adversely affect the creatine-creatinine determinations.

The particular embodiment of the invention described herein functions automatically in the following manner to analyze periodically the urine specimens.

The total volume of the urine discharged by the subject over a predetermined period is filtered and collected in an accumulator. At the end of each period, the timer actuates the apparatus and a sample is removed from the accumulator for automatic analysis by the apparatus. If sufficient quantity of urine has not been accumulated, the timer initiates an instrument calibration sequence and the self-contained calibration solution is circulated through the apparatus instead of a urine sample.

During the interval when the sample is being removed from the accumulator and when the accumulator is subsequently emptied, the inlet to the accumulator is blocked, so as to prevent any additional urine from being discharged into the accumulator. The time required for removing the sample from the accumulator and for emptying the accumulator is less than 15 seconds in the constructed embodiment of the apparatus of the invention.

The analysis of the urine sample (or the instrument calibration) is carried out in two separate analyzer units although a single analyzer unit may be used. In the embodiment to be described each analyzer unit operates independently of the other so as to maintain system reliability. One of the analyzers is used for determining the creatine and creatinine concentration in the urine and the other for determining the calcium concentration. The analyses by the two analyzer units are preferably performed sequentially in order to limit the peak power level requirements of the system. The presently preferred analytical sequence is for the determination of (a) creatinine, (b) calcium and (c) creatine. Any selected constituents may be quantitatively determined, however, by properly adjusting the electronics and analyzer unit of the system.

Each analyzer unit is controlled by logic and sequencing circuitry responsive to a timing sequencer for filling a test cell with urine (or calibrate) and reagent, producing an electrical signal proportional to the quantity of the selected constituent in the urine, processing and storing the signal for later read-out, removing the reactants from the unit and cleansing the analyzer unit with a rinse solution in preparation for the next analysis.

The apparatus and method of this invention may be more clearly understood from the following detailed description and the appended claims when taken in conjunction with the accompanying drawings wherein:

DESCRIPTION OF THE DRAWINGS

FIG. 1 is a functional block diagram of an analyzing system constructed in accordance with one embodiment of this invention which may be utilized, for example, to analyze a urine sample for creatinine and creatine;

FIG. 2 is a functional block diagram of a second system which may be included in the apparatus of the present invention and which may be used, for example, to analyze a urine sample for calcium;

FIG. 3 is a functional schematic of a second embodiment of the analyzing system of this invention as shown in FIG. 1;

FIG. 4 is a functional schematic of a second embodiment of the system as shown in FIG. 2;

FIG. 5 is a block diagram of the overall apparatus system representing the second embodiment of the analyzing system, and which is capable of performing the analysis of the systems shown in FIGS. 1 to 4;

FIG. 6 is a simplified perspective view, partly in section, and somewhat schematic, showing the apparatus of the second embodiment of the present invention, and particularly the selection and control valves which are included in the apparatus, together with a test cell, a reference cell and associated components;

FIG. 7 is a section taken substantially along the line 7—7 of FIG. 6 and showing the details of a mixing chamber which is included in one of the valves of FIG. 4;

FIG. 8 is a further sectional view showing particulars of a microsyringe pump for use in the apparatus as shown in simplified form in FIG. 6;

FIG. 9 is an exploded perspective view showing the components of the valve of FIG. 6 and the mixing chamber therein;

FIG. 10 is a circuit diagram showing the manner in which certain electrical signals are generated and amplified in the system of the invention;

FIG. 11 is a perspective view of an analyzer unit of the invention including a schematic representation of the fluid sampling block, the fluid storage assembly and fluid transport lines of this invention connected to the analyzer unit;

FIG. 12 is a further perspective view of the analyzer unit of FIG. 11 rotated 90° towards the viewer;

FIG. 13 is an exploded perspective view of the analyzer unit of FIG. 12 rotated another 90° to the right and towards the viewer and showing the microsyringe assembly and the electronics assembly associated with that unit;

FIG. 14 is a block diagram of the control system for the apparatus of the invention, and particularly for the embodiment shown and described herein;

FIG. 15 is a logic control circuit for a waste pump which is included in the apparatus;

FIG. 16 is a logic block diagram of a timer included in the diagram of FIG. 14;

FIG. 19 is a block diagram of the Data Handling electronics;

FIG. 20 is a multiplexer circuit which responds to the electrical outputs from the various electronic detector and amplifier units of the apparatus, and directs such outputs in a time shared manner to a data handling system which is included in the apparatus; and, FIGS. 21, 22A, 22B, 23A, 23B and 24 show the various components of the data handling system.

DETAILED DESCRIPTION OF THE PREFERRED EMBODIMENTS

Figure 17A:
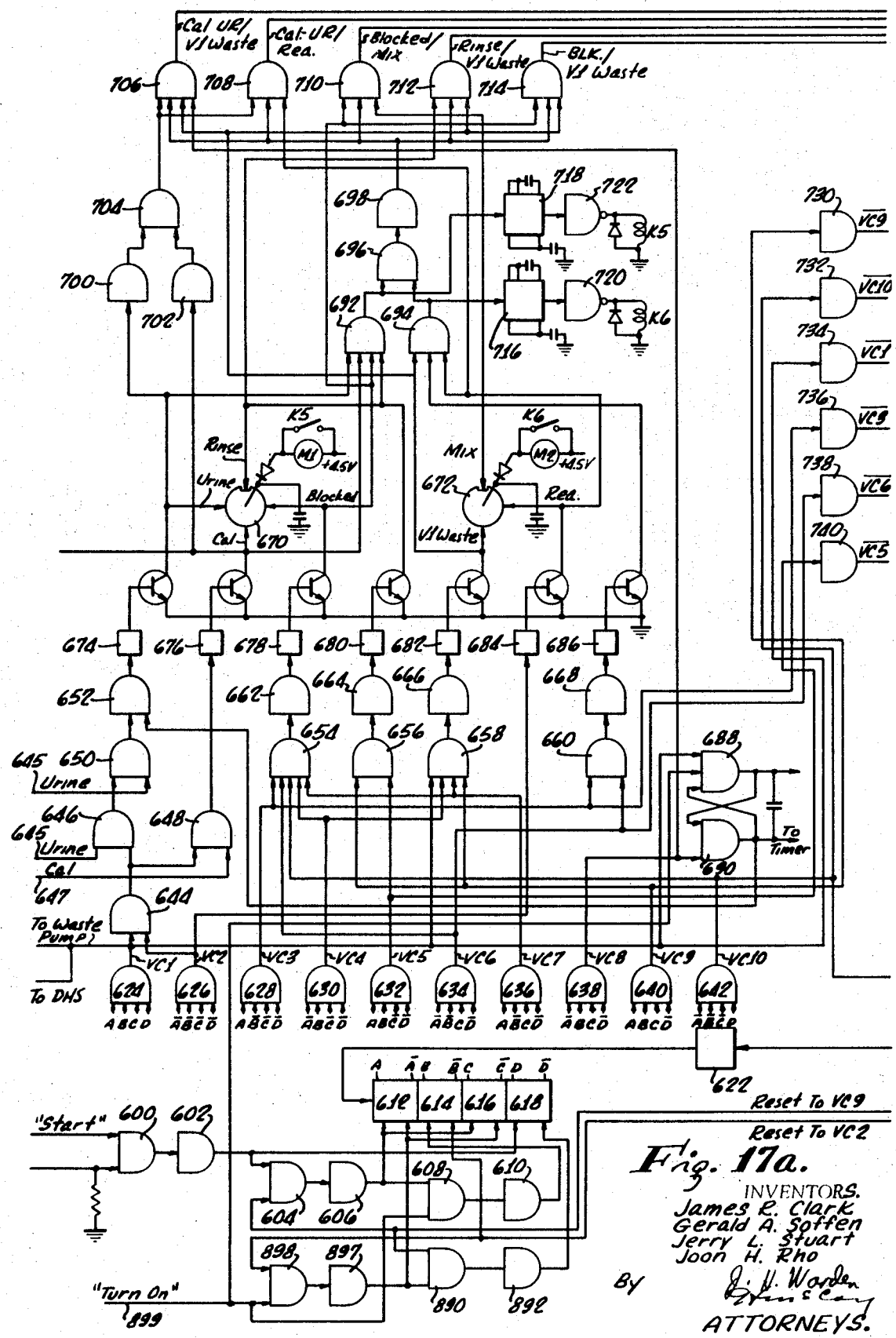
FIGS. 17A and 17B are logic control circuitry for the Calcium Sequencer 702 shown in FIG. 14.

Referring now to FIG. 1, it can be seen schematically that the creatine and creatinine analyzer unit comprises basically a pump 10 which is connected to a source of urine, a source of reagent, in this instance alkaline picrate, and a source of acid on the input side of the pump. Two output lines are provided from pump 10. The first line 11 for conducting urine and acid passes through a heater coil 14 into a mixer 16. The second output line 12 for conducting the reagent is in fluid communication with a reference cell 18 and with mixer 16. The mixer 16 communicates with a test cell 20 which is also in fluid communication with a waste tank (not shown).

The test cell 20 and reference cell 18 are disposed on opposite sides of a common light source 22 to form a modified dual beam colorimeter. A pair of narrow band pass transmission optical filters 24 and 26 are interposed between the light source 22 and the respective test and reference cells 18 and 20 as shown in FIG. 1. These filters are selected to peak, for example, at 480 to 490 millimicrons. At such a wave length, the absorbency of the solution of reagent and urine is linearly proportional to the concentration of creatinine in the urine. Similarly, a pair of narrow band pass optical filters 28 and 30 for removing interfering wavelengths are interposed between the cells 18 and 20 and respective photodiode detectors 32 and 34.

It has been found preferable to use both the source optical filters 24 and 26 and the detector optical filters 28 and 30 in order to attenuate the infrared energy present in the light source sufficiently below the signal, so that no infrared energy will be detected by the detectors 32 or 34. The detector optical filters 28 and 30 also block any undesired fluorescence or scattering phenomena which may be present as a result of chemical side reactions in the test cell.

The analyzer unit of FIG. 1 is activated by a timer which starts pump 10 and causes it to provide a metered sample of urine acid and reagent in the mixer. The urine sample, the acid and the alkaline picrate reagent are thoroughly mixed in the mixer 16 before they enter the test cell 20. As can be seen from FIG. 1, once the pump 10 is activated the reference cell is filled with the alkaline picrate reagent which is self-contained within the apparatus and is of a predetermined concentration. By pumping alkaline picrate, or other reagent into the reference cell so that fresh reagent displaces that previously pumped into the cell, it is possible to monitor continually the condition of the reagent solution itself as well as to provide a reference level for the analysis during operation of the analyzer unit.

The heater 14 is provided in line 11 in the analyzer unit of FIG. 1 to convert creatine to creatinine. This is accomplished by heating the urine sample to a temperature of from 95 to 105° centigrade. The acid is mixed with the urine to provide the most favorable pH range for this conversion. The acid is introduced into line 11 for mixing with the urine during the analysis for both creatinine and creatine. Heater 14 is primarily for temperature control of the fluids and is only activated to heat the fluids to above about 80° C. during the creatine analysis.

The calcium analyzer unit, as shown in FIG. 2, includes a pump 50 which is similar to pump 10 of FIG. 1. The pump 50 is in fluid communication with a source of urine and reagent, in this instance Calcein.

Similarly to the embodiment shown in FIG. 1, one of the outputs of the pump 50, as shown in FIG. 2, is coupled by an appropriate fluid line directly to a mixer 52. The other output line of pump 50 is coupled to a reference cell 54. The reference cell 54 is included in a modified duel beam fluorometer, and is coupled by an appropriate line to mixer 52.

As in the embodiment shown in FIG. 1, the reagent is pumped into the reference cell where it displaces the previous reagent sample to the mixer 52. The previous reagent sample is mixed in mixer 52 with the urine sample and the mixture is then heated to a predetermined standardized temperature by heater 57 in the fluid flow line intermediate mixer 52 and the test cell 58.

The fluorometer in the system of FIG. 2 contains an incandescent light source 60 having a pair of narrow band pass optical filters 64 and 66 interposed between the source and the reference cell 54 and the test cell 58, respectively. The narrow band pass optical filters 64 and 66 are constructed to transmit below a wavelength of about 490 millimicrons, and attenuate above that wavelength.

A pair of photodiode detectors 68 and 70 are mounted at right angles to the respective incident beams from the light source 60. Further band pass optical filters 72 and 74 are interposed between the respective cell and its accompanying detector. The band pass filters 72 and 74 are constructed to peak at a wavelength of from about 510 to 525 millimicrons and to attenuate below 500 millimicrons. The photodiode detectors 68 and 70 are electrically connected to a difference bridge circuit 76 as shown in FIG. 2. The data output from the bridge circuit 76 is amplified and fed to a data handling system.

Although not shown in FIGS. 1 and 2, various operational controls may be provided for the apparatus of this invention. These controls include a temperature control for each test cell and for the reference cell in the systems and a temperature control for heaters 14 and 57. Other operational controls include the operational controls for pumps 10 and 50. The apparatus also includes a power supply for the light source and for the electronic control circuits which operate the analyzing systems shown in FIGS. 1 and 2.

FIGS. 3 and 4 disclose another embodiment of the analyzing systems for creatine and creatinine and for calcium, respectively. The analyzing system shown in FIGS. 3 and 4 are similar to those shown in FIGS. 1 and 2 but involve more complex structure of the pumping mechanism.

Both the systems of FIGS. 3 and 4 include a pair of motor driven valves V1 and V2 designated a "selector" valve and a "control" valve, respectively. The selector valves V1 of the systems of both FIGS. 3 and 4 are connected to a source of urine, a source of calibrate solution, and a source of rinse solution. Selector valve V1 is also connected to the control valve V2. The control valve V2 in addition to being connected to selector valve V1, as shown in FIG. 3, is connected to a test cell 204, to a waste pump W.P., to a source of acid and to a reference cell 200 which is also in fluid communication with a source of reagent at the end opposite from control valve V2. In the calcium analyzer of FIG. 4, a source of acid is not connected to the control valve and the reference cell is designated 200a and the test cell 204a.

Referring now again to FIG. 3, a microsyringe pump 207 is connected to test cell 204 for metering a predetermined amount of urine (or calibrate solution) and reagent into the test cell. The particular fluid which is metered into the test cell depends upon the orientation of selector valve V1 and control valve V2. After the urine, acid and reagent solutions have been metered into test cell 204 in predetermined proportions, the control valve V2 is rotated into a mixing position so that a mixing chamber 208 in the valve V2 is in fluid communication with test cell 204. When control valve V2 is moved into the mixing position, selector valve V1 is blocked. The microsyringe pump 207 is then activated to expel the mixture of fluids from test cell 204 into mixing chamber 208 and to draw the mixture back into the test cell. In this manner, the fluids previously transmitted into test cell 204 are thoroughly mixed and then drawn again into the test cell 204. This mixing sequence is designed to assure maximum interface contact between the reagent and the creatinine of the urine or calibrate solution.

Microsyringe pump 207 is driven by a motor 268 and is controlled by a revolution counter switch 207a and a pair of limit switches 207b. A similar pump assembly (not shown) is associated with the test cell 204a of FIG. 4.

Appropriate sequencer circuitry is associated with valves V1 and V2 to cause them to be driven selectively to different positions so that the operations of the particular system can be carried out in a proper sequence.

In the system of FIG. 3, the creatine and creatinine analysis is carried out by comparing the optical density of the metered urine, acid and reagent solution in the test cell 204 with the optical density of the reagent in the reference cell 200. A modified colorimeter which includes a light source 212 and a pair of optical filters 214 and 216 disposed on opposite sides of the light source is used. The filtered light from the source 212 is directed through the test cell 204 and the reference cell 200 into a pair of photodiode detectors 218 and 220, respectively. The detectors are connected to a ratio bridge circuit 221 which is electrically connected to an amplifier and data handling system.

In the system of FIG. 4, the analysis of the urine sample for calcium is carried out by comparing the fluorescence of the metered urine and reagent solution in a test cell 204a with the reagent in the reference cell 200a. The fluorescence is measured with a modified fluorometer including a light source 212a, a pair of optical band pass filters 214a and 216a disposed on opposite sides of the light source, a second pair of optical band pass filters 214b and 216b disposed at substantially right angles to the light beam path through test cell 204a and reference cell 200a, respectively, and a pair of detectors 218a and 220a. The detectors are connected electrically to a difference detector circuit 220a which is in turn connected to an amplifier and a data handling system.

The details of one of the analyzing systems and its associated controls and components are diagrammatically shown in FIG. 5. The system shown in FIG. 5 may be adapted to perform either of the analyses described in conjunction with FIGS. 3 and 4. The system as shown in FIG. 5 includes an analyzer unit 150 which may be either the unit discussed with respect to FIGS. 3 or 4 or a similar analyzer unit. For example, the unit may perform an analysis based upon electrical resistivity readings rather than on the optical characteristics of the reagent-urine sample mixture.

Analyzer 150 is connected to a source of urine, a reagent solution, a rinse solution, a calibrate solution, and an acid solution, respectively, through lines 152, 154, 156, 158 and 159. These lines may be made from an extremely small diameter chemically resistant plastic tubing such as Teflon or Kel-F. The reagent solution, rinse solution, calibrate solution, and acid may all be self-contained within the apparatus as shown in FIG. 11. In one embodiment of the invention these solutions are contained within collapsible plastic bags or compartments and the entire system is pressurized so that the respective solution is forced into analyzer 150 when the appropriate valving orientation is made.

The selector and control valves V1 and V2 are mounted within the analyzer 150 as shown diagrammatically in FIG. 5. Valves V1 and V2 are provided with internal ducts for connecting the various fluid lines to the proper channels and passages in the analyzer block. The orientation of the selector valve and the control valve is controlled by valve motors 160. The motors in turn are controlled by electrical sequencing and timing circuitry identified in FIG. 5 as the logic and sequencer circuitry 164. This circuitry, through motors 160, orients the valves, operates the pumping mechanism in the anlyzer and controls all the operations of the analysis to fully automate the apparatus. Valves V1 and V2 are rotated to selected orientations for each sequence by driving valve motors 160. These orientations correspond to an analytical step. The positions of the valves are sensed by valve position switches, shown diagrammatically as block 162, which provide outputs for indicating the valve positions to the control circuitry 164.

A heater pulser 166 may be provided to energize a heater within the anlyzer 150 for controlling the temperature of the fluids being analyzed and, as in the analysis for creatine, for thermally activating a chemical reaction. The temperature may be monitored by a temperature sensor thermistor which is connected to the circuitry 164. The temperature of the fluids in the analyzer is regulated by controlling the rate of pulses to the heater from the pulser 166 with the circuitry 164. Power for the system is obtained from a battery pack represented by the block 168.

With continued reference to FIG. 5, a data handling system 170 is provided for receiving the electrical output from the analyzer unit 150 after an analyzing sequence has been completed. A waste line 172 extends from analyzer 150 through which waste fluid is discharged into an appropriate waste tank associated with the apparatus. Waste line 172 may be constructed from a tubing similar to that used for the chemical solutions. A further tube 173 is provided for transporting excess mixture fluids from the valve V2 after a mixing operation has been completed or aborted.

The analyzer 150 of FIG. 5 is schematically shown in FIG. 6. As can be seen, the valve V1 is a cylinder rotatably mounted in a solid analyzer block 250 and includes three internal ducts labeled urine, calibrate and rinse. Selector valve V1 by these internal ducts alternatively connects a urine sample through tubing 152, a calibrate solution through tubing 158 and a rinse solution through tubing 156 with a passage 206 in the anlyzer block which runs from selector valve V1 to the control valve V2. Valves V1 and V2 are both ducted cylinders and are rotatably mounted in the analyzer block in a fluid tight manner. The block itself may be constructed from a chemically resistant plastic such as Teflon or Kel-F.

The valves V1 and V2 are rotated automatically in a controlled, sequenced manner by the valve motors 160 and the associated circuitry, and the positions of the valves are at the same time monitored by the valve position switches 162 shown in FIG. 5.

As shown in FIG. 6, the reagent input tube 154 is coupled to the reference cell 200, and the outlet of the cell is connected to the cotrol valve V2 by passage 202 in the analyzer block 250. A source of acid solution is connected to the analyzer block and control valve V2 through a tube 159. Also connected to control valve V2 are waste line 172 and mix excess line 173. Control valve V2 is provided with appropriate through ducts, as shown in FIG. 6, for connecting passage 206 to the test cell 204 and to a waste receptacle (not shown) and for connecting the source of acid with the test cell 204. The ducts are also provided for connecting mixing chamber 208 with the entrance to test cell 204 and with the mix excess tube 173 which extends from the control valve V2 as shown in FIG. 6.

The test cell 204 may be directly connected to the ducts in control valve V2 by properly orienting the control valve. The selector valve V1 may be connected to the control valve V2 by the passage 206 in the analyzer block and the V1-to-waste duct in the control valve V2.

As the selector valve V1 and the control valve V2 are controllably oriented in different valve positions by the electronic sequencing circuitry operating the drive motors, different fluid interconnections are made within the analyzer between the various components thereof and with the various input and output tubes shown in FIG. 6.

This embodiment of the analyzer apparatus is preferably pressurized and the various chemical solutions are contained in collapsible bags or compartments as shown in FIG. 11 and connected by their respective tubing to the analyzer block. For example, when valve V1 is oriented so that the calibrate solution duct communicates with tubing 158 and passage 206 through the analyzer block, calibrate solution will be squeezed out of its collapsible container by the internal pressure of the system through the selector valve and into passage 206. If control valve V2 is oriented as shown in FIG. 6 so that the internal duct communicates with the passage 206, the test cell 204, and the waste line, the calibrate solution will be forced up into contact with the entrance to the test cell 204.

The microsyringe pump assembly 207 draws fluid into the test cell 204 by syringe-like action caused by reciprocal movement of a piston 209 in the test cell 204 which is also the pump chamber. The piston 209 is moved back and forth as it is turned within the test cell so as to cause the various fluids to be metered into the test cell 204 and to be discharged from the test cell. For example, continuing the discussion with respect to calibrate solution, if the calibrate solution is in the internal duct connecting passage 206 to waste tube 172 and in contact with the entrance to the test cell, reciprocal movement of piston 209 away from the entrance to test cell 204 will draw some of the calibrate solution into the test cell. The calibrate solution can be removed from the test cell by rotating selector valve V1 to a "block" position and activating the microsyringe pump 207 to expel the calibrate from the test cell and activating the waste pump to draw the calibrate from the V1-to-waste duct.

The mixing chamber 208 is located within the control valve V2 as best seen in FIGS. 6, 7 and 9. The mixing chamber includes a small cavity over which a flat elastic diaphragm 210, a few thousandths of an inch thick, is mounted. This diaphragm is resilient and capable of expanding when fluid is injected into the cavity by the pump 207. The cavity in the mixing chamber is coupled to the test cell 204 through a port in control valve V2 when the valve V2 is sequenced to its mixing position.

The fluid in the test cell 204 is injected into the mixing chamber 208 by reciprocal movement of piston 209 of the microsyringe pump 207 toward the entrance to the test cell 204. As the piston 209 of the pump moves back and forth, the diaphragm of the mixing chamber 208 inflates and deflates so as to cause the various components of the solution within the mixing chamber to be thoroughly mixed with one another. Various chemical analysis require different amounts of mixing. For example, in the analyzer used for determining calicium content, 3 to 7 mixing cycles are required. In the analyzer used for the determination of creatinine and creatine seven mixing cycles are usually required. Generally, the mixing is necessary to eliminate fluid separation of the reagent and the fluid to be analyzed and to assure maximum interface contact between the reagent and the fluid so that all of the constituent being analyzed for in the fluid is reacted or complexed with the reagent.

With continued reference to FIG. 6, the urine sample is collected in an accumulator (see fluid handling block 350 of FIG. 11) which includes an accumulator pump for pumping a urine sample into line 152 and into contact with the selector valve V1. When the valve V1 is placed in the urine sample orientation, urine flows through the internal duct of valve V1, through passage 206 up to the entrance to test cell 204. The accumulator pump may be any piston actuated pump which is capable of applying a predetermined force to fluids in the pump chamber so as to force the fluids through line 152 and into the ducts of valves V1 and V2. The urine which is forced into the internal duct of valve V2 is then metered into the test cell 204 through the port in the control valve V2. This occurs when the piston 209 of the microsyringe pump 207 is moved to the left in FIG. 6.

The accumulator pump maintains a substantially constant pressure on the urine in lines 152, the internal duct to valve V1, passage 206 and the internal duct to test cell 204 in valve V2. Thus, as urine is metered into the test cell, additional sample is forced into the line so that microsyringe pump 207 can meter any desired amount of urine up to the capacity of the test cell.

After the required amount of urine has been metered into the test cell 204, control valve V2 is rotated clockwise as shown by the arrow in FIG. 6, so that the reagent duct in the control valve communicates with the test cell 204 and with the reagent passage 202 in the analyzer block. When control valve V2 is rotated, urine is entrapped in the urine duct in the control valve with each of the ends being in sealed relationship with the analyzer block. Part of the urine sample is also entrapped in the passage 206 and in the urine duct of selector valve V1. At the end of the test sequence, these passages are rinsed clean as will be explained.

If a creatine or creatinine determination is being made, after a quantity of the urine has been metered into the test cell, the control valve V2 is rotated so that the acid duct is in fluid communication with the test cell 204 and the acid line 159 for adding acid to the urine sample to adjust its pH. Whether rotated to the acid addition position or the reagent addition position, the basic operation of addition remains the same. Both acid and reagent are maintained in the apparatus in collapsible bags or compartments and the apparatus is internally pressurized so that reagent fills tube 154, reference cell 200 and internal passage 202 in the analyzer block and when control valve V2 is placed in the reagent addition position reagent is forced into contact with the entrance to test cell 204. Similarly acid fills the conduit 159 and, when control valve V2 is oriented in the acid addition position, acid is forced through the internal duct into contact with the entrance to test cell 204. Acid and reagent are drawn into the test cell by the syringe-like action of piston 209 moving away from the entrance thereto.

The movement of control valve V2 is sequenced so that, for example in the analysis for creatine or creatinine, the control valve is in the urine addition position and microsyringe pump 207 is activated to meter in a predetermined proportion of urine, the control valve is then rotated clockwise to the acid addition position and microsyringe pump 207 is activated to meter in a predetermined proportion of acid, and then control valve V2 is again rotated to the reagent addition orientation and microsyringe pump 207 is activated to meter in a predetermined proportion of reagent. Intermediate the acid addition and the reagent addition, it may be necessary in some instances to provide a mixing cycle or a dilution sequence. For example in the analysis for creatine and creatinine, after the addition of acid, control valve V2 is sequenced to the mix position and microsyringe pump 207 is activated to expel the urine and acid mixture into the mixing chamber 208 (see FIG. 7). The mixture is then drawn back into the test cell by the retraction of piston 209 and again expelled into the mixing chamber for a predetermined number of cycles to provide thorough mixing of the acid with the urine.

The acid and urine mixture may be diluted by rotating selector valve V1 momentarily to the rinse position and control valve V2 to the V1-to-waste duct and activating a waste pump at the end of line 172 to rinse the line. The rinse solution may be sodium hydroxide or sodium chloride or some other rinse solution which will also act as a diluent for the urine without interfering with the creatinine determination. After the selector valve V1 has been rotated to a block position and the waste pump has evacuated the lines of the rinse solution, it is shut off and microsyringe pump 207 is activated to pump the acid/urine mixture into the V1-to-waste line. A smaller amount of the acid and urine mixture is drawn back into the test cell 204 or the pump chamber of microsyringe pump 207. The remainder of the acid/urine mixture which remains in the V1-to-waste duct of control valve V2 is then flushed from the line by again orienting selector valve V1 to the rinse position and activating the waste pump to rinse passage 206 and the V1-to-waste duct of the control valve V2. Microsyringe pump 207 is then again activated to draw the diluent rinse solution into the test cell 204 in any desirable proportion for diluting the acid and urine mixture. Control valve V2 may then be rotated to the mix position again for assuring thorough mixing of the diluent rinse solution and the acidified urine sample.

The dilution sequence reduces the amount of creatinine in the test cell 204 to assure that the reading produced will be within the range of the instruments and the strength of the alkaline picrate reagent.

With further reference to FIG. 6, heater 252 is included in test cell 204 for standardizing the test temperatures and for use in converting creatine to creatinine. The heater is pulsed for from 20 to 35 minutes for the conversion to heat the acid and urine mixture to a temperature of from 95 to 105° centigrade and convert all of the creatine therein to creatinine. The heating step is preferably carried out prior to the dilution sequence so that the diluent-rinse solution which is alkaline not only reduces the concentration of creatinine in the urine, but also neutralizes the added acid after it has accomplished its purpose of adjusting the pH for conversion of creatine to creatinine.

During the mixing of the fluids in the test cell 204, piston 209 is reciprocally driven by the pump motor to a fill and empty position several times, thereby driving the fluids back and forth into the mixing chamber 208. At the completion of this operation, the control valve orientation is such that any excess of the mix is discharged from the analyzer block through the mix excess tube 173 into an appropriate waste receptacle.

Heater coils 252 and the thermistors or temperature sensors 253 are attached to the test cell 204 and connected to conventional temperature control circuits (not shown) to provide active temperature control and regulation throughout the entire chemical analysis. The temperature is accurately controlled during data readout to compensate for the temperature coefficient of the colorimetric or fluorometric effect being measured and to standardize the measurement.

By rotating valves V1 and V2 to the various positions, futrher rinse operations, instrument calibration operations and dilutions can be performed with the logic and sequencer circuitry of this invention as needed. The detailed sequencing of selector valve V1, control valve V2, the microsyringe pump 207 and the waste pump for typical creatinine, creatine and calcium determinations are shown in sequencing Tables 1 and 2.

TABLE 1

[Creatine-creatinine sequencing (colorimetry 9:51:340)]

| Valve control count | Valve V1 | Valve V2 | Volume 20 turns, micro-syringe pump 207 | Volume .5 ml., waste pump W.P. | Comments |
|---|---|---|---|---|---|
| | Urine | V1-Waste | Off | Off | Valve/pump positions at end end of previous test. |
| 1 | Calib or urine | do | Off | Off | $t_{Cr}=0$, 24 hr. pulse sequences V1 to the calibrate position. At $t_{Cr}=3, 9, 15$ and 21 hrs. V1 is sequenced to the urine position. |
| | do | do | Off | On | Flushes lines w/calib or urine prior to calibration or analysis. |
| | do | do | Off | Off | |
| Dilution sequence ||||||
| | Calib or urine | V1-Waste | On (−) 3 Rev | Off | Fills test cell 204 to 3/20 w/calib or urine. |
| | do | do | Off | Off | Count turns for turn off. |
| 2 | do | H₂SO₄ | Off | Off | |
| | do | H₂SO₄ | On (−) 17 Rev | Off | Acid added to calib or urine sample. Fills test cell 204. |
| | do | H₂SO₄ | Off | Off | Limit Switch 207b turns off (see Fig. 3). |
| Mixing sequence "A" ||||||
| 3 | Blocked | Mix | Off | Off | |
| | do | Mix | On (+) 20 Rev | Off | Empty test cell. |
| | do | Mix | Off | Off | Limit switch 207b turns off. |
| | do | Mix | On (−) 20 Rev | Off | Fill test cell. Mix 1. |
| | do | Mix | Off | Off | Limit switch 207b turns off. |
| | do | Mix | On (+) 20 Rev | Off | Empty test cell. |
| | do | Mix | Off | Off | Limit Switch 207b turns off. |
| | do | Mix | On (−) 20 Rev | Off | Fill test cell. Mix 2. |
| | do | Mix | Off | Off | Limit Switch 207b turns off. |
| | do | Mix | On (+) 20 Rev | Off | Empty test cell. |
| | do | Mix | Off | Off | Limit Switch 207b turns off. |
| | do | Mix | On (−) 20 Rev | Off | Fill test cell. Mix 3. |
| | do | Mix | Off | Off | Limit Switch 207b turns off. |
| | do | Mix | On (+) 20 Rev | Off | Empty test cell. |
| | do | Mix | Off | Off | Limit Switch 207b turns off. |
| | do | Mix | On (−) 20 Rev | Off | Fill test cell. Mix 4. |
| | do | Mix | Off | Off | Limit Switch 207b turns off. |
| | do | Mix | On (+) 20 Rev | Off | Empty test cell. |
| | do | Mix | Off | Off | Limit Switch 207b turns off. |
| | do | Mix | On (−) 20 Rev | Off | Fill test cell. Mix 5. |
| | do | Mix | Off | Off | Limit Switch 207b turns off. |
| | do | Mix | On (+) 20 Rev | Off | Empty test cell. |
| | do | Mix | Off | Off | Limit Switch 207b turns off. |
| | do | Mix | On (−) 20 Rev | Off | Fill test cell. Mix 6. |
| | do | Mix | Off | Off | Limit Switch 207b turns off. |
| | do | Mix | On (+) 20 Rev | Off | Empty test cell. |
| | do | Mix | Off | Off | Limit Switch 207b turns off. |
| | do | Mix | On (−) 20 Rev | Off | Fill test cell. Mix 7. |
| | do | Mix | Off | Off | Limit Switch 207b turns off. |
| 4 | do | Blocked | Off | Off | |

NOTE.—After V2 sequences to the blocked position, the heater is turned on in the analysis for creatine at the next 5-minute timing pulse. The acid urine solution is heated for 25 minutes (5 more 5-minute pulses) and the heater is turned off. The solution is then cooled for 5 minutes (1 more 5-minute pulse) and the following dilution sequence is begun. The above heating sequence is deleted for the creatinine analysis, and the following rinse sequence is started directly after the end of the mixing sequence.

| Valve control count | Valve V1 | Valve V2 | Volume 20 turns, micro-syringe pump 207 | Volume .5 ml., waste pump W.P. | Comments |
|---|---|---|---|---|---|
| Rinse sequence ||||||
| 5 | Rinse | V1 waste | Off | Off | |
| | do | do | Off | On | NaOH rinse of V1 and V2, of calib or urine prior to emptying test cell 204. |
| | do | do | Off | Off | |
| Second dilution ||||||
| 6 | Blocked | V1 waste | Off | Off | |
| | do | do | On (+) 20 Rev | Off | Empty test cell 204 into the V1 waste duct of V2. |
| | do | do | On (−) 3 Rev | Off | Fills T.C. to 3/20 with the urine-acid mixture from the V1 to waste duct. |

TABLE 1.—Continued

| Valve control count | Valve V1 | Valve V2 | Volume 20 turns, micro-syringe pump 207 | Volume .5 ml., waste pump W.P. | Comments |
|---|---|---|---|---|---|
| 7 | Rinse | do | Off | Off | |
| | do | do | Off | On | Flushes lines with NaOH rinse. |
| | do | do | Off | Off | |
| | do | do | On (−) 9 Rev | Off | Fills test cell 204 to 12/20 with NaOH rinse. |
| | do | do | Off | Off | |
| 8 | Blocked | Reagent | Off | Off | |
| | do | do | On (−) 8 Rev | Off | Fills test cell 204 to 20/20 with alkaline picrate reagent. |
| | do | do | Off | Off | |
| 9 | do | Mix | Off | Off | Empty test cell. |
| | do | Mix | On (+) 20 Rev | Off | Limit Switch 207b turns off. |
| | do | Mix | Off | Off | Fill test cell. Mix 1. |
| | do | Mix | On (−) 20 Rev | Off | Limit Switch 207b turns off. |
| | do | Mix | Off | Off | Empty test cell. |
| | do | Mix | On (+) 20 Rev | Off | Limit Switch 207b turns off. |
| | do | Mix | Off | Off | Fill test cell. Mix 2. |
| | do | Mix | On (−) 20 Rev | Off | Limit Switch 207b turns off. |
| | do | Mix | Off | Off | Empty test cell. |
| | do | Mix | On (+) 20 Rev | Off | Limit Switch 207b turns off. |
| | do | Mix | Off | Off | Fill test cell. Mix 3. |
| | do | Mix | On (−) 20 Rev | Off | Limit Switch 207b turns off. |
| | do | Mix | Off | Off | Empty test cell. |
| | do | Mix | On (+) 20 Rev | Off | Limit Switch 207b turns off. |
| | do | Mix | Off | Off | Fill test cell. Mix 4. |
| | do | Mix | On (−) 20 Rev | Off | Limit Switch 207b turns off. |
| | do | Mix | Off | Off | Empty test cell. |
| | do | Mix | On (+) 20 Rev | Off | Limit Switch 207b turns off. |
| | do | Mix | Off | Off | Fill test cell. Mix 5. |
| | do | Mix | On (−) 20 Rev | Off | Limit Switch 207b turns off. |
| | do | Mix | Off | Off | Empty test cell. |
| | do | Mix | On (+) 20 Rev | Off | Limit Switch 207b turns off. |
| | do | Mix | Off | Off | Fill test cell. Mix 6. |
| | do | Mix | On (−) 20 Rev | Off | Limit Switch 207b turns off. |
| | do | Mix | Off | Off | Empty test cell. |
| | do | Mix | On (+) 20 Rev | Off | Limit Switch 207b turns off. |
| | do | Mix | Off | Off | Fill test cell. Mix 7. |
| | do | Mix | On (−) 20 Rev | Off | Limit Switch 207b turns off. |
| | do | Mix | Off | Off | |

NOTE.—The optical density of the test and reference cells is read and after the next six 5-minute pulses the data from the ratio bridge circuit 261 is transferred to the data handling system at the sixth pulse. (25–30 minutes after mixing).

| Valve control count | Valve V1 | Valve V2 | Volume 20 turns, micro-syringe pump 207 | Volume .5 ml., waste pump W.P. | Comments |
|---|---|---|---|---|---|
| | | | Final rinse sequence | | |
| 10 | Blocked | V1 waste | Off | Off | |
| | do | do | On (+) 20 Rev | Off | Empty test cell 204. |
| | do | do | Off | Off | |
| 11 | Rinse | do | Off | Off | |
| | do | do | Off | On | Flush lines w/NaOH rinse. |
| | do | do | Off | Off | Limit Switch 207b turns off. |
| | do | do | On (−) 20 Rev | Off | Fill test cell 204 w/rinse. |
| | do | do | Off | Off | Limit Switch 207b turns off. |
| 12 | Blocked | Mix | Off | Off | |
| | do | Mix | On (+) 20 Rev | Off | Empty rinse from test cell 204 into mixing chamber 208. |
| | do | Mix | On (−) 20 Rev | Off | Empty mixing chamber 208 into test cell 204 to rinse mixing chamber. |
| | do | Mix | Off | Off | |
| 13 | Urine | V1 waste | Off | Off | |
| | do | do | On (+) 20 Rev | Off | Empty test cell 204 of rinse fluid. Limit Switch 207b turns off. |
| | do | do | Off | Off | End of sequence. Wait for next sequence initiation pulse at 3, 9, 15, 21 hrs. V1 sequences to urine position for these times. |

NOTE.—V1—Connects urine or calibrate or NaOH rinse to V2.
V2—V1-waste, connects test cell to Valve V1 and waste. Reagent, connects test cell to Reagent (alkaline picrate). Blocked, blocks test cell.
Rev.—Revolutions of piston 209 measuring device.

TABLE 2

[Calcium sequencing (Fluorometry 1:4)]

| Valve control count | Valve positions | | Pump 207 | Pump, W.P. | Comments |
|---|---|---|---|---|---|
| | Valve V1 | Valve V2 | | | |
| | Urine or calib | V1 Waste | Off | Off | Valve/Pump positions at end of previous test. |
| 1 | Calib or urine | do | Off | Off | $t_{Ca}=0$, 24 hr. pulse sequence V1 to the calibrate position for $T_{Ca}=3,9,15$ and 21 hrs. V1 is sequenced to urine position. |
| | do | do | Off | On | Flushes lines w/calib or urine. |
| | do | do | Off | Off | |
| | do | do | On (−) 4 Rev | Off | Fills test cell 204a to 4/20 with calib or urine. |
| | do | do | Off | Off | Count turns for switch turns off. |
| 2 | do | Reagent | Off | Off | |
| | do | do | On (−) 16 Rev | Off | Fills test cell 204 w/reagent solution. |
| | do | do | Off | Off | Limit Switch 207b turns off. |
| 3 | Blocked | Mix | Off | Off | |
| | do | Mix | On (+) 20 Rev | Off | Empty test cell 204. |
| | do | Mix | Off | Off | Limit Switch 207b turns off. |
| | do | Mix | On (−) 20 Rev | Off | Fill test cell 204. Mix 1. |
| | do | Mix | Off | Off | Limit Switch 207b turns off. |
| | do | Mix | On (+) 20 Rev | Off | Empty test cell 204. |
| | do | Mix | Off | Off | Limit Switch 207b turns off. |
| | do | Mix | On (−) 20 Rev | Off | Fill test cell 204. Mix 2. |
| | do | Mix | Off | Off | Limit Switch 207b turns off. |
| | do | Mix | On (+) 20 Rev | Off | Empty test cell 204. |
| | do | Mix | Off | Off | Limit Switch 207b turns off. |
| | do | Mix | On (−) 20 Rev | Off | Fill test cell 204. Mix 3. |
| | do | Mix | Off | Off | Limit Switch 207b turns off. |
| | do | Mix | On (+) 20 Rev | Off | Empty test cell 204. |
| | do | Mix | Off | Off | Limit Switch 207b turns off. |
| | do | Mix | On (−) 20 Rev | Off | Fill test cell 204. Mix 4. |
| | do | Mix | Off | Off | Limit Switch 207b turns off. |
| | do | Mix | On (+) 20 Rev | Off | Empty test cell 204. |
| | do | Mix | Off | Off | Limit Switch 207b turns off. |
| | do | Mix | On (−) 20 Rev | Off | Fill test cell 204. Mix 5. |
| | do | Mix | Off | Off | Limit Switch 207b turns off. |
| | do | Mix | On (+) 20 Rev | Off | Empty test cell 204. |
| | do | Mix | Off | Off | Limit Switch 207b turns off. |
| | do | Mix | On (−) 20 Rev | Off | Fill test cell 204. Mix 6. |
| | do | Mix | Off | Off | Limit Switch 207b turns off. |
| | do | Mix | On (+) 20 Rev | Off | Empty test cell 204. |
| | do | Mix | Off | Off | Limit Switch 207b turns off. |
| | do | Mix | On (−) 20 Rev | Off | Fill test cell 204. Mix 7. |
| | do | Mix | Off | Off | Limit Switch 207b turns off. |

NOTE.—Data readout: The calcium fluorometer data and temperature from difference bridge circuits is read into data system.

| Valve control count | Valve positions | | Pump 207 | Pump, W.P. | Comments |
|---|---|---|---|---|---|
| | Valve V1 | Valve V2 | | | |
| 4 | Blocked | V1 Waste | Off | Off | |
| | do | do | On (+) 20 Rev | Off | Empty test cell 204. |
| | do | do | Off | Off | |
| 5 | Rinse | do | Off | Off | |
| | do | do | Off | On | Waste Pump on, flush V1-V2 line. |
| | do | do | On (−) 20 Rev | Off | Fill test cell 204 with rinse fluid. |
| | do | do | Off | Off | |
| 6 | Block | Mix | Off | Off | |
| | do | Mix | On (+) 20 Rev | Off | Flush mixing chamber 208 with rinse fluid from test cell 204. |
| | do | Mix | On (−) 20 Rev | Off | Returns rinse fluid to test cell from mixing chamber 208a. |
| | do | Mix | Off | Off | |
| 7 | do | V1 Waste | Off | Off | |
| | do | do | On (+) 20 Rev | Off | Empty test cell 204, end of sequences. Wait for next sequence initiation pulse at 3, 9, 15, 21 hrs. V1 sequences to urine position for these times. |
| 8 | Urine | do | Off | Off | |

NOTE.—If after the 7th mix the output of the difference detector circuit 225 is above a preset voltage, the following dilution sequence is repeated until the output of the circuit 223 is less than the preset voltage.

3,560,161

TABLE 2.—Continued

| Valve control count | Valve positions | | | Pump, W.P. | Comments |
|---|---|---|---|---|---|
| | Valve V1 | Valve V2 | Pump 207 | | |
| Rinse step | | | | | |
| 9 | Rinse | V1 Waste | Off | Off | |
| | do | do | Off | On | Rinses V1–V2 and waste line of calib or urine prior to emptying test cell. |
| | do | do | Off | Off | |
| Dilution step | | | | | |
| 10 | Block | V1 Waste | Off | Off | |
| | do | do | On (+) 20 Rev | Off | Empty test cell 204. |
| | do | do | On (−) 4 Rev | Off | Fills test cell 204 to 4/20 with 7th mixed sample. |
| | do | do | Off | Off | |
| 2 | Calib or urine | Reagent | Off | Off | |
| | do | do | On (−) 16 Rev | Off | Fills test cell 204 w/reagent solution. |
| | do | do | Off | Off | Limit Switch 207b turns off. |

NOTES.—V1—Connects urine or claibrate or rinse to V2.
V2—V1-Waste, connects test cell to Valve V1 and Waste reagent, connects test cell to Reagent Blocked, blocks test cell
207—Refers to test cell pump.
Rev—Refers to revolutions of test cell piston pump measuring device.
W.P.—Refers to waste pump.

As discussed with respect to FIG. 3, a light source 212 is used for the colorimetric determination, together with a pair of optical filters 214 and 216 so that filtered light is directed through the test cell 304 and through the reference cell 200. Photodiode detector 220 is provided for receiving the filtered light passing through reference cell 200 and the light passing through the set cell 204 is detected by a photodiode detector 218. The test cell 204 also forms a pump chamber for microsyringe pump 207. The reference cell 200 forms a storage compartment for reagent which is forced from its collapsible container into the refernece cell and passage 202 in the analyzer block. Additional optical filters may be provided intermediate the respective cells and their photodiode detectors as described with respect to FIGS. 1 to 4.

To calibrate the analyzer unit shown in FIG. 6, selector valve V1 is rotated to connect the calibrate duct with line 158 and passage 206. Calibrate solution which is also contained in the fluid handling block in a collapsible container is then forced through selector valve V1 into control valve V2 against the entrance to test cell 204. The calibrate solution is treated in exactly the same manner as the urine sample, in that it is mixed with a reagent, and subsequently compared with the pure reagent in the reference cell 200, so that appropriate calibrations may be made. For the creatine and creatinine determinations, the calibrate solution may be pure creatinine which is diluted to provide a known optical density reaction product with the reagent.

For the creatine and creatinine determination, valve V1 is selectively rotated to the "rinse" portion, "urine" position, "calibrate" position and "block" position in that sequence. Simultaneously, the control valve V2 is rotated selectively to the "waste" position, "acid" position, "block" position, "mix" position and "reagent" position. The sequencing of valves V1 and V2 may be varied however dependnig upon the particular constituent being analyzed for and the functions desired to be performed by the instrument.

As shown in FIG. 8, the microsyringe pump 207 is mounted within analyzer block 250 in a sealed manner similar to valves V1 and V2 so that the analyzer is fluid tight.

The test cell 204 is mounted in a stepped cylindrical bore 211 in the analyzer block. Heater elements 252 are wrapped about the test cell, as shown in FIG. 8, for providing maximum efficiency in maintaining a controlled temperature of the liquids within the test cell. Test cell 204 may be composed of a transparent heat resistant material such as Pyrex and the heater elements may be composed of a suitable electrical resistant element such as the alloy "Nichrome."

A tubular bushing 254 is attached to analyzer block 250 by means, for example, of a co-axial sleeve member 256. Bushing 254 and sleeve 256 are also co-axial with test cell 204. Sleeve 256 may be fixedly mounted on the analyzer block 250 by means of set screws 258 or in any other convenient manner.

The large diameter end portion of bore 211 is threaded as shown in FIG. 8. A bored plug 260 is threadably mounted in the larger diameter end of the cylindrical bore 211 of block 250 in a fluid tight manner. The bored plug 260 is in sliding sealing relationship with cylindrical piston 209. Plug 260 may be constructed from Teflon, Kel-F or other chemically resistant material. A pair of limit microswitches 271 and 273 are associated with the end of piston member 209 extending outwardly from the test cell 204. This portion of the shaft carries a pair of annular abutment members 275 and 276 which ride into contact with pivotally mounted limit switch actuators 277 and 279 when the piston 209 has reached its "fill" and "empty" positions in the test cell, respectively, for disenabling the motors.

Fluid is drawn into test cell 204 and is driven out of the test cell by the pump piston 209 through the small diameter bore portion 261 of stepped bore 211. Piston 209 of the microsyringe pump carries an extension 262 at the end thereof for mating with small diameter bore 261 and expelling fluids from the bore to provide accurate control of the quantity of liquids metered into and out of the test cell 204.

A gear 264 is threadably mounted on a threaded portion 209a of the piston 209. The gear is drivingly engaged by a pinion 266 non-rotatably mounted on the shaft of a drive motor 268. The motor 268, the gear 264 and the pinion 266 are mounted in an appropriate drive housing 270. These elements, together with the pump piston 209, bushing 254 and sleeve 256 make up the microsyringe pump assembly 207. Drive motor 268 is electrically controlled to rotate gear 264 either clockwise or counterclockwise so that the piston 209 may be threadedly advanced into and retracted from a test cell 204.

As shown in FIG. 9, the control valve V2 includes a rotor body 300 which carries a series of internal ducts therein. A groove is formed in rotor 300 for receiving a diaphragm 210. A resilient seal 302 extends around the periphery of diaphragm 210 and fits in the groove in the rotor 300. The mixing chamber 208 is enclosed by a cover 304 which fits over seal 302 and the entire assembly is held together by a sleeve 306 which fits over the cover 304 and the rotor 300 in a fluid tight manner. Sleeve 306 is press-fitted into position by means of a friction ring 308 which frictionally engages one end of the sleeve and of the rotor 300. The rotor body and sleeve may be composed of a plastic material such as Kel-F or Teflon. The mixing chamber cover and ring 308 are preferably composed of relatively rigid corrosion resistant materials such as titanium. The diaphragm 210 is constructed from an elastic material such as a medical grade silicone.

Resilient seal 302 is pressed into place by cover 304 for holding the diaphragm firmly in position in the rotor 300 and in contact with the mixing chamber 208. The diaphragm expands and contracts as liquid is pumped into the mixing chamber and withdrawn therefrom so that full mixing of the liquids pumped into the chamber is achieved.

The photodiode detectors 218 and 220 of FIG. 6 may be connected to a ratio bridge circuit, as shown in FIG. 10. In the bridge circuit of FIG. 10, the photodiode detectors 218 and 220 form two of the ratio arms of the bridge. The other arms are formed by reference resistors 310 and 312. Any differences in the signals developed by the reference detectors 220 and the test detector 218 indicates a concentration value for the particular constituent which is readout as an analog electrical signal across the terminals A and B. The resulting signal across A and B is amplified in a data amplifier 313, and the amplified signal is applied to a multiplexer circuit as shown in FIG. 20.

Another bridge circuit may be included in the apparatus which contains a thermistor for sensing the temperature conditions under which the chemical analysis is made (not shown). Such a bridge circuit is substantially the same as that shown in FIG. 10. The resulting temperature indications may be transformed by the bridge circuit into electrical signals and passed on to the multiplexer circuit.

The entire system of this invention is shown schematically in FIG. 11 together with a perspective view of the analyzer unit 150 for the creatine and creatinine analysis and a plan view of the analyzer unit 150a for the calcium analysis. As can be seen from FIG. 11, the apparatus includes a fluid handling block 350 which houses an accumulator and accumulator pump (not shown) for collecting urine and distributing the urine to the analyzer units. The urine samples pass from the fluid handling block 350 through tube 152 to the respective analyzer unit. If the selector valve and control valve of the analyzer unit are oriented to provide a through passage for urine to the test cell, the sample flows into contact with the entrance to test cell 204 (see FIG. 6) and may be metered into the test cell by the respective microsyringe pump of each analyzer unit. The waste products of the analysis are returned to the fluid handling block 350 through the waste tube 172 from the control valves V2 of each analyzer unit. The fluid handling block itself is emptied periodically into a waste tank 352 by means of a valve pump 356.

The various fluid solutions used in the analysis performed by the apparatus are stored in collapsible bags or storage compartments in a fluid storage assembly 358. These solutions include the calibrating solution, the rinse solution, the acid solution, and the reagent solution for each of the analyzer units 150 and 150a. The various fluid transport tubes are connected to the collapsible storage compartments and to the analyzer as shown in FIG. 11. The entire system is enclosed in a pressurized housing so that the internal pressure of the system is about 7 to 14 p.s.i.a. An inert gas such as nitrogen is used to pressurize the system. As described, the fluids are squeezed from their compartments into the analyzer units when the valves are oriented to receive them.

The single fluid storage assembly 358 stores the fluid for both analyzer units 150 and 150a. When refilling of the fluid storage assembly is required, a fluid refill fitting 362 may be removed and new fluid injected into the respective compartment or the compartment itself may be replaced with another collapsible bag containing the desired fluid. Any other convenient method such as gravity flow or an auxiliary pump may be used to transfer the various solutions from their compartments to the test cell. Additionally, the compartments may be rigid rather than collapsible.

The entire system of this invention, as shown in FIG. 11, and including the electronic logic and control circuitry and the data handling block, may be encased within a housing having the following apparatus parameters and power outputs.

Volume: 330 cu. inches
Shape: 5½ "X6" "X10"
Test and reference cell volume: 80 microliters each
Weight: 15 pounds
Peak power: 10 watts
Continuous power: 6.4 watts
Average power: 6.5 watts
Peak power duty cycle: 10%

An apparatus having these dimensions is capable of carrying enough chemical solutions (about 400 ml.) to perform about five chemical analyses per day for a period of about thirty days in a completely automated manner without refilling the solution compartments.

Additional external views of the analyzer unit 150 are shown in FIGS. 12 and 13 to provide a better understanding of the structural relationship of the various analyzer unit components. FIG. 13 shows the analyzer of FIG. 12 rotated 90° to the right and partially disassembled to show the microsyringe pump piston 209 and the chassis 374 for the analyzer and its associated electronic components. As shown in FIGS. 12 and 13, the valve position switches 162a and 162b are mounted in association with one end of the respective valves V1 and V2. The valve drive motors 370 and 372 are drivingly mounted on the opposite ends of the respective selector and control valves V1 and V2 so as to rotate the valves from one position to another during operation of the system in response to commands from the electronic control circuitry.

Referring now to FIG. 13, the microsyringe pump 207 is shown to the right of analyzer unit 150. The piston 209 extends from the pump 207 for insertion into the test cell of the analyzer block when the pump and analyzer are assembled. Both the analyzer and the microsyringe pump are mounted on the chassis 374 to form the creatine and creatinine analyzer unit assembly, as shown in FIG. 3. Chassis 374 also mounts the various electronic components and associated circuitry necessary for operation of the valves and microsyringe pump of the analyzer unit.

The electronic circuitry for the system including the data handling system and programmed sequencing circuitry for the valves V1 and V2 will now be described. The individual gates, counters, comparators, decoders and the like which go to make up the various control systems are in themselves well-known and need not be described in detail herein.

In the following description, the terms "true" and "1" will be used interchangeably and "false" and "0" will be used interchangeably. In the present invention, the "true" logic level is ground potential and the "false" level is a positive potential. All of the logic gates employed in the apparatus to be described are "NAND" gates. A NAND gate will have a "false" output, a "0," when all of its inputs are "true" and will have a "true" output, a "1," when any or all of its inputs are "false." The flip-flops shown in the accompanying drawings will be set true when the signal connected to their one-set input assumes a false level and will be reset false when the signal connected to their zero-set input assumes a false level. The one-shot multivibrators shown will be set true for a predetermined period of time when their input transitions from false to true.

FIG. 14 is a system block diagram for the present invention. Timer 400 provides the overall system coordination and receives an external 24-hour clock pulse and an external 1-hour clock pulse. The timer 400 generates "start" commands for the calcium sequencer control logic 402 and the creatine sequencer control logic 404 at predetermined times under the control of the external clock pulses. The control logic 402 receives a "one-minute"

clock pulse. The control logic 404 receives a "one-minute" clock pulse and a "five-minute" clock pulse. These clock pulses are used by control logic 402 and 404 to sequence particular events once a "start" pulse has been received by the particular control logic from the timer 400.

Immediately preceding each sequence "start" command, the timer 400 interrogates the urine sample control 406. If the control 406 indicates that a predetermined amount of urine has been collected by the fluid handling block over the previous collection period, a urine analysis by sequencer 402 and sequencer 404 will be initiated by timer 400. If, on the other hand, control 406 indicates that an insufficient amount of urine has been collected, the timer 400 will instruct the sequencer 402 and sequencer 404 to perform a "calibrate" analysis during which a calibrate solution is used in lieu of urine. In any event, at a predetermined time the sequencers 402 and 404 are programmed to perform the calibrate sequence regardless of the quantity of urine.

When the timer 400 initiates an analysis by sequencer 402 and sequencer 404, it is inhibited from generating any further "start" commands for the sequencers until the particular analysis has been completed. The sequencers 402 and 404 provide appropriate actuation commands for the various components such as the microsyringe pump assemblies, the waste pump circuit 408 and the data handling system 410.

The timer 400 is shown in detail in FIG. 16. The timer 400 includes a binary counting means comprising flip-flops 430, 431, 432, 433 and 434. Flip-flop 430 has the 1-hour clock pulse input as a "toggle" input. The 24-hour clock pulse input to the timer 400 is a one setting input to the flip-flops of the counting means. When the 24-hour clock pulse is received by the timer 400, from the external source, the counting means is initiated to a predetermined configuration. The flip-flops of the counting means are connected to form a series binary counter. Each one-hour clock pulse received by the counting means, subsequent to the initiation by the 24-hour clock pulse, will cause the counting means to advance one count.

The outputs of the flip-flops in the counting means are connected as inputs to a series of decoding gates 435, 436, 437, 438 and 439. These gates are NAND gates and will have a "0" output when all the inputs are true or "1." Gate 435 will have a "0" output at 0-hour, that is when the 24-hour clock pulse initiates the counting means. Gate 436 will have a "0" output after three one-hour clock pulses have been received by the counting means. In a like manner, gates 437, 438 and 439 will have "0" outputs when the counting means assumes the 9 hour, 15 hour and 21 hour configurations, respectively.

The 1-hour and 24-hour clock pulses are derived from a source external to the present invention and are used to assure that the system is synchronized with events external to the apparatus.

At 0-hour time, the timer 400 will generate a command to the sequencers 402 and 404 (FIG. 14) to cause them to perform a "calibrate" analysis. At the 3, 9, 15 and 21 hour time periods, the timer 400 will generate commands to the sequencers 402 and 404 to perform a urine analysis if a sufficient amount of urine has been collected. If an insufficient amount of urine has been collected, the analyzers will perform a calibrate analysis at these times.

The output of gate 435 is connected as the one-setting input to a flip-flop comprising gates 440 and 442. A "0" output from gate 435 at 0 hour will one-set flip-flop 440, 442. The outputs from gates 436, 437, 438 and 439 are connected as inputs to gate 444. Gate 444 will have a "0" output when all of its inputs are true and a "1" output when any one of its inputs is "0." Gate 444 is an input to inverter 446 and one-shot multivibrator 448. Inverter 446 inverts the output of gate 444 and will zero-set flip-flop 440, 442 when gate 444 has a "1" output. This will occur at the conclusion of each of the 3, 9, 15 or 21 hour test times. Flip-flop 440, 442 then is one-set by gate 435 at 0-hour and will be zero-set by a false output from inverter 446 at the 3, 9, 15 and 21 hour times.

At all times other than the 3, 9, 15 and 21 hour times, gate 444 will have a "0" output. When any of the outputs from gates 436, 437, 438 and 439 becomes "0," gate 444 will transition from a "0" to a "1" output. This transition will set the output of one-shot multivibrator 448 true. The output of one-shot 448 is inverted by inverter 450 and is a one-set input to a flip-flop 440, 442 is also a one-set input to flip-flop 456, 458. Flip-flop 456, 458 then will be one-set at the 0-hour test time due to flip-flop 440, 442 and one-set at the 3, 9, 15 and 21 hour time periods due to the inverter 450. The true output from flip-flop 456, 458 is an input to gate 460. The false output from the flip-flop 456, 458 is an input to gate 462.

The output from inverter 446 is an input to one-shot multivibrator 452. When the output of the inverter 446 changes from a "0" to a "1," the output of one-shot 452 will produce a zero-to-one-to-zero transition. Inverter 454 inverts the transitions from one-shot 452 to one-to-zero-to-one transitions and is used to one-set a flip-flop comprising gates 478 and 480. This setting represents no urine available for test, and occurs one hour after the 3, 9, 15 or 21 hour test time periods have concluded, indicated by the output of gate 444 changing from true to false. Flip-flop 478, 480 will be reset by an input from the urine sample control 406 when a sufficient amount of urine has been collected to allow a urine analysis by the sequencers 402 and 404 (FIG. 14). Flip-flop 478, 480 is then one-set one hour after the 3, 9, 15 and 21 hour test time and will be reset before the next test time if sufficient urine has been collected by the urine sample control 406.

The false output from flip-flop 478, 480 is an input to gate 470. This input to gate 470 is true if a sufficient amount of urine has been collected since the last test time and will be false if an insufficient amount of urine has been collected. Gate 444 is also an input to gate 470 and will be true at the 3, 9, 15 and 21 hour test times. The output of gate 444 is an input to gate 468 and also enables a two-bit binary counter comprising flip-flops 472 and 474. The outputs from the binary counter 472, 474 are an input to gates 476 and 470. At 10 minutes after the test time hour, as, for example, 10 minutes following the initiation of the third hour, gate 476 is enabled. This disables gate 468. Gate 468 is enabled at the beginning of the test time hour and continues until two counts (each occurring at 5-minute clock pulses from the external clock system) have been produced. The 5-minute clock pulses are synchronized with the 1-hour and 24-hour clock pulse inputs to the counting means. Accordingly, five minutes after the gate 468 has been enabled, the 5-minute clock pulse input will become true generating a "0" output from the gate causing the counter 472, 474 to advance one count. When the counter 472, 474 is initiated by the gate 444, the first five-minute clock pulse into the gate 468 will advance the counter one count. In the one count configuration, both flip-flops are false. Gate 470 has the false outputs from the counter 472, 474 as inputs. These inputs will be true five minutes after each test time. The output from gate 470 will be a "0" when all of its inputs are true. That is, five minutes after each test hour gate 470 will have a "0" output if the flip-flop 478, 480 has been reset by the urine sample control 406 indicating that a sufficient amount of urine is present.

At the beginning of the test time hour, flip-flop 456, 458 is reset to the "1" state by gate 450. At five minutes past the test time hour flip-flops 456, 458 will be set to the "zero" state by gate 470. Gate 460 will have a "0" output to gate 464 resulting in a "1" output from that gate if flip-flop 456, 458 is true. Gate 462 will have a "0" output to gate 466 resulting in a "1" output from that gate if flip-flop 456, 458 is false.

The "1" output from gate 464 is an input to the sequencers 402 and 404 and commands them to perform a calibrate analysis. The "1" output from gate 466 is also an input to sequencers 402 and 404 and commands them to perform an analysis on the urine once a "start" command has also been generated by the timer 400.

As has been previously stated, the counter, comprising flip-flops 472 and 474, will be set to a configuration such that gate 476 will have a "0" output after the counter has received two five-minute clock pulse inputs to gate 468. The output from gate 476 is an input to inverter 482. Inverter 482 inverts the "0" from gate 476 to a "1" and applies it as an input to gate 484. The output of gate 484 drives the accumulator motor. When the output from gate 484 is a "0," the accumulator motor will be driven forward, forcing the urine in the accumulator chamber into the lines of the analyzers.

A 1 cc. switch seen in FIG. 16 is associated with the accumulator chamber. The switch will be in the normally open position when the accumulator chamber has a quantity of urine exceeding 1 cc. and will be in the normally closed position when the urine in the accumulator chamber has decreased to a quantity less than 1 cc. The NC and NO poles of the 1 cc. switch are connected as one-set and zero-set inputs, respectively, to a flip-flop comprising gates 486 and 488. The flip-flop 486, 488 will be one-set when there is less than 1 cc. of urine in the accumulator chamber and will be zero-set when there is more than 1 cc. of urine. The output from the flip-flop 486, 488 is an input to gate 490. This input will be a "0" when the flip-flop 486, 488 is false, indicating a quantity of urine in the accumulator chamber exceeding 1 cc., resulting in a "1" output from gate 490. The output from gate 490 is an input to gate 484. Gate 484 will have a "0" output, since both of its inputs are true, to drive the accumulator motor to force urine into the line for the analyzers ten minutes after each test hour if there is more than 1 cc. of urine in the accumulator chamber. Once the accumulator motor has forced a sufficient amount of urine from the accumulator chamber to cause the accumulator dump sense switch to move to its normally closed position, flip-flop 486, 488 is one-set. The true output from flip-flop 486, 488 disables the "1" output from gate 490 which, in turn, disables the "0" output from gate 484 which is driving the accumulator motor.

The output from flip-flop 486, 488 is also an input to gate 494. Gate 494 will have a "0" output to gate 496 when both of its inputs are true. Inverter 482 will have a true input to gate 494 ten minutes after each test hour. A "0" input to gate 496 from gate 494 will cause the output of gate 496 to transition from a "0" to a "1." This transition will cause a one-shot multivibrator 498 to produce a zero-to-one-to-zero transition. The output from one-shot 498 is an input to gate 500. When the input from the one-shot 498 to gate 500 goes true, gate 500 will have a true output. The output from gate 500 represents the "start" command to the creatine sequencer control logic 404.

The output from gate 500 will initiate an analysis by the creatine/creatinine, CR/CR, analyzer 404. The type of analysis is dependent upon the outputs from the gates 464 and 466. If gate 464 has a "1" output, the analyzer will commence a calibrate analysis. If gate 466 has "1" output, the analyzer will commence a urine analysis.

At the 0-hour test time, a calibrate analysis will be commenced by the sequencers 402 and 404 regardless of the amount of urine present in the system and no urine will be delivered at the zero hour. At the 0-hour test time, the flip-flop 440, 442 will be one-set. Accordingly, the output from the flip-flop 440, 442 to gate 496 will be a "0." The "0" input to gate 496 will cause its output to transition from a "0" to a "1" resulting in the output of one-shot 498 producing a transition of zero-to-one-to-zero, enabling the gate 500 to generate the "start" command to the sequencer 404.

To briefly summarize then, at the zero hour test time, the flip-flop 440, 442 will be one-set causing gate 496 to generate a "1" output, enabling gate 500 to generate a "start" command to the sequencer 404. To insure that the calibrate sequence is performed, flip-flop 440, 442 sets flip-flop 456, 458 to the one state. At all other test hours, the flip-flop 456, 458 will be one-set, resulting in a true output from gate 464, unless the flip-flop 478, 480 indicates that a sufficient amount of urine is available to allow the system to perform a urine analysis, in which case flip-flop 456, 458 will be reset five mniutes after the test hour, generating a true output from gate 466. Ten minutes after the test hour, the output from gate 484 will cause the accumulator motor to dump urine into the analyzer lines. The 1 cc. switch will disable the accumulator motor once the quantity of urine in the accumulator chamber has been reduced to 1 cc. and will, at the same time, cause the output of gate 496 to go true, enabling gate 500 to generate the "start" command for the sequencer 404.

The output from gate 496 is also an input to gate 502 and to the one-set input of flip-flop 504. The true output from flip-flop 504 is an input to gate 502. Gate 502 also has the five-minute clock pulse as an input. Accordingly, the output from gate 502 will be a "0" five minutes after the output from gate 496 has gone true, which resulted in the "start" command being generated to the sequencer 404 from gate 500. The output from gate 502 will reset flip-flop 504. The false output from flip-flop 504 will transition from "0" to "1" when the output from gate 502 goes to a "0" resetting the flip-flop 504, causing the one-shot multivibrator 506 to generate a zero-to-one-to-zero transition. The transition pulse from the one-shot 506 is an input to gate 508. Gate 508 inverts the one-shot transition pulse and thus becomes the "start" command to the calcium sequencer 402.

A "0" output from gate 508 will initiate an analysis by the calcium sequencer 402. The type of analysis performed by the sequencer 402 will be determined by the outputs from gates 464 and 466. As was true for the sequencer 404, the sequencer 402 will perform a calibrate analysis if the output from gate 464 is a "1" and will perform a urine analysis if the output from gate 466 is a "1."

It will be seen then that the sequencer 402 is initiated five minutes after the sequencer 404 has been initiated.

The ten minute delay after the test hour has occurred, before the sequencers 402 and 404 may be initiated, is required due to the fact that the external urine source dumps urine into the accumulator chamber each hour on the hour. The ten minute delay following the test time allows the external urine source to complete the urine dump for the hour designated as the test hour.

Referring to FIG. 11, the accumulator chamber and accumulator motor are contained within the fluid sampling block 350. A valve pump 356, external to the experiment package, dumps urine into the accumulator chamber. The accumulator chamber comprises a cylinder having a piston which is driven by the accumulator motor to dump urine into the fluid sampling block 350. The external source generates a signal on line 507, seen in FIG. 16 at the same time the valve pump 356 dumps the urine into the lines up to the accumulator chamber.

The "sample urine input" signal on line 507 assumes a positive potential when the external source indicates that the lines to the accumulator chamber have been flushed with urine. The signal on line 507 resets a flip-flop comprising gates 508 and 510. Line 507 is also an input to gate 512.

When the sample urine input assumes the "0" state and flip-flop 508, 510 is reset, the false output from gate 508 on line 509 is an input to gate 512 and is true when the flip-flop 508, 510 is reset. The third input to gate 512 is the console sample command used only during system tests and will always be true during normal operation. The gate 512 then will have a "0" output to gate 514 when both of its inputs are true. Gate 512, however, will have a "1" output until the "sample urine input" command returns to ground potential. A "0" input to gate 514 causes a "1" output from gate 514 to gate 516. A second input to gate 516 is from gate 476 and will be true during the ten-minute delay following each test hour. It will be recalled that the output of gate 476 will be a "0" only after two five-minute clock pulses have been received by the gate 468. The gate 516 then will have a "0" output during the ten-minute period following each test hour after a sample urine command has been received on line 507. The "0" output of gate 615 will cause the accumulator motor to drive in reverse withdrawing the piston from the accumulator chamber, thus providing a greater volume in the accumulator chamber to receive the urine dumped by the external source. The accumulator motor will continue to drive in reverse until the output from gate 516 becomes a "1."

The cycle switch shown in FIG. 16 is operatively connected to the shaft of the accumulator motor. The no-connection pole, NC, of the cycle switch is a one-setting input to flip-flop 526, 528. The normally opened pole, NO, of the cycle switch is a resetting input to flip-flop 526, 528. When the "sample urine command" on line 507 is received, the cycle switch is in the normally closed position, thus the flip-flop 526, 528 is one-set. When the sample urine command transitions from its plus state to its ground state, driving the accumulator motor in reverse, the cycle switch will move to the normally open position and then return to the normally closed position, during one cycle of the accumulator motor shaft. When the cycle switch is in the normally open position during the driving cycle of the accumulator motor, the flip-flop 526, 528 will be reset. The output from the flip-flop to gate 510 and to the one-set input of flip-flop 508, 510, then, will be a "0," setting the flip-flop 508, 510. The output from gate 508 on line 509 to gate 512 will then become a "0," causing the output of gate 512 to become a "1." The output from gate 514, however, is not altered from its "1" state due to the "0" input from the flip-flop 526, 528. The "1" output from gate 514, therefore, will allow the accumulator drive motor to continue driving until the cycle switch again returns to the normally closed position. At this time, the flip-flop 526, 528 will be one-set, placing a true input to gate 514. Gate 514, at this time, will have both of its inputs true and its output will accordingly change to a "0," disabling gate 516 and consequently the accumulator motor.

When the output from gate 516 transitions from a "0" to a "1," the accumulator motor is de-energized.

Gate 516 is an input to gate 518. Gate 484 also is an input to gate 518. Recall that gate 484 has a "0" output to drive the accumulator motor forward and is a "1" at all other times. The gate 516 has a "0" output to drive the accumulator motor in reverse and is a "1" at all other times. Accordingly, gate 518 will have a "0" output when both of its inputs are true, that is when the forward and reverse drive signals have been removed from the accumulator motor. The output of gate 518 is inverted by inverter 520 to a "1." When the output of inverter 520 transistions from a "0" to a "1," the output of one-shot multivibrator 522 is set true. The output of one-shot 522 is inverted to a "0" by inverter 524 and actuates a dynamic braking means to stop the accumulator motor rotation immediately.

The flip-flop 508, 510 is reset by the "sample urine command" when the external urine source commands the experiment package to accept urine and is set by the cycle switch once the accumulator motor has withdrawn the piston within the accumulator chamber a sufficient distance to accommodate the additional urine. The true output of the flip-flop 508, 510 then is true for each sample accepted by the apparatus. The output of this flip-flop is connected as an input to a binary counter in the data handling package, which will be discussed hereinafter. Each sample of urine accepted by the apparatus will accordingly cause the counter in the data handling package to advance one count. This counter has a decoding means associated with it such that an output is generated by the decoding means when two or more urine dumps have been accepted by the apparatus. The output from this decoding means is the input to flip-flop 478, 480 and will cause that flip-flop to be reset when the apparatus has accepted two or more urine dumps from the external source. Recall that the false output from the flip-flop 478, 480 indicates whether an adequate amount of urine is present in the system to allow a urine analysis.

Figure 17B:
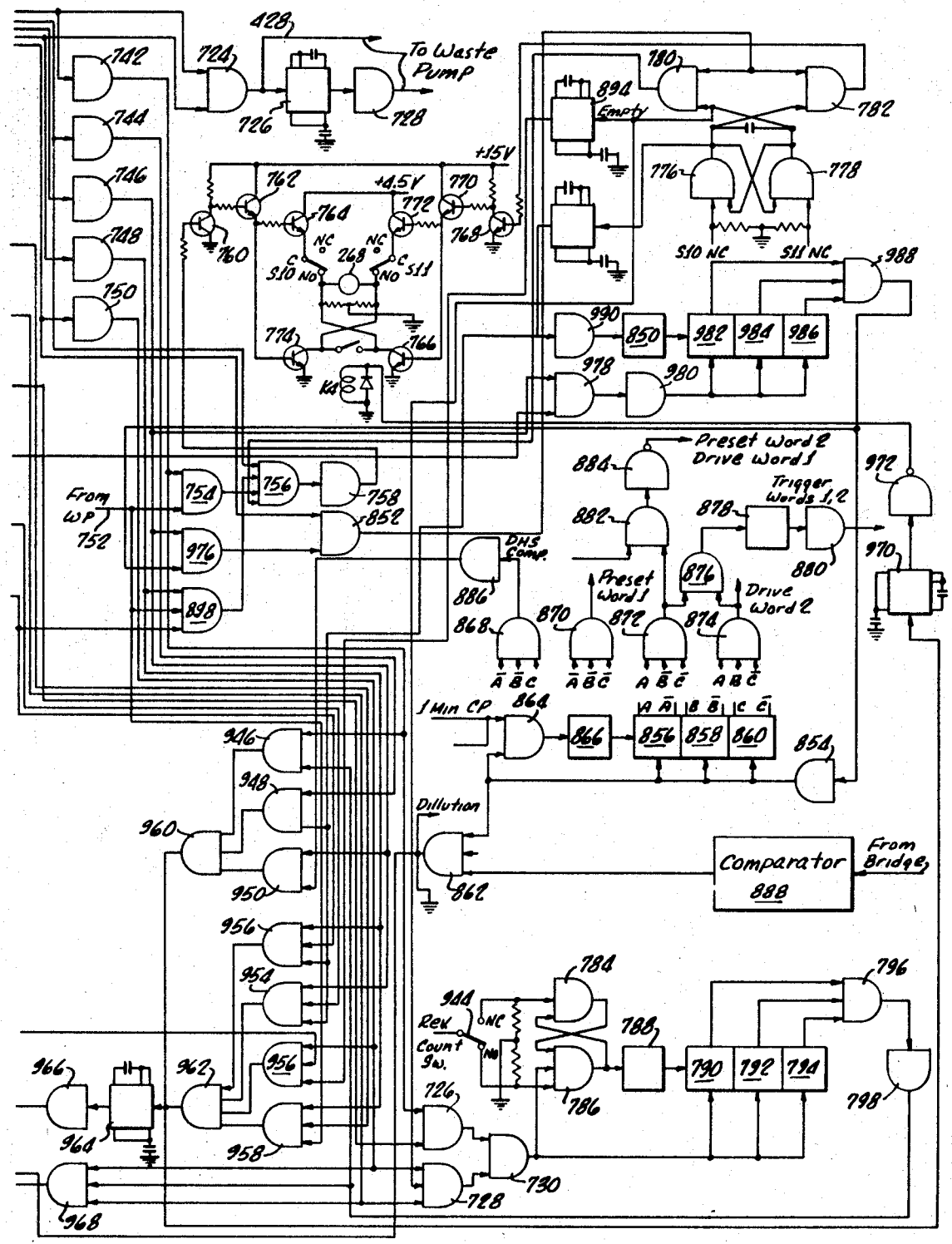

The logic control circuitry for the calcium sequencer 402 is shown in FIGS. 17A and 17B. The calcium logic control circuitry of FIG. 17A includes a valve control counting means comprising flip-flops 612, 614, 616 and 618. These flip-flops are interconnected to count as a binary counter. An output from one-shot 622, when transitioning from zero-to-one-to-zero, will advance the counting means from one count configuration to the next.

The counting means is preset to a particular count configuration by gating means including NAND gates 600, 602, 604, 606, 608 and 610. The calcium sequencer "start" command generated by the timer 400 in FIG. 16 is an input to gate 600. The "start" command is a "0" or false signal input to gate 600 and results in a true output from that gate. Inverter 602 inverts the true output to a false signal input to gate 604 and flip-flop 618 in the counting means. The false input to gate 604 causes a true output which is inverted by the inverter 606 to a false signal and connected as an input to flip-flop 612 and 616 in the counting means and is an input to gate 608. The false input to gate 608 generates a true output from the gate which is inverted by inverter 610. The output of inverter 610 is an input to flip-flop 614. All the flip-flops in the counting means, then, will be one-set when the "start" command is received by gate 600 from the timer 400.

The outputs of the flip-flops in the counting means are connected to a decoding means including a plurality of NAND gates 624, 626, 628, 630, 632, 634, 636, 638, 640 and 642. These decoding gates will generate a false output for particular count configurations of the counting means. Gate 624 will generate a false output for the first count configuration, VC1, of the counting means. Gate 626 will generate a false output for the second configuration, VC2, of the counting means, and so on.

Each of the valves V1 and V2 has an index switch associated with it. Referring to FIG. 8, the index switch associated with the valve V2 is represented by block 162. This switch is shown in FIG. 17A as disc 672. The index switch associated with valve V1 is shown as disc 670. Motor M1 positions valve V1. Valve V2 is positioned by motor M2. One side of the armature windings of each of the motors is connected to a positive potential. The other side of the armature windings is connected to the discs 670 and 672 for the respective valve motors. The motor associated with each valve will be actuated to drive the valve and the corresponding index disc when one of the input contacts to the valve disc is at ground potential, completing the circuit for the motor armature windings. The motor will continue to drive the valve until the ground connection is broken. The ground connection for each valve disc will be broken when the slot, seen in the valve disc, has rotated to the contact supplying the ground for the motor. For example, the valve disc 670 has four input connections: "urine," "calibrate," "block" and "rinse." The valve V2 has three input connections: "V1 waste," "reagent" and "mix." The ground potential for each input connection to the valve discs 670, 672 is supplied when a transistor switch associated with each input connection is turned on. The transistor switch will be turned on when the emitter follower associated with it has a positive potential output, forward biasing the base to emitter of the transistor. For example, the transistor switch associated with the "urine" input connection to the valve disc 670 will be turned on, placing a ground potential on the "urine" input when the emitter follower 674 has a positive output. The emitter followers 674 through 686 will have positive potential outputs for particular configurations of the counting means as decoded by the decoding gates 624 through 642.

The "urine" command signal generated by the gate 464 of timer 400 in FIG. 16 is an input to the sequencer 402 on line 645 to gate 646. The "calibrate" command from the timer 400 generated by gate 464 is an input to the sequencer 402 on line 647 to gate 648. The "start" command from the timer 400 as previously discussed, is an input to gate 600 and will result in the flip-flops of the valve control counting means 612 through 618 being one-set. Gate 624 will have a false output when the counting means assumes this initial VC1 configuration. The output of gate 624 is inverted true by inverter 644. The true output from inverter 644 is an input to both gates 646 and 648. If the timer 400 has determined that a sufficient amount of urine is present, the "urine" command on line 645 will be true, and, accordingly, the output of gate 646 will be false. If, however, an insufficient amount of urine is present in the accumulator chamber or it is the 0-hour test time, the "calibrate" command on line 647 will be true and gate 648 will therefore have a false output. The false output of gate 648 is a positive potential amplified by the emitter follower 676 turning on the transistor switch associated with it and, accordingly, placing a ground potential on the "calibrate" input to the valve disc 670. The output of gate 646 will be false when the "urine" input on line 645 is true for the first count configuration of the counting means. The output of gate 646 is an input to gate 650. Gate 650 will have a true output when either of its inputs are false. The output of gate 650 is an input to gate 652. Gate 652 will have a false output causing the transistor associated with the urine input to the valve disc 670 to turn on supplying a ground for the input.

When the "start" command is generated by the timer 400 and received by the sequencer 402, then, the counting means is initiated to a first count configuration and the valve V1 is positioned to either the "calibrate" or the "urine" position, depending upon the state of the signals on lines 645 and 647.

The output from gate 624 for C1 is also an input to a flip-flop comprising gates 688 and 690. The false output of gate 624 will one-set the flip-flop 688, 690. The false output of the flip-flop is an input to gate 508 in FIG. 16. This input to gate 508 disables the gate preventing subsequent "start" commands to the sequencer 402 until the analysis by the sequencer has been completed and the flip-flops 688, 690 reset. The true output from the flip-flop from gate 688 is connected to the calcium test cell heater control to maintain a predetermined temperature in the test chamber.

The output from gate 624 is also an input to gate 658. The false output from gate 624 will cause a true output to be generated by gate 658. Inverter 666 inverts the output from gate 658 to a false signal, causing emitter follower 682 to turn on the transistor switch associated with the "V1 waste" input to valve disc 672.

For VC1 then, the valve V1 is positioned to either the "urine" or the "calibrate" positions, depending upon the inputs from the timer 400 and the valve V2 is positioned to the "V1 waste" position.

A valve decoding means comprising NAND gates 706, 708, 710, 712, and 714 is provided to generate signal outputs corresponding to the particular positions of the valves V1 and V2. For example, gate 706 will have a false output when the valve V1 is in either the "calibrate" or "urine" position, and valve V2 is in the "V1 waste" position.

The ground potential placed on the "urine" input to the valve disc 670 is also an input to the inverter 700. The ground placed upon the "calibrate" input to the disc 670 is an input to inverter 702. These inverters will invert their ground input (a logical "1") to a false output (a logical "0") as an input to gate 704. When either of these inverters has a false output to gate 704, gate 704 will have a true output to gate 706. Gate 704 will have a true output, then, when either the "urine" or the "calibrate" input to the disc 670 is at ground. The ground potential placed upon the "V1 waste" input to disc 672 is also an input to gate 706 and will be a "1" when the transistor associated with that input is turned on. A third input to gate 706 is generated by the gate 638 and will be a "1" for all valve control counting means configurations except the number 8 count. The fourth input to gate 706 is generated by inverter 698. Inverter 698 will have a true output once the valves V1 and V2 have completed their rotation to their designated valve positions. Gate 692 has four inputs corresponding to the input lines to the disc 670. Gate 694 has three inputs corresponding to the input connections to the valve disc 672. When one of the input connections to any of the valve discs is placed at ground potential by the associated transistor switch, that potential is common to all of the input connections for that particular valve disc; that is, when the "urine" input for disc 670 is driven to ground, the other three input connections to the disc also assume a ground potential since they are connected to the valve disc. Therefore, all four inputs to gate 692 will be true and a false output is generated by the gate. When the valve has rotated to the "urine" position and the ground on the "urine" connection is broken by the slot, the remaining inputs to the disc will then assume a positive potential sensed through the armature windings of motor M1. When any of the inputs to gate 692 assumes a positive potential, the output will be a "1." In a like manner, gate 694 will have a "1" output when the valve V2 has rotated to its designated position. When valve motor M1 is rotating disc 670, all inputs to gate 692 will be true and the output of gate 692 will be false. Correspondingly, the output of gate 698, which is an input to valve position gates 706, 708, 710, 712 and 714, will be false disabling all valve position gates. In a like manner, when valve motor M2 is rotating disc 672, the valve position gates will be disabled by means of gate 694. Gates 692 and 694 are inputs to gate 696. When both of these input gates are true, the gate 696 will generate a false output which is inverted by inverter 698 to a true signal. The true signal from 698 is then placed as an input on each of the decoding gates 706-714 and will enable an output from whichever gate corresponds to the particular valve position assumed.

Dynamic braking of the motors M1 and M2 is provided to assure that the motors stop immediately as soon as the valves V1 and V2 have assumed the desired position. The armature winding of motor M1 is shorted by the contacts of relay K5 and the armature winding of motor M2 is shorted by the contacts of relay K6. When the output of gate 692 transitions from a "0" to a "1", one-shot 718 goes through a zero-to-one-to-zero transition for a predetermined period of time. Inverter 722 inverts the "1" output from one-shot 718 and actuates the relay K5. In a like manner, when the output from gate 694 transitions from a "0" to a "1," relay K6 is actuated. The outputs from gates 692 and 694 transition from a "0" to a "1" as soon as the valves have assumed the desired valve position.

The outputs from the valve control counting means decoding gates are inputs to inverters 730–740. These inverters will have a true output when the corresponding decoding gate has a false output. For example, inverter 734 will have a true output for VC1 as indicated by a false output from gate 624.

The outputs of the valve decoding gates 706–714 are inverted by inverters 742–750. Inverter 742 will have a "1" output when the V1 valve is in the "calibrate/urine" position and the valve V2 is in the "V1 waste" position, as indicated by a false output from gate 706.

As previously discussed, gate 706 will have a false output during VC1. This output is an input to gate 724 and will result in a true output from that gate. When the output of gate 724 transitions from false to true, the output of one-shot 726 will be set true. Inverter 728 inverts the true output from the one-shot 726 to a false signal. The false signal, a positive potential, is applied to the waste pump, as will be described hereinafter, to cycle the waste pump a predetermined period of time. When the waste pump cycle is complete, a true signal will appear on line 752. Gate 754 has an input from the inverter 742 and an input from the line 752. A false output will be generated by gate 754 when the inverter 742 has a true output and the signal on line 752 is true. A false output from gate 754 will cause a true output from gate 756 which is inverted by inverter 758 to a "0" and applied to the base of transistor 760 turning it on.

Motor 268 seen in FIG. 17B is a schematic representation of the microsyringe pump motor 268 seen in FIG. 8. When the motor 268 is actuated, the piston 262 is either withdrawn from the test chamber or extended into the test chamber, depending upon the direction of rotation of the motor 268. Switches S10 and S11 are associated with the motor 268 and its driving mechanism for the piston 262 and define the terminal positions of the piston 262. Each switch has a normally open and a normally closed pole. The switch S10 is normally open when the piston 262 has been completely extended into the test chamber. Switch S11 is in its normally open position when the piston 262 has been completely withdrawn from the test chamber.

Associated with the motor 268 is a complementary drive means comprising transistors 760, 762, 764 and 774 to drive the motor 268 so that the piston 262 is withdrawn from the test chamber and transistors 768, 770, 772 and 766 to drive the motor 268 so as to extend the piston 262 into the test chamber. When inverter 758 generates a "0" output, turning on transistor 760, a ground is placed on the base of transistor 762 which turns on due to the plus potential on its emitter. The plus potential on the emitter of transistor 762 is therefore placed on the base of transistor 764 and transistor 774, turning both of these transistors on. When transistor 764 is turned on, the plus potential on its collector is placed on the armature winding of motor 268 through switch S10 to ground through conducting transistor 774. The motor 268 will continue to drive to withdraw the piston 262 from the test chamber until the output of inverter 758 goes true, or, the piston 262 is withdrawn to its terminal position so as to move the switch S10 from its normally open to its normally closed position breaking the drive circuit for the motor 268. Whenever the motor stops relay K4 is actuated shorting the armature windings of the motor 268 dynamically braking it. When the piston 262 has been completely withdrawn from the test chamber, opening the switch S10, the limit switch S11 is correspondingly positioned in its normally opened position allowing the transistors 768, 770, 772 and 766 to drive the motor in its opposite direction, extending the shaft 262 into the test chamber, when a "0" signal is placed upon the base of transistor 768 from gate 782.

Metering means is provided by the present invention to extend or withdaw the piston 262 from the test chamber a predetermined amount and includes, in addition to the motor 268 and its associated circuitry, a revolution count switch 944. The switch 944 is operatively connected to the driving mechanism for the piston 262 and has a normally opened and normally closed position. For each revolution of the driving means moving the piston 262 a predetermined distance, the switch 944 will cycle from its normally opened position to the normally closed position and back to the normally opened position. A flip-flop comprising gates 784 and 786 will be set when the switch 944 is in its normally closed position and will be reset when the switch 944 is in its normally opened position. As the piston 262 is withdrawn from the test chamber, the switch 944 is moved to the normally closed position one-setting flip-flop 784, 786 and returns to the normally opened position, resetting flip-flop 786 after a predetermined distance has been travelled by the piston 262.

The output from flip-flop 784, 786 is an input to clock driver 788. When the switch 944 returns to the normally opened position, resetting the flip-flop 784, 786, the false output from the flip-flop will transition from a "0" to a "1" setting the output of clock driver 788 true for a period of time. The output from the clock driver 788 is an input to a revolution counting means comprising binary counter assembly 790, 792 and 794. Each cycle of the switch 944 will result in a true output from the clock driver 788 for a predetermined period of time after which the output from the clock driver will again assume a "0" state. Each time the clock driver 788 assumes a "0" state, the counting means will advance one count in configuration.

The counting means comprising flip-flops 790, 792 and 794 is preset to an initial count configuration by a "0" output from gate 730. Gate 730 will also initiate the flip-flop 784, 786. Gate 728 will generate a true output to the gate 730 for all configurations of the valve control counting means except valve count 10. Gate 726 will generate a true output to gate 730 except in VC1 after the valves V1 and V2 have assumed the "calibrate/urine" and "V1 waste" valve positions, respectively. Therefore, in VC1, gate 726 will have a true output until the valves V1 and V2 have rotated to their designated valve positions. Accordingly, gate 730 will have a false output (until the output of gate 726 becomes false) presetting the counting means and the flip-flop 784, 786.

After the microsyringe pump motor 268 has made four revolutions, withdrawing the piston 262 from the test chamber a predetermined distance, the counting means comprising flip-flop 790, 792 and 794 will assume a four-count configuration. A decoding means comprising gate 796, will generate a false output when the counting means has assumed the four-count configuration. Inverter 798 inverts the false output from gate 796 to a true signal, which is connected as an input to gate 946. Gates 946 through 958 comprise a gating means responsive to particular actions taken by the sequencer 402 after the valves V1 and V2 have assumed particular positions and generate outputs to advance the valve control counting means one count. Gate 946 has an input from inverter 798 and inverter 742. A false output will be generated by gate 946 when the output from inverters 742 and 798 are true, that is, when the valves V1 and V2 are in the "calibrate-urine/V1 waste" position and the true output from inverter 798 indicates that the piston 262 has been withdrawn the predetermined amount from the test chamber. The output of gate 946 is an input to gate 960. A false output from gate 946 will cause a true output to be generated by gate 960. Gate 960 is an input to one-shot multivibrator 964. When the output of gate 960 transitions from a "0" to a "1" the one-shot 964 generates a zero-to-one-to-zero transition of predetermined duration which is applied to inverter 966. Inverter 966 inverts the signal from one-shot 964 and applies it to clock driver 622. The output of clock driver 622 is an input to the valve control counting means comprising the flip-flops 612 through 618. The valve counting means is advanced one count each time the output from clock driver 622 transitions from a "0" to "1."

The output from gate 960 is also an input to one-shot multivibrator 970 in FIG. 17B. The "0" to "1" transition of gate 960 output will one-set the one-shot gate 970 for a predetermined duration which generates a false output from inverter 972. This energizes relay K4 so as to provide dynamic braking for the microsyringe motor 268.

Referring now to the calcium sequencing Table 2, the above-described action can be seen in tabular form. The left-hand column of the Table 2 entitled, "Valve Control Count" represents the count configurations of the valve control counting means. When the valve control counting means is set to its first count configuration by the timer 400, the valve V1 can be seen to be positioned to the "calibrate-urine" position and valve V2 set to the "V1 waste" position. The waste pump motor is then turned on, by the output of inverter 728, to flush the line with either calibrate or urine fluid. The microsyringe pump motor 268 is then turned on for four revolutions after the waste pump motor has cycled to withdraw the piston 262 from the test chamber a predetermined distance filling the test chamber with a metered amount of either the calibrate or urine fluid. The microsyringe motor 268 is then turned off after the gate 796 indicates that four revolutions have been completed causing the relay K4 to dynamically brake the motor 268 and advancing the valve control counting means to a two-count by the clock driver 622.

Referring now to FIG. 15, a schematic of the waste pump motor and its associated electronics represented by block 408 in FIG. 14 is shown. This circuit includes a motor M3 which drives the waste pump of the system. The waste pump is used to pump the calibrate urine or rinse solutions into and out of the systems lines.

The output of inverter 728, FIG. 17B, is an input to gate 411, A false output from the inverter 728, indicating a command by the calcium sequencer 402 for the waste pump to cycle, will cause gate 411 to generate a true output to one-shot 412. Gate 414 has an input on line 413 from the creatine sequencer 404. The signal on line 413 will be true at all times except when the valve counting means in the creatine sequencer 404 is in the ten-count configuration. Gate 414 then will generate a "zero" output whenever the one-shot 412 is pulsed by the gate 411. The output of gate 414 is connected to the base of transistor 415, turning it on. The plus 4 v. potential on the collector of transistor 415 is applied to the base of transistor 416 to turn it on when transistor 415 is on.

A cam lobe is attached to the shaft of motor M3. A cam lobe switch 417 having a normally open pole and a normally closed pole is positioned with respect to the cam lobe such that one complete rotation of the motor shaft will cause the switch 417 to move from the normally closed position to the normally opened position and then return to the normally closed position. One side of the armature winding for motor M3 is connected to a positive potential and the other side to the common pole of the switch 417. The collector of transistor 416 is also connected to the common pole of the switch 417. When the transistor 416 is turned on, a ground is provided for the motor M3 armature winding thus actuating the waste pump motor causing the motor shaft to rotate. As the motor shaft rotates, the cam lobe will move the switch 417 to its normally opened position which has a connection to ground. During the period of time that the switch 417 is connected to its normally opened position, the transistor 416 will be turned off removing the ground that it provided due to the output of one-shot 412 returning to a "zero" state. The motor M3 will continue to rotate until the switch 417 is returned to its normally closed position by the cam lobe thus disconnecting the ground provided by the normally opened pole.

The common pole of the switch 417 is connected to inverter 420 and will be in a "one" state so long as the transistor 416 is on or the switch 417 is in the normally opened position. When the motor M3 has completed its rotation and the switch 417 returns to its normally closed position, the common pole of the switch will then assume a positive potential, a "0," due to the positive potential connected to the other side of the armature windings of motor M3. The inverter 420 then will have a "0" output so long as the motor is rotating. As soon as the motor M3 has completed its rotation, the output of the inverter 420 will return to a "1" state.

The output from inverter 420 is an input to gates 422 and 430. A second input to gate 422 is generated by the output of gate 724, seen in FIG. 17B, on line 428. The signal on line 428 will be true when the valves V1 and V2 are in the "calibrate-urine/V1 waste" position, respectively. The output of gate 422 is an input to inverter 426. Inverter 426 will generate a "1" when the output of gate 422 is in a "0" state. The output of inverter 426 is an input to the calcium sequencer 402 on line 752, seen in FIG. 17B.

In a like manner, when the creatine sequencer 404 directs the waste pump 408 to cycle by placing a "0" input to gate 411 the motor M3 will rotate one cycle. Inverter 420 will generate a "0" output to gate 430 during the rotation of motor M3. The output inverter 420 will return to a "1" state once the motor rotation has been completed and gate 430 will generate a "0" output to gate 432. Gate 432 will have a "0" output during the motor rotation and will assume "1" state upon the completion of the cycle.

Referring again to FIGS. 17A and 17B in conjunction with the calcium sequencing table, Table 2, in column 19, it will be recalled that the valve control counting means was advanced from its one-count configuration to the two-count configuration by the clock driver 622 after the waste pump was cycled and the piston 262 withdrawn the predetermined distance from the test chamber. Gate 626 then generates a false output when the valve control counting means assumes its two-count configuration. The output of gate 626 is an input to gate 644 and will result in valve V1 remaining in the calibrate-urine position as it was for the one-count configuration. Gate 626, however, will cause the valve V2 to rotate to the "reagent" valve position. The positive potential generated by the false output of gate 626 is applied to the emitter follower 684. The emitter follower 684 will turn on the transistor switch associated with the "reagent" input connection to the valve disc 672.

When the valve V2 has completed its rotation, gate 708 will generate a false output indicating that the valve V1 is in the "calibrate-urine" position and valve V2 is in the "reagent" position. The output gate 708 is an input to gate 756, in FIG. 17B. The false input to gate 756 will result in a true output from that gate which is inverted false by inverter 758 and applied to the base of transistor 760. The microsyringe motor 268 will then be turned on, as described above, to further withdraw the piston 262 from the test chamber.

As previously discussed, the limit switches S10 and S11, associated with the microsyringe pump motor 268 and piston 262, are positioned to their normally opened or normally closed poles as determined by the location of the piston 262 within the test chamber. Limit switch S10 will be in the normally opened position when the piston 262 has been completely extended into the test chamber, and will be positioned in its normally closed position when the piston 262 has been completely withdrawn from the test chamber. Switch S11 will be in its normally closed position when the piston 262 has been completely extended into the test chamber and will be moved to its normally opened position only after the piston 262 has been completely withdrawn from the test chamber.

The piston 262 was completely extended into the test chamber when the analyzer 402 was originally initiated by the timer 400. In the first count configuration of the valve control counting means, the piston 262 was withdrawn four revolutions from the test chamber. There are twenty revolutions of the microsyringe pump motor 268 between the terminal positions of the piston 262. Accordingly, then, when the valve control counting means leaves the one count configuration and assumes a two count configuration, the microsyringe pump motor 268 must be driven the remaining sixteen revolutions in order to completely withdraw the piston 262 from the test chamber and move the limit switches S10 and S11 to their complementary positions. Associated with the limit switches S10 and S11 is a flip-flop comprising gates 776 and 778. The one-set input to flip-flop 776, 778 is connected to the normally closed pole of switch S10. The reset input of the flip-flop is connected to the normally closed pole of switch S11. When the piston 262 has been completely withdrawn from the test chamber and the switch S10 moved to its normally closed position, a positive potential through conducting transistor 764 will one-set the flip-flop 776. The true output from the flip-flop 776, 778 is an input to one-shot multivibrator 974. When the flip-flop 776, 778 is one-set by the piston 262 reaching its terminal position, the output of the one-shot 974 will produce a zero-to-one-to-zero transition. The output from the one-shot 974 is an input to gate 948. The second input to gate 948 is generated by the inverter 744. Gate 948 will generate a false output to gate 960 when both of its inputs are true. The false input to gate 960 will cause it to generate a true output. One-shot 964 is thereby pulsed to go through a zero-to-one-to-zero transition and advance the valve control counting means to its three-count configuration by way of gate 966 and clock driver 622.

In the three-count configuration of the valve control counting means, valve V1 is positioned to its "blocked" valve position by a false output from gate 628 to gate 654. A false input to gate 654 will cause it to generate a true output which is inverted by inverter 662 to emitter follower 678. Emitter follower 678 generates a positive potential turning on the transistor switch associated with the "blocked" input connection to the valve disc 670. Valve V2 is positioned to its "mix" position by gates 628, 660, inverter 668 and emitter follower 686. Gate 710 generates a false output as soon as valves V1 and V2 complete their rotation to the desired valve positions. The output of gate 710 is inverted by inverter 746 and connected as an input to gates 976, 978, 950 and 954.

The false output of valve control counting means decoding gate 628 is inverted true by inverter 736 and connected as an input to gate 978. In the three-count configuration of the valve control counting means, gate 978 will have a false output which is inverted true by inverter 980 to enable mix counting means comprising flip-flops 982, 984 and 986. The true output from inverter 980 will set the flip-flops of the counting means to a "0" count configuration.

Decoding gate 988 decodes the output from the flip-flops of the mix counting means and will generate a false signal when the mix counting means indicates a seven-count configuration. The gate 988 will have a true output for all other count confiurations. The output of gate 988 is an input to gate 976. Gate 976 will have a false output to gate 852 since both of its inputs are true. A false input to gate 852 will cause it to generate a true output which is connected as an input to gates 780 and 782. The true output from flip-flop 776, 778 is an input to gate 782 and the false output from the flip-flop is an input to gate 780. Gate 780 will generate a false output when the flip-flop 776, 778 is reset and the input from gate 852 is true. Gate 782 will generate a false output when the flip-flop 776, 778 is one-set and gate 852 is true. Recall that in the two-count configuration of the valve control counting means, the flip-flop 776, 778 was one-set when the piston 262 was completely withdrawn from the test chamber; therefore, gate 782 will generate a false output to the base of transistor 768, turning it on.

As previously discussed, when transistor 768 is turned on, the microsyringe pump motor 268 will be driven forward, driving the piston 262 into the test chamber until the limit switches S10 and S11 are moved to their complementary positions, removing the forward drive potential from the motor 268. When the piston 262 has reached its terminal position in the test chamber, the flip-flop 776, 778 will be reset, causing the output from gate 782 to go true and the output from gate 780 to go false. The output of gate 780 is an input to gate 756. A false output from gate 780 will generate a true output from gate 756 which is inverted false by gate 758, causing transistor 760 to turn on, resulting in the microsyringe pump motor 268 withdrawing the piston 262 from the test chamber. When the piston 262 assumes its terminal position withdrawn from the test chamber, the flip-flop 776, 778 will be one-set, causing gate 782 to again assume a false output to drive the pump motor 268 in its forward direction.

Each time the flip-flop 776, 778 is one-set, the output of one-shot multivibrator 974 will produce a zero-to-one-to-zero transition for a predetermined period of time. The output from one-shot 974 is inverted by inverter 990 and is connected as an input to clock driver 850. When the one-shot 974 assumes a false output, a predetermined period of time following its one-setting input, inverter 990 inverts this output true one-setting clock driver 850. The output of clock driver 850 is an input to the mix counting means. Each time the clock driver 850 assumes a true state, the counting means is advanced one count configuration. Accordingly, for each cycle of the piston 262 in the test chamber, causing the flip-flop 776, 778 to toggle from true to false, the mix counting means will be advanced one count configuration. When seven mix cycles have been completed, gate 988 will generate a false output to gate 976 and inverter 854. A false input to gate 976 from gate 988 will disable the complementary microsyringe motor drive gates 780 and 782.

The output of inverter 854 is an input to gates 862 and 864 and to the data handlying system counter comprising flip-flops 856, 858 and 860. A false output from inverter 854 presets the counter to a "0" count configuration. Inverter 854 will have a false output whenever gate 846 has a true output. The mix counter then will be preset to a zero count configuration before the mix counting means assumes a seven count configuration causing gate 846 to genertae a false output.

Gate 864 has a "one-minute" clock pulse input from a source external to the present invention. The output of gate 864 will one-set one-shot 866 when it transitions from false to true. One-shot 866 is connected to the counter comprising flip-flops 856, 858 and 860. Each time a one-minute clock pulse is received by gate 864, the counter will be advanced one count configuration.

Decoding means comprising gates 868, 870, 872 and 874 are connected to the counter and will generate false outputs for particular count configurations. Gate 870 will generate a false output when the counter is initialized by the inverter 854. Gates 872, 874 and 868 will generate false outputs for the one, two and three count configurations of the counter, respectively. The outputs of the gates 870, 872 and 874 are control commands to the data handling system, seen as block 410 in FIG. 14. The output of gate 870 is a direct input to the data handling system 410. The output of gate 872 is an input to gate 882. A false input to gate 882 when the counter is in the second count configuration, will cause the gate to generate a true output which is inverted false by inverter 884. The output of inverter 884 is an input to the data handling system 410. Gate 872 and gate 874 are both inputs to gate 876. When the output of either gate 872 or gate 874 is false, gate 876 will have a true output one-setting one-shot 878. The output of one-shot 878 is inverted by 880 and connected as an input to the data handling system 410. The output of gate 874 is also a direct input to the data handling system 410. The functions of these inputs to the data handling system 410 will be discussed hereinafter. Briefly, however, the outputs of gates 870–874 precondition the data handling system 410 to receive the analog input signals from the difference bridge circuit 76, seen in FIG. 2, for the calcium sequencer 402.

Gate 868 will generate a false output when the counter assumes its terminal count configuration. The output of gate 868 is inverted by inverter 866 and is connected as an input to gate 950. Gate 950 will have a false output when both of its inputs are true, causing gate 960 to generate a true output to one-shot 964 which will result in the valve counting means advancing one count configuration to the four count.

Referring again to the calcium sequencing Table 2, the above-described logical sequence can be seen in chart form for the valve control count three. When the valve control counting means assumes the three count configuration, the valves V1 and V2 are rotated to the "block" and "mix" valve positions, respectively, and the microsyringe pump motor is turned on, driving the piston 262 forward to empty the test cell, then reversed to fill the test cell. At the completion of seven "Mix" cycles, the data handling system 410 is preconditioned to accept the analog data from the difference bridge circuit 76 as previously described.

During the three count configuration of the valve control counting means, the analog signal output from the difference bridge circuit 76 is connected as an input to comparator circuit 888. Comparator 888 compares the input signal from the bridge 76 to a reference voltage, for example, 4.7 volts, and generates a true output if the bridge input is equal to or exceeds that reference voltage. A true output from the comparator 888 indicates that the data output from the bridge approximates the maximum output capability of the bridge circuit 76. If the voltage output from the bridge circuit 76 approaches the maximum possible output, it is possible that the solution being tested in the test chamber has a greater amount of the constituents being tested for than is being indicated by the bridge circuit 76. Accordingly, then, the sequencer 402 will further dilute the fluid being tested in the test chamber to reduce the concentration of the constituent in the test fluid so that a voltage output from the bridge circuit 76 will reflect accurately the concentration of the constituent.

Gate 862 will generate a false output when the compartor 888 input is true and the input from inverter 854 is true, indicating that the mix cycle has been completed. A third input is applied to gate 862 returning from data handling system indicating that a second dilution is required. The third input to gate 862 inhibits any further false transitions from gate 862. The output of gate 862 is an input to the data handling system 410 and records the fact that a dilution of the test fluid is necessary. Gate 862 is also an input to gates 890 and 604. A false input to gate 890 will result in a true output from the gate which is inverted by inverter 892 to a false signal and is connected to the reset input of flip-flop 618. A false input to gate 604 will result in a true output from the gate which is inverted false by inverter 606 and connected to the one-set input of flip-flops 612 and 616. The false output from inverter 606 is an input to gate 608 resulting in a true output from that gate, which is inverted false by inverter 610 and connected to the one-set input of flip-flop 614.

A false output from gate 862, indicating that the test fluid in the test chamber must be diluted, then will result in the valve control counting means being set to a nine count configuration.

Referring to the calcium sequencing, Table 2, in column 19, it can be seen that in the nine count configuration, the valves V1 and V2 are positioned to the "rinse" and the "V1 waste" valve positions. For this configuration of the valves, gate 712 of the valve decoding means will generate a false output. The output of gate 712 is inverted true by inverter 748 and is also connected as an input to gate 724. The false input gate 724 will result in the waste pump motor being cyled for one cycle as previously discussed. When the waste pump has completed its cycle, a true signal will appear on line 752. Line 752 is connected as an input to gate 958. Gate 958 will generate a "0" output then, resulting in the valve control counting means advancing to the ten count configuration, when: the waste pump has completed it cycle; the valve control counting means is in the nine count configuration; and, the input from inverter 748 is true, indicating that the valves V1 and V2 are in the desired valve position.

In the ten count configuration of the valve control counting means, the valves V1 and V2 are positioned to their "block" and "V1 waste" valve positions, resulting in a false output from gate 714. The false output from gate 714 is an input to gate 852, resulting in a true output from that gate to the complementary microsyringe pump motor driving gates 780 and 782. Since the piston 262 is in its completely withdrawn condition, the flip-flop 776, 778 will be true, therefore gate 782 will have a false output resulting in the motor 268 being driven forward, driving the piston 262 into the test chamber to empty the test fluid from the test chamber. When the piston 262 has been completely extended into the test chamber, flip-flop 776, 778 will be reset. The false output from the flip-flop is an input to one-shot 894 and the gates 728. A true output from the false side of the flip-flop 776, 778 will cause the output from gate 728 to transition from true to false. The output of gate 728 in an input to gate 730. The true to false transition of the gate 728 will cause output of gate 730 to transition from false to true, releasing the revolution counting means comprising flip-flops 790, 792 and 794.

The piston 262 being completely extended into the test chamber resulting in flop-flop 776, 778 being reset will cause a false output from gate 780. A false output from gate 780 will result in the microsyringe pump motor 268 being driven in reverse, withdrawing the piston 262 from the test chamber as previously discussed. For each revolution of the shaft of motor 268, the revolution count switch 944 will cycle from its normally opened to its normally closed and return to its normally opened position. The revolution counting means, then will advance one count configuration for each cycle of the revolution counting switch. Gate 796 will have a false output when the piston 262 has been withdrawn four revolutions. The output of gate 796 is inverted true by inverter 798 and connected as an input to gate 968. Gate 968 will have a false output to gate 898 and to the reset input of flip-flop 614 when all of its inputs are true. The false input to gate 898 will result in a true output from the gate which is inverted by inverter 897 and connected to the reset input of flip-flops 612 and 616. The output inverter 897 is also an input to gate 890 and will cause a true output from that gate which is inverted by inverter 892 and then connected to the reset input of flip-flop 618. A false output then from gate 968 will result in the valve control counting means being set to a two count configuration.

The calcium sequencer 402 will repeat the actions taken for the two count and the three count configurations of the valve control counting means. At the end of the mix cycle, the data handling sequence as previously described will take place. At the conclusion of the data handling sequence, the valve control counting means will be advanced from the three count to the four count configuration. In the four count configuration of the valve control counting means, the valves V1 and V2 are positioned to the "blocked" and "V1 waste" position, as seen in Table 2. Gate 714 generates a false output when the valves are in this particular position. The false output of gate 714 will result in a true output from gate 852 which is connected to the complementary drive gates 780 and 782. Since the piston 262 has been completely withdrawn from the test chamber at the completion of the mix cycle during the three count configuration, the flip-flops 776, 778 is true, therefore gate 782 will generate a false output when gate 852 is true, causing the microsyringe pump motor 268 to drive forward to empty the test cell. Flip-flop 776, 778 will be reset when the piston 262 has been completely extended into the test chamber, causing one-shot 894 to transition for a predetermined period of time. The output from one-shot 894 is an input to gate 956. Gate 956 will generate a false output when the output of one-shot 894 is true, resulting in the valve control counting means advancing to the five count configuration.

Note that gate 956 has an input from gate 642. Since the valves V1 and V2 will assume the "blocked/V1 waste" position for the four, seven and ten count configurations, the input from gate 642 to gate 956 is necessary to differentiate between the ten count and the four and seven count configurations. The output from gate- 642 will be true for all count configurations except the ten count; therefore, gate 956 will have a false output for the four and seven count configurations but not the ten.

In the five count configuration, the valves are positioned to the "rinse/V1 waste" positions, resulting in a false output from gate 712. The output from gate 712 is inverted true by inverter 748 and is also connected to the gate 724. A false input to gate 724 will result in the waste pump being cycled one cycle. At the completion of the waste pump cycle, a true signal appears on line 752. Gate 898 has an input from the inverter 748, which is true during the five count configuration, and an input from the inverter 740 which is also true during the five count configuration. Gate 898 then will generate a false output when the signal on line 752 goes true, indicating the waste pump has completed its cycle. A false output from gate 898 will result in a true output from gate 756, which is inverted false by inverter 758, causing the microsyringe pump motor 268 to be driven in reverse withdrawing the piston 262 from the test chamber. When the piston 262 has been completely withdrawn from the test chamber, the limit switch S10 is moved to its normally closed position, breaking the drive circuit for the motor 268. The flip-flop 776, 778 is set when the piston 262 has been withdrawn, one-setting the one-shot 974. The output of one-shot 974 is an input to gate 952. Gate 952 will have a false output when all of its inputs are true, resulting in the valve control counting means advancing to the six count configuration.

In the six count configuration, the valves are positioned in the "blocked/mix" positions, resulting in a false output from gate 710. The output of gate 710 is inverted by inverter 746 and connected as an input to gate 976 and 954. Gate 976 will generate a false output to gate 852 when both of its inputs are true. The second input to gate 976 is the output of gate 988 and will be true at all times during the six count configuration of the valve control counting means. The false input to gate 852 results in a true output from that gate to the gates 780 and 782. During the five count configuration, the piston 262 was withdrawn from the test chamber one-setting the flip-flop 776, 778 therefore gate 782 will have a false output, when the output of gate 852 becomes true, to drive the motor 268 forward extending the piston 262 into the test chamber to empty the test chamber. The flip-flop 776, 778 will be reset when the piston 262 has been completely extended into the test chamber resulting in a false output from gate 780 to gate 756. Gate 756 will be true when gate 780 is false. Inverter 758 inverts the output of gate 756 false turning transistor 760 on causing the motor 268 to drive in reverse withdrawing the piston 262 from the test chamber. When the piston 262 has been completely withdrawn from the test chamber, flip-flop 776, 778 will be one-set one-setting the one-shot 974. The output of one-shot 974 is an input to gate 954. When one-shot 974 is one-set during the six count configuration, the gate 954 will generate a false output resulting in the valve control counting means advancing one count configuration to the seven count.

In the seven count configuration of the valve control counting means, the valves V1 and V2 are positioned to the "block/V1 waste" valve positions causing gate 714 to generate a false output to inverter 750 and gate 852. A false input to gate 852 will result in a true output being generated by that gate to the gates 780 and 782. At this time, the flip-flop 776, 778 is in a true state since the piston 262 was completely withdrawn from the test chamber during the six count configuration of the valve control counting means. Gate 782 therefore will generate a false output to transistor 768 turning it on resulting in the microsyringe pump motor 268 being driven forward to extend the piston 262 into the test chamber. Flip-flop 776, 778 will be reset when the piston 262 has been completely extended into the test chamber one-setting the one-shot 894. The output from one-shot 894 is an input to gate 956. Gate 956 will generate a false output causing the valve control counting means to advance to the eight count configuration when all of its inputs are true. Recall that the "block/V1 waste" input from inverter 750 is true for the four, seven, and ten count configurations of the valve control counting means. The input connection to gate 956 from gate 642 is necessary to differentiate the ten count configuration from the four and seven count configurations. In both the four and the seven count configurations, the valve control counting means will be advanced one count configuration when the one-shot 894 is set true, indicating that the piston 262 has been completely extended into the test chamber.

The eight count configuration of the valve control counting means will result in the valves V1 and V2 being positioned to the "urine/V1 waste" valve positions. Gate 638 will generate a flase output for the eight count configuration which resets the flip-flop 688, 690 and which is also connected as an input to gates 714 and 706. The false input to the gates 706 and 714 will prevent these gates from generating an output for the present valve configuration.

The false output from flip-flop 688, 690 is an input to gate 508, seen in FIG. 16. The true input to gate 508 removes the disable signal to that gate and will allow the timer 400 to generate subsequent start commands to the calcium sequencer 402.

When the system is first turned on, a false signal is generated by the timer 400 and applied to the calcium sequencer 402 on line 899, FIG. 17A. Line 899 is an input to gate 898 and gate 608 and will result in the valve control counting means being set to a four count configuration. By referring to the calcium sequencing table, Table 2, column 19, it can be seen that the action taken by the calcium sequencer 402 from valve count four to the terminal count configuration of eight will result in the lines of the analyzer and the test cell being rinsed and prepared for an analysis of a test fluid.

Figure 18A:
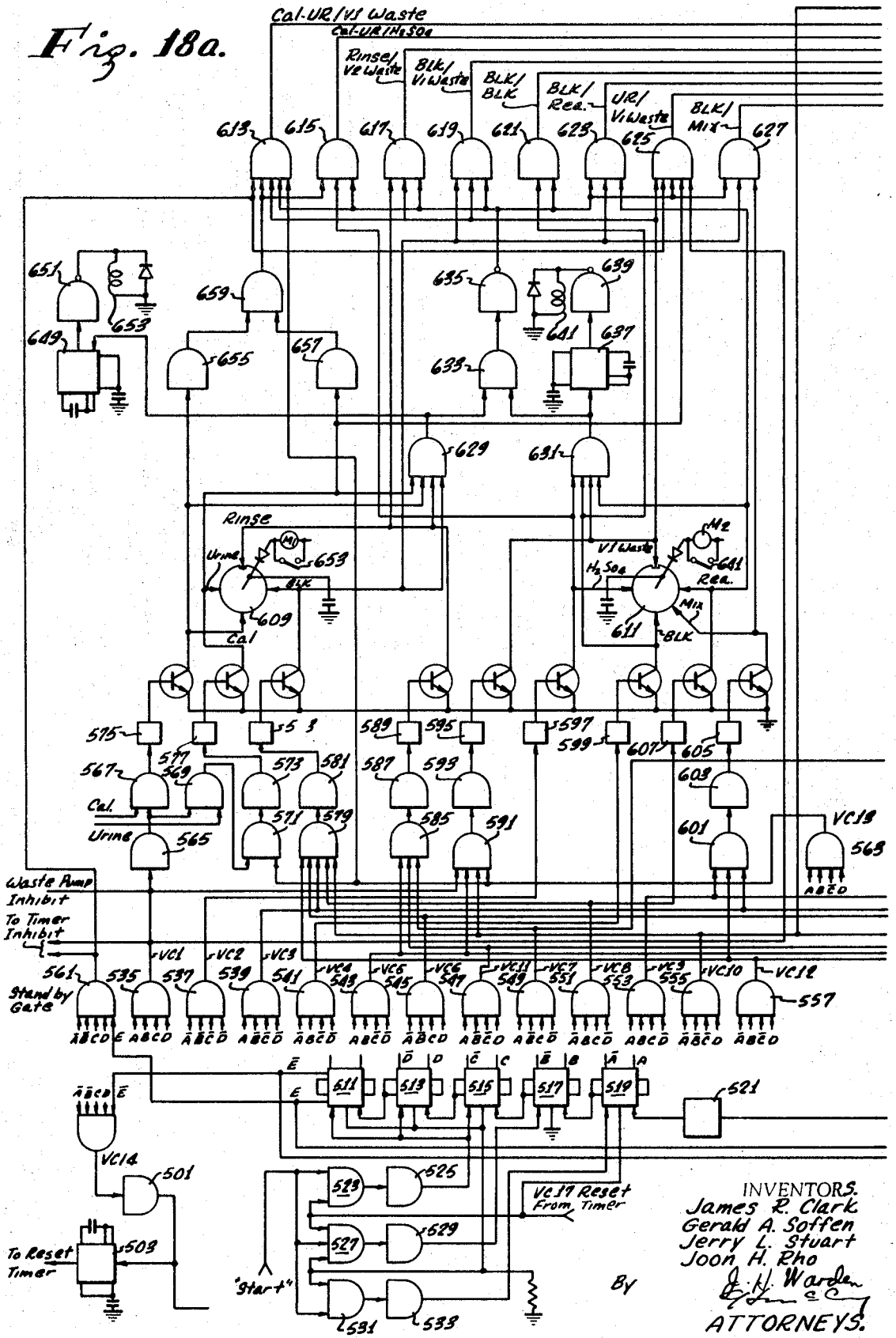
FIGS. 18A, 18B and 18C are logic control circuitry for the Creatine/Creatinine Sequencer 404 shown in FIG. 14.
Figure 18B:
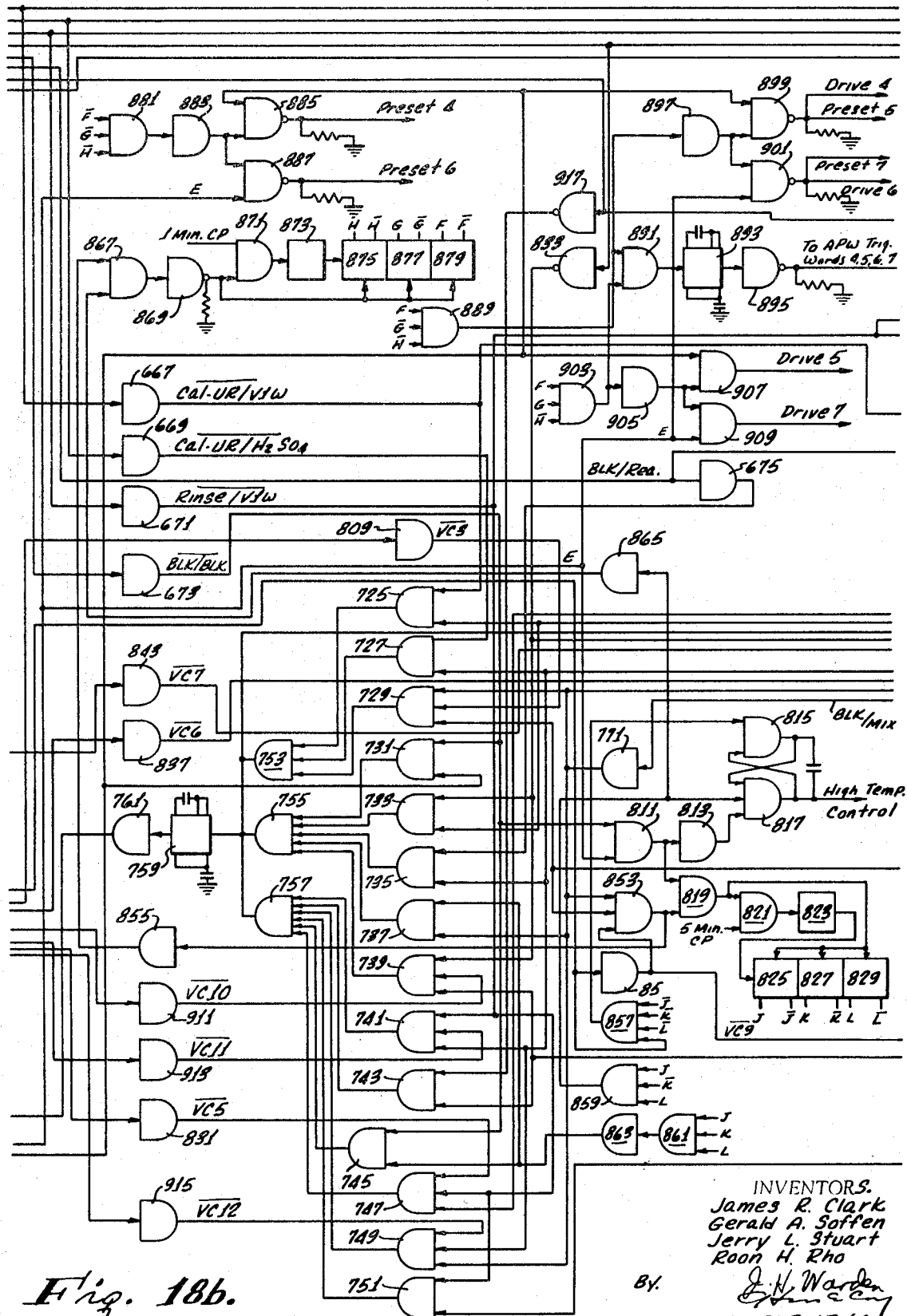
Figure 18C:
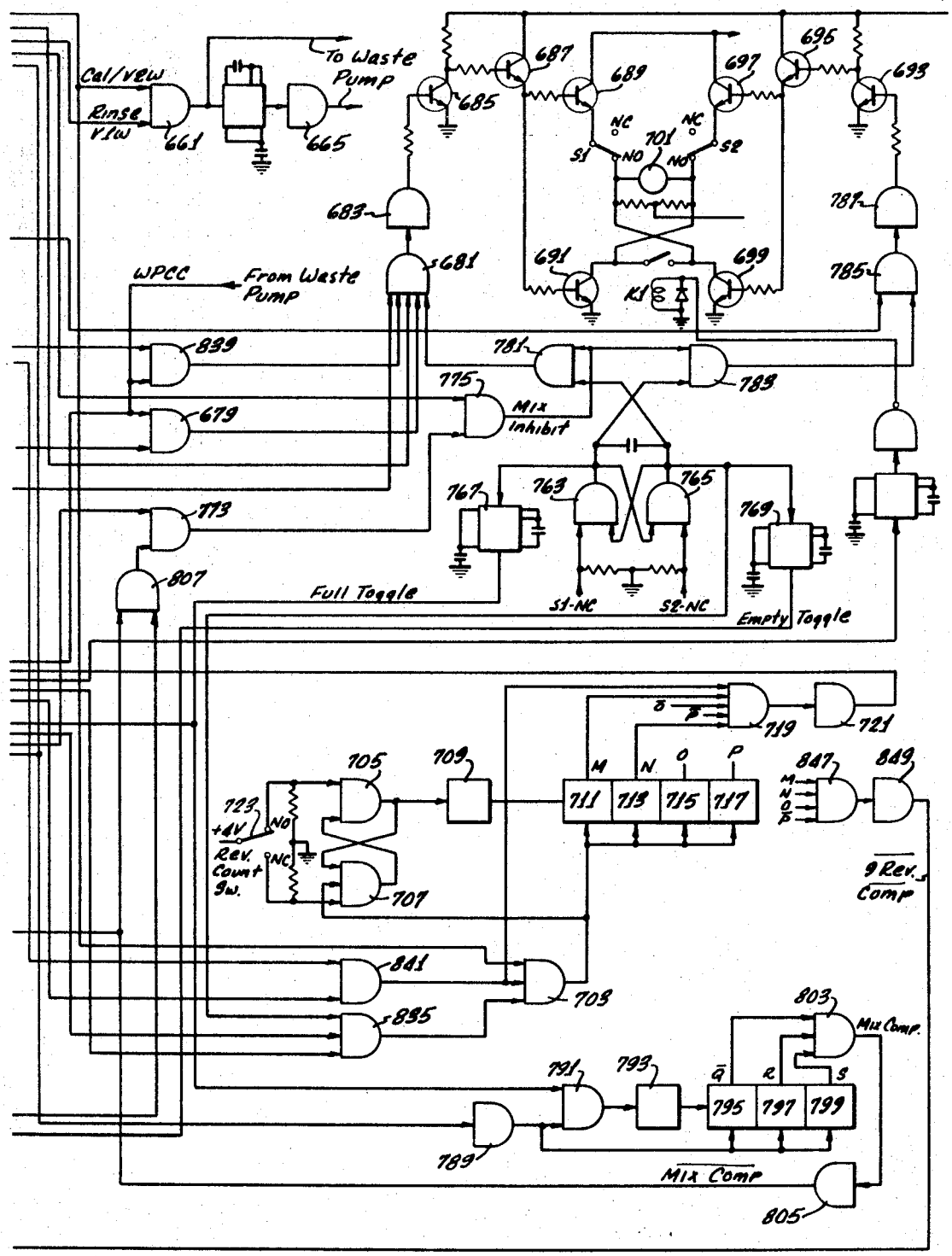

The creatine sequencer, shown in FIG. 12 as block 404, is shown in schematic form in FIGS. 18A, 18B and 18C. Since the logical techniques employed in the creatine sequencer 404 are the same as those just described in connection with the calcium sequencer 402, the description of the circuitry in FIGS. 18A, 18B and 18C will not be as detailed.

The "start" command for the creatine sequencer 404 is generated by gate 500 in the timer 400 seen in FIG. 16. A false output from gate 500 is an input to the creatine sequencer 404 in FIG. 18A and will initialize the valve control counting means comprising flip-flops 511, 513, 515, 517 and 519 to a one count configuration. A decoding means comprising gates 535, 537, 539, 541, 543, 545, 547, 549, 551, 553, 555, 557, 559, 561 and 563 are operatively connected to the valve control counting means and generate outputs for particular count configurations of the counting means.

The valves V1 and V2 are shown as represented by valve discs 609 and 611, respectively. Valve discs 609 and 611 have a plurality of input connections which when placed at a ground potential will cause the valve discs to be rotated until the slot in the disc removes the ground return provided by the input connection. Motors M1 and M2 drive the valve discs 609 and 611, respectively. The various input connections to the valve discs 609 and 611 are placed at ground potential for particular count configurations of the valve control counting means as determined by the decoding means associated with the counting means. In a manner similar to that described in connection to the calcium sequencer 402, a valve decoding means comprising gates 613, 615, 617, 619, 621, 623, 625 and 627 will generate outputs for particular valve positions of the valves V1 and V2. For example, gate 613 will generate a false output when the valve V1 is in the "calibrate-urine" position and valve V2 is in the "V1 waste" position.

The valve decoding gates are disabled while the valve discs 609 and 611 are rotating to their particular valve positions. Gate 629 will have a false output so long as disc 609 is rotating and gate 631 will have a false output so long as disc 611 is rotating. A false output from either gate 629 or gate 631 will result in a true output from gate 633 which is inverted false by inverter 635 and connected as an input to each of the valve decoding gates. All the outputs from the valve decoding gates will be true so long as the input from inverter 635 is false. The output from inverter 635 will become true as soon as the valve discs have completed their rotation, thus enabling the outputs from the valve decoding gates depending upon the valve position.

The valve discs 609 and 611 are dynamically braked by relays 653 and 641, respectively. When the valve disc 609 reaches its designated valve position, the output from gate 629 will become true setting one-shot 649 generating a true output through inverter 651 which is inverted false and applied to the coil relay 653 to actuate it. When relay 653 is actuated, the contacts associated with motor M1 are closed placing a short across the field winding of the motor. Dynamic braking is provided for valve disc 611 by one-shot 637, inverter 639 and relay 641.

Referring to the creatine/creatinine sequencing table, Table 1, column 16, the valve positions for valves V1 and V2 corresponding to the various count configurations of the valve control counting means may be seen.

When the "start" command is received by the sequencer 404 from the timer 400, the valve control counting means is set to a one count configuration and the valve V1 is rotated to the "calibrate/urine" valve position depending upon the input from the timer to gates 567 and 569 as was described in connection with the calcium sequencer 402. Valve V2 is also rotated to the "V1 waste" valve position for VC1. Gate 613 will generate a false output when the valves V1 and V2 have assumed the desired positions. The output of gate 613 is an input to gate 661, FIG. 18C, and to inverter 667, FIG. 18B. A false input to gate 661 from gate 613 will result in the waste pump motor seen in FIG. 15 being cycled one cycle. When the waste pump cycle is complete, a true signal will appear on line 677 (FIG. 18C) as an input to gate 679. Gate 679 also has a true input from inverter 667 resulting in a false output from the gate. The output of gate 679 is an input to gate 681 causing that gate to generate a true output which is inverted by inverter 683. Motor 701 is the microsyringe pump motor associated with the creatine analyzer 404 and functions in a manner similar to the microsyringe pump motor 268 associated with the calcium sequencer 402. A false output from inverter 683 will cause the motor 701 to drive in reverse withdrawing the piston from the creatine test cell. Also associated with the microsyringe pump motor 701 is a revolution count switch 723 having a normally open and normally closed pole. A flip-flop comprising gate 705 and 707 is connected to the poles of the switch 723 so that when the switch 723 is in a normally open position the flip-flop is one-set and will be reset when the switch 723 is in its normally closed position. For each revolution of the motor 701, the switch 723 will cycle from its normally open to its normally closed and then return to its normally open position. The output of gate 705 of the flip-flop then will assume a true, false, true state corresponding to the switch 723 positions. The output from gate 705 of the flip-flop is an input to clock driver 709. Clock driver 709 will be one set for each cycle of the count switch 723 generating a true output for a predetermined period of time. A counting means comprising flip-flops 711, 713, 715 and 717 is connected to the output of clock driver 709 so that for each cycle of the switch 723 the counting means is advanced one count configuration. The false output from gate 613 (FIG. 18A) is an input to gate 703 (FIG. 18C). The output of gate 703 is connected as a preset input to the counting means and will initialize the counting means to a "0" count configuration when its output is false. The output of gate 703 will be false until the input from gate 613 becomes false in the one count configuration of the valve control counting means; therefore, when the motor 701 is actuated in VC1 the revolution counting means will be preset and the output of gate 703 will become true allowing the revolution counting means to advance in response to the revolution count switch 723.

A decoding means, gate 719, is connected to the revolution counting means and will generate a false output for a three count configuration of the counting means. The output of gate 719 is inverted true by inverter 721 and connected as an input to gate 725 (FIG. 18B). A second input to gate 725 is the output of inverter 667. Gate 725 will have a false output to gate 753 when both of its inputs are true. A false input to gate 753 will result in a true output from that gate to one-shot 759 setting the one-shot for a predetermined period of time. The true output from one-shot 759 is inverted false by inverter 761 and connected as an input to one-shot 521. When the one-shot 759 returns to its false state, the predetermined period of time after gate 753 sets it, inverter 761 will have a true output setting one-shot 521 for a predetermined period of time. When the one-shot 521 resumes its false state, it will generate a false output to the valve control counting means to advance the counting means one count configuration.

In VC1 then, the waste pump motor was turned on for one cycle and the microsyringe pump motor was turned on for three revolutions withdrawing the piston from the creatine test cell a predetermined distance.

In the two count configurations of the valve control counting means, VC2, valve V1 will remain in its "calibrate-urine" valve position and valve V2 will be rotated to its "H$_2$SO$_4$" valve position resulting in a false output from gate 615. The output of gate 615 is an input to gate 681 (FIG. 18C) resulting in a true output being generated by that gate to inverter 683. Inverter 683 inverts the true output from gate 681 false resulting in the motor 701 being driven in reverse. When the piston in the creatine test cell has been completely withdrawn, limit switch S1 will be moved from its normally open to its normally closed position. A flip-flop comprising gates 663 and 665 is associated with the limit switches S1 and S2 of the microsyringe pump. The flip-flop 663, 665 will be one set when the piston in the test cell has been completely withdrawn and will be reset when the piston has been completely extended into the test chamber. The true output from the flip-flop 663, 665 is connected as an input to one-shot 767 and will set one-shot 767 for a predetermined period of time when the flip-flop is true. The output of one-shot 767 is an input to gate 727 (FIG. 18B). A second input to gate 727 is from inverter 669. Inverter 669 will have a true output when the valves V1 and V2 are in the "calibrate-urine/H$_2$SO$_4$" valve positions. The output of gate 727 is connected as an input to gate 753 and will result in the valve control counting means being advanced one count configuration.

In VC2 then, the valves are rotated to their desired position and the piston in the test chamber which has already been withdrawn 3 revolutions in VC1 is withdrawn the remaining distance and the valve control counting means advanced to a three count configuration.

In the three count configuration of the valve control counting means, VC3, valves V1 and V2 are rotated to the "blocked" and "mix" valve positions generating a false output from gate 627. The output of gate 627 is inverted by inverter 771 (FIG. 18B) and connected as an input to gate 773 (FIG. 18C). A second input to gate 773 is from gate 807 which is true at this time. Gate 773 will generate a false output to gate 775 since both of its inputs are true. Gate 775 will generate a true output to gates 781 and 783 when its input from gate 773 is false. Gate 783 will generate a false output when the piston in the test cell has been completely withdrawn as indicated by a true output from flip-flop 763, 765 and gate 781 will generate a false output when the piston has been completely extended into the test cell as indicated by flip-flop 763, 765 being reset. Since the piston was completely withdrawn from the test cell in VC2, the flip-flop 763, 765 is true and therefore the gate 783 will generate a false output to gate 785. A false input to gate 785 will result in a true output from that gate to inverter 787. Inverter 787 inverts the true output false turning on transistor 693 driving the motor 701 in a forward direction to insert the piston into the test chamber. When the piston has been completely extended into the chamber, the flip-flop 763, 765 will become reset causing gate 783 to become true and gate 781 to become false. A false output from gate 781 will result in a true output from gate 681 which is inverted false by 683 turning on transistor 685. The motor 701 will then be driven in reverse to withdraw the piston from the test cell. This cyclic action by the microsyringe pump motor 701 will continue until the output from gate 775 becomes false. As previously discussed, each time flip-flop 763, 765 is one set indicating that the piston has been completely withdrawn from the test cell, one-shot 767 will be one set for a predetermined period of time. The output of one-shot 767 is an input to gate 791. Gate 791 will generate a false output in VC3 each time the one-shot 767 is set. The output of gate 791 will become false when the one-shot 767 reassumes its false state the predetermined period of time following the one-setting of flip-flop 763, 765. The output of gate 791 is an input to clock driver 793. Clock driver 793 will be set true for a predetermined period of time for each true duration of the output of gate 791. The output of clock driver 793 is an input to a mix counting means comprising flip-flops 795, 797 and 799. Each time clock drive 793 is set, the mix counting means will advance one count configuration. A decoding gate 803 is connected to the counting means and will generate a false output when a predetermined count configuration is assumed by the counting means. In the present invention, gate 803 will generate a false output to inverter 805 after the piston in the test cell has completed seven cycles. The output of inverter 805 is an input to gate 807. A second input to gate 807 is from gate 851 (FIG. 18B) and will be true for all count configurations of the valve control counting means except the nine count.

In VC3 then after 7 mix cycles have been completed, gate 729 is enabled by the output of inverter 805 which advances the valve counting means to the count of four and places the valves in "block/block" positions. A false output is thereby generated by gate 621 and inverted by inverter 673 to produce a true pulse at the output of gate 731. It was necessary to skip the block/block position of valves at this time because for this sequence the heating cycle was not required. A second input to gate 731 is generated by the true output of flip-flop 511 in the valve control counting means (FIG. 18A). Flip-flop 511 was reset when the creatine sequencer received the "start" command and will remain reset for the first analysis by the sequencer. Gate 731 then will generate a false output to gate 755 causing the valve control counting means to advance one count configuration to the five count.

In the five count configuration of the valve control counting means, the valves V1 and V2 are rotated to the "rinse" and "V1 waste" valve positions, respectively, generating a false output from gate 617. The output of gate 617 is inverted true by inverter 671 (FIG. 18B), and is also connected as an input to gate 661 (FIG. 18C) resulting in the waste pump motor cycling one cycle. The output of inverter 671 is an input to gate 747 (FIG. 18B). A second input to gate 747 is generated by inverter 831 and will be true during VC5. A third input to gate 747 is from the waste pump on line 677 and will be true when the waste pump has completed its cycle. Gate 747 then will generate a false output to gate 757 since all of its inputs are true. A false input to gate 757 will result in the valve control counting means being advanced to the six count configuration.

In the six count configuration of valve control counting means, the valves V1 and V2 are rotated to the "blocked" and "V1 waste" valve positions, respectively, generating a false output from gate 619. The output of gate 619 is a direct input to gate 775 (FIG. 18C). A false input to gate 775 by gate 619 will result in a true output from the gate as an input to gates 781 and 783. In VC4 the mix cycle was inhibited when the piston was completely withdrawn from the test chamber at the completion of seven cycles; therefore, in VC6 the flip-flop 763, 765 is true. Gate 783 will accordingly generate a false output causing the motor 701 to drive forward inserting the piston 262 into the test chamber. When the piston has been completely inserted into the test chamber, flip-flop 763, 765 will be reset causing gate 783, to become true and gate 781 to become false. A false output from gate 781 will result in the motor 701 being driven in reverse. The false output from the flip-flop 763, 765 is also an input to gate 835. A second input to gate 835 is from inverter 833 (FIG. 18B) which inverts the output of gate 619 true. A third input to gate 835 is from gate 837 (FIG. 18B) and will be true during the VC6. Gate 835 then will generate a true output in VC6 when the piston has been completely inserted into the test chamber. The output from gate 835 is connected as an input to gate 703 and will result in a true output from that gate. When the output of gate 703 becomes true the revolution counting means will be released and enabled to count as the motor 701 is being driven in reverse. The revolution count switch 723 will cycle for each revolution of the motor 701 advancing the revolution counting means one count configuration. At the completion of three revolutions, the output of inverter 721 will become true. Inverter 721 is connected as an input to gate 733 (FIG. 18B). A second input to gate 733 is inverter 833 which is true at this time. A false output from gate 733 will generate a true output from gate 755 which will result in the valve control counting means being advanced to the seven count configuration.

In the seven count configuration of the valve control counting means, the valves V1 and V2 are positioned to their "rinse" and "V1 waste" positions, generating a false output from gate 617. The output from gate 617 is an input to gate 661 (FIG. 18C), causing that gate to generate a true signal out to the waste pump and to one-shot 663. A true output by gate 661 will result in the waste pump in FIG. 15 cycling one cycle. When the waste pump cycle has been completed, a true signal will appear on line 677 as an input to gate 839. A second input to gate 839 is from the inverter 671 (FIG. 18B), which will be true when the output from gate 617 is false. Gate 839 will have a false output when both its inputs are true, resulting in a true output from gate 681. A true output from gate 681 will drive the motor 701 in the reverse direction to further withdraw the piston from the test cell. The true signal output from inverter 671 is an input to gate 841 (FIG. 18C). The second input to gate 841 is from inverter 843 (FIG. 18B) and is true during VC7. Gate 841 will have a false output when both its inputs are true. The output of gate 841 is connected to gates 719 and 703. When gate 841 is false, gate 719 is disabled so that when the revolution counting means assumes the three count configuration, the output of gate 719 will not become false. A false output from gate 841 will also result in gate 703 generating a true output releasing the revolution counting means, allowing it to respond to the revolution count switch 723. A decoding gate 847 is connected to the revolution counting means and will generate a false output when the counting means assumes a nine count configuration. The false output by gate 847 is inverted true by inverter 849 and is connected as an input to gate 751 (FIG. 18B). The second input to gate 751 is the true output from inverter 671. A false output from gate 751 will generate a true output from gate 757, resulting in the valve control counting means advancing to the eight count configuration.

In the eight count configuration of the valve control counting means, the valves V1 and V2 assume the "blocked" and "reagent," respectively, resulting in a false output from gate 623. The false output of gate 623 is an input to gate 681 (FIG. 18C) resulting in a true output from that gate which will enable the motor 701 to drive in reverse. In VC6, the motor 701 was driven three revolutions in reverse before the valve control counting means was advanced to the seven count configuration. In VC7, the motor 701 was driven nine revolutions in reverse and the valve control counting means advanced to the eight count. Therefore, in VC8, eight revolutions remain between the present position of the piston in the test cell and its terminal position which would be completely withdrawn from the test cell. When the piston has been completely withdrawn, flip-flop 763, 765 will be one-set, setting one-shot 767 for a predetermined period of time. The output of one-shot 767 is an input to gate 735 (FIG. 18B). A second input to gate 735 is the true output of inverter 675. Gate 735 will generate a false output when both of its inputs are true, causing gate 755 to assume the true state, resulting in the valve control counting means advancing to the nine count.

In the nine count configuration of the valve control counting means, the valves V1 and V2 will be rotated to their "blocked" and "mix" positions, respectively, resulting in a false output from gate 627. The output of gate 627 is inverted true by inverter 789 (FIG. 18C), releasing the mix counting means, enabling it to count in response to the one-shot 793. The output of inverter 789 is an input to gate 791. The second input to gate 791 is from the one-shot 767. The output of gate 627 is also inverted true by inverter 771 (FIG. 18B) and connected as an input to gate 773 (FIG. 18C). The second input to gate 773 from gate 807 will be true until the mix counting means has assumed a predetermined count configuration as previously discussed. Gate 773 then will generate a false output since both of its inputs are true, resulting in a true output from gate 775 to the complementary drive gates 781 and 783. In VC8, the piston was completely withdrawn from the test cell; therefore, flip-flop 763, 765 will be true to gate 783. Gate 783, then, will have a false output, resulting in a forward drive on motor 701 to drive the piston into the test cell. When the piston has been completely inserted into the test cell, the flip-flop 763, 765 will become reset, resulting in a false output from gate 781. A false output from gate 781 will cause the motor 701 to be driven in reverse, withdrawing the piston from the test cell. When the piston reaches its terminal position withdrawn from the test cell, the flip-flop 763, 765 will again become one-set, one-setting one-shot 767, resulting in a false output from gate 791 to clock driver 793. As previously discussed, each time one-shot 767 is set by flip-flop 763, 765 becoming true, the mix counting means will advance one count configuration. When the mix counting means assumes the seven count configuration, gate 803 will generate a false output to inverter 805. The output of inverter 805 will be true as an input to gate 807. Gate 807 has a second input from inverter 851 (FIG. 18B). Inverter 851 inverts the output of gate 553 (FIG. 18A) and will be true during VC9. Gate 807, then, will generate a false output when the mix counting means assumes the seven count configuration in VC9. A false output from gate 807 to gate 773 will disable the cyclic mixing action of the motor 701. The output of inverter 805 is also an input to gate 853 (FIG. 18B). The second input to gate 853 is from inverter 851 which is true during VC9. A third input to gate 853 is from inverter 771 which is true when the output of gate 627 is false. At the end of the mixing action by the motor 701, then, gate 853 will generate a "0" output. The output of gate 853 is an input to gate 819. A false input to gate 819 will result in the output of gate 819 transitioning from false to true.

Gate 819 is a preset input into a time delay counting means comprising flip-flops 825, 827 and 829. A false output by gate 819 presets the time delay counting means to a "0" count configuration. When the input to gate 819 from gate 853 is false, the gate 819 assumes the true state, removing the preset signal to the counting means, allowing it to advance. The output of gate 819 is also an input to gate 821. A second input to gate 821 is a five-minute clock pulse from a source external to the system. Every five minutes, a false signal is received as input to gate 821. The output of gate 821 will transition from a false to a true state each time a clock pulse is received. The output of gate 821 is an input to clock driver 823. Clock driver 823 will become set for a predetermined period of time for each false to true transition of gate 821. At the end of the predetermined period of time, the output of clock driver 823 will assume its false state again. For each true to false transition of the clock driver 823, the time delay counting means will be advanced one count configuration.

Decoding means comprising gates 857, 859 and 861 will generate false signal outputs for particular configurations of the time delay counting means. Gate 857 will generate a false output when the first five-minute clock pulse advances the time delay counting means one count configuration. Gate 859 will generate a false output after six five-minute clock pulses have been received by gate 821 or 25 minutes after gate 857 generated its false output. Gate 861 will generate a false output after seven five-minute clock pulses have been received by gate 821. The twenty-five minute delay period is necessary to permit color development in the test cell.

A flip-flop comprising gates 815 and 817 provides the high temperature control for the test cell. The false output from the flip-flop 815, 817 is connected to the heating coil 252 shown in FIG. 8. When the flip-flop 815, 817 is true, the output from gate 817 will cause the fluid in the test cell to be heated to a predetermined temperature. The output of gate 857 is the one-set input to flip-flop 815, 817 and will one-set the flip-flop when its output is false. The output of gate 859 is the reset input to the flip-flop 815, 817. A false output from gate 859 will reset the flip-flop 815, 817. A second reset input to flip-flop 815, 817 is generated by inverter 813. The true output of flip-flop 511 in the valve control counting means is an input to gate 811. The output of gate 811 is an input to inverter 813. As previously discussed, flip-flop 511 will be false for the first analysis by the creatine sequencer 404, therefore, the output of gate 811 will be true. Inverter 813 inverts the true output of gate 811 false-resetting flip-flop 815, 817. Although the output of gate 857 will normally one-set flip-flop 815, 817, since the output from inverter 813 is false, the flip-flop 815, 817 will remain reset and the fluid in the test cell will not be heated. However, for the second analysis of the test fluid in the test cell, the flip-flop 511 will be true, thus removing the disable signal to flip-flop 815, 817 from inverter 813, allowing the output from gate 857 to one-set flip-flop 815, 817 to heat the test fluid. This will be described in more detail hereinafter.

The output of gate 859 is inverted by inverter 865 and applied as an input to gate 867. A second input to gate 867 is the output of inverter 855. Inverter 855 inverts the false output of gate 853 true. Gate 853, it will be recalled, has a false output at this time and was necessary to enable the time delay counting means to count the five-minute clock pulses. The output of gate 867 is false since both of its inputs are true. The false output of gate 867 is inverted by inverter 869 and applied as an input to gate 871. A data handling time delay counting means comprising flip-flops 875, 877, and 879 is preset by a false output from inverter 869. When the output of inverter 869 transitions from a false to a true signal, that is when the output of gate 867 changes from a true to a false signal, the data handling time delay counting means is released and allowed to advance one count configuration in response to inputs from clock driver 873. Gate 871 has one minute clock pulse inputs from a source external to the system. The one minute signal input to gate 871 will become false every minute. The output of gate 871 will change from a false to a true signal for each one minute clock pulse. Clock driver 873 will be set for a predetermined period of time each time the gate 871 changes from a false to a true output. The output of clock driver 873 is an input to the data handling time delay counting means and will advance the counting means one count configuration each time it is set true.

A decoding means comprising gates 881, 889 and 903 are connected to the flip-flops comprising the counting means and will generate false outputs for predetermined count configurations of the counting means. Gate 881 will have a false output after the first one-minute clock pulse advances the counting means to its first count configuration. Gate 889 will generate a false output after two one-minute clock pulses have been received by the counting means and gate 903 will generate a false output after four one-minute clock pulses have been received. The output of gate 881 is inverted by inverter 883 and connected as an input to gate 885 and 887. A second input to gate 885 is the false output from flip-flop 511 in the valve control counting means which is true for the first analysis of the test fluid in the test cell. Gate 885 will generate a false output when both of its inputs are true. The output of gate 885 is an input to the data handling system and will preset word 4. A second input to gate 887 is the true output of flip-flop 511. As previously discussed, flip-flop 511 will be false for the first analysis by the creatine analyzer 404 and will be true for the second analysis of the test fluid. Therefore, gate 887 will have a true output for the first analysis and a false output for the second analysis. The output of gate 887 is an input to the data handling system to preset word 6.

Gate 889 will generate a false output after two one-minute clock pulses have been received by the counting means. The output of gate 889 is an input to gate 891 and inverter 897. Gate 891 will generate a true output to one-shot 893 when its input from gate 889 is false. A true output from gate 891 will set one-shot 893 true for a predetermined period of time. Inverter 895 inverts the true output of one-shot 893 false. The output of inverter 895 is an input to the data handling system and triggers the analog-to-pulse-width converter for words 4, 5, 6 or 7. The output of gate 889 is inverted true by inverter 897 and is connected as an input to gates 899 and 901. A second input to gate 899 is the false output of flip-flop 511 in the valve control counting means. A second input to gate 901 is the true output of flip-flop 511. Gate 899 will generate a false output for the first analysis by the analyzer 404. Gate 901 will generate a false output for the second analysis. The output of gate 899 is an input to the data handling system to drive word 4 and preset word 5. The output of gate 901 is also connected as an input to the data handling system and drives word 6 and presets word 7.

The output of gate 903 will be false after four one-minute clock pulses have been received by the counting means. The output of gate 903 is an input to gate 891 and to inverter 905. A false output from gate 903 to gate 891 will result in the one-shot 893 being set, generating a false output from inverter 895 to trigger the analog-to-pulse-width converter for words 4, 5, 6 or 7 in the data handling system. Inverter 905 inverts the false output of gate 903 true and connects it as an input to gates 907 and 909. The false output of flip-flop 511 is a second input to gate 907. The true output of flip-flop 511 is a second input to gate 909. The output of gate 907, then, will be false for the first analysis by the creatine analyzer 404 and the output of gate 909 will be false for the second analysis. The output of gate 907 is connected to the data handling system and drives word 5. The output of gate 909 is also connected to the data handling system and drives word 7.

The function of the preset drive and trigger signals just described will be described in greater detail in connection with the data handling system.

The above-described signals were initiated when the output of gate 859 became false and will be completed in four minutes. The output of gate 861 will become false five minutes after gate 859 becomes false. The output of gate 861 is inverted true by inverter 863 and is connected as an input to gate 737. A second input to gate 737 is the output of inverter 771. Gate 737 will have a false output when both of its inputs are true, resulting in a true output from gate 755. A true output from gate 755 will advance the valve control counting means one count configuration to the ten count.

In the ten count configuration of the valve control counting means, the valves V1 and V2 will be rotated to their "blocked" and "V1 waste" positions, respectively, generating a false output from gate 619. The false output of gate 619 is an input to gate 775 (FIG. 18C). Gate 775 will generate a true input to gates 781 and 783 when one of its inputs is false. At the completion of the mix cycle in VC9, the piston was completely withdrawn from the test cell; therefore, flip-flop 763, 765 will be true at this time. Accordingly, gate 783 will have a false output to gate 785 since both of its inputs are true. A false output from gate 783 will cause the motor 701 to be driven forward inserting the piston into the test cell. When the piston has been completely inserted into the test cell, flip-flop 763, 765 will be reset, setting one-shot 769 true for a predetermined period of time. The output of one-shot 769 is an input to gate 739 (FIG. 18B). A second input to gate 739 is from inverter 911 and will be true during VC10. A third input to gate 739 is generated by inverter 833 (FIG. 18B) and will be true when the output of gate 619 is false. A false output will be generated by gate 739 as an input to gate 757 since all of its inputs are true. A false input to gate 757 will result in a true output which will advance the valve control counting means to the 11 count.

In the eleven count configuration of the valve control counting means, the valves V1 and V2 are rotated to their "rinse" and "V1 waste" valve positions, resulting in a false output from gate 617. The output of gate 617 is an input to gate 661 (FIG. 18C). When gate 617 is false, gate 661 will generate a true output, causing the waste pump to cycle one cycle. At the completion of the waste pump cycle, a true signal will appear on line 677. Line 677 is an input to gate 839. The second input to gate 839 is generated by inverter 671 and is true when the output of gate 617 is false. A false output is generated by gate 839 when both of its inputs are true, resulting in a true output from gate 681 which will cause the pump motor 701 to be driven in reverse, withdrawing the piston from the test cell.

When the piston has been completed withdraw from the test cell, the flip-flop 763, 765 will be one-set, setting one-shot 767 true for a predetermined period of time. The output of gate 767 is an input to gate 741 (FIG. 18B). A second input to gate 741 is generated by inverter 913 and will be true for VC11. A third input to gate 741 is the output of inverter 671. Gate 741 will have a false output to gate 757 when all of its inputs are true. A false input to gate 757 will result in a true output which will advance the valve control counting means to the twelve count configuration.

In the twelve count configuration of the valve control counting means, the valves V1 and V2 are rotated to their "blocked" and "mix" valve positions, respectively, generating a false output from gate 627. The output of gate 627 is inverted true by inverter 771 (FIG. 18B) and connected as an input to gate 773 (FIG. 18C). The second input to gate 773 is from gate 807. The output of inverter 851 (FIG. 18B) generates a false input to gate 807 during VC12, resulting in a true output from gate 807 to gate 773. Gate 773 will have a false output when both of its inputs are true, resulting in a true output from gate 775 to gates 781 and 783. In VC11, the piston was completely withdrawn from the test cell; therefore, flip-flop 763, 765 was set generating a true input to gate 783. Gate 783, then, will generate a false output since both of its inputs are true, resulting in the motor 701 being driven forward to insert the piston into the test cell. When the piston has been completely inserted into the test cell, flip-flop 763, 765 will be reset, placing a true signal input to gate 781. The output of gate 783, then, will become true and the output of gate 781 will become false, resulting in the motor 701 being driven in reverse to withdraw the piston from the test cell. When the piston has been completely withdrawn from the test cell, the flip-flop 763, 765 will be set, setting one-shot 767 true for a predetermined period of time. The output of one-shot 767 is an input to gate 749 (FIG. 18B). A second input to gate 749 is from inverter 915, which is true for VC12. A third input to gate 749 is from inverter 771. Gate 749, then, will generate a false output to gate 757 when all of its inputs are true. A false input to gate 757 will result in that gate generating a true output advancing the valve control counting means one count configuration to the thirteen count.

In the thirteen count configuration of the valve control counting means, the valves V1 and V2 are rotated to their "urine" and "V1 waste" valve positions, respectively, generating a false output from gate 625. The output of gate 625 is an input to gate 785 (FIG. 18C). A false input to gate 785 will result in a true output from that gate which is inverted false by inverter 787. A false output from inverter 787 will cause the motor 701 to be driven forward extending the piston into the test cell. When the piston has been completely inserted into the test cell, flip-flop 763, 765 will become reset, setting one-shot 769 true for a predetermined period of time. The output of one-shot 769 is an input to gate 743 (FIG. 18B). A second input to gate 743 is from inverter 917 which is true when the output from gate 625 is false. Gate 743 will generate a false input to gate 757 when both of its inputs are true. A false input to gate 757 will result in a true output being generated by that gate, advancing the valve control counting means one count configuration to the fourteen count.

With the completion of the thirteen count configuration of the valve control counting means, the creatine analyzer 404 has completed the first analysis of the test fluid in the test cell.

When the valve control counting means assumes the fourteen count configuration, a false output is generated by gate 559 (FIG. 18A) which is inverted true by inverter 501. The output of inverter 501 is an input to one-shot 503. The false to true transition of the inverter 501 will one-set one-shot 503.

Referring now to the timer 400 shown in FIG. 16, gate 492 will generate a false output when the valve control counting means assumes a fourteen count configuration. The output of gate 492 is an input to gate 490. A false input to gate 490 will result in a true output from that gate which is connected as an input to gate 484. A second input to gate 484 is from inverter 482.

Recall that the output of inverter 482 was true when the output from gate 476 became false, indicating that a ten minute period had elapsed since the generation of a test time signal. The output of inverter 482 will remain true until generation of a subsequent test time. The output of gate 484, therefore, will be false for VC14. The false output from gate 484 will drive the accumulator motor forward forcing the remaining urine in the accumulator chamber into the creatinine analyzer lines.

An empty limit switch 937 is associated with the accumulator chamber and has a normally open and a normally closed pole position. Associated with the switch 937 is a flip-flop comprising gates 933 and 935. Flip-flop 933, 935 will be one-set when switch 937 is in its normally open position and will be reset when switch 937 is in its normally closed position. Switch 937 will be in its normally open position when the accumulator chamber is not empty and will assume its normally closed position when the accumulator chamber is empty. When the false output generated by gate 484 has caused the accumulator motor to empty the accumulator chamber, the limit switch 937 will move to its normally closed position, resetting the flip-flop 933, 935. The false output from flip-flop 933, 935 is an input to one-shot 927 and will set the one-shot for a predetermined period of time when the accumulator chamber has been emptied. The output of one-shot 927 is an input to gate 925. The second input to gate 925 is the output of inverter 501 from FIG. 18A. Gate 925 will generate a false output when both of the inputs are true. Inverter 927 inverts the false output of gate 925 and connects it as an input to gate 931. The second input to gate 931 is from gate 466. Gate 466 is true when the timer 400 has indicated that the analyzers are to perform an analysis upon the urine in the accumulator chamber. A false output to gate 921 will be generated by gate 931 when both of its inputs are true. A false input to gate 921 will result in a true output which is inverted false by inverter 923. The output of inverter 923 is an input to gates 523 and 527 in FIG. 18A. A false input to these gates will result in the valve control counting means being preset to a first count configuration. Note that flip-flop 511 in the valve control counting means will also be one-set by a false output from inverter 923. The state of flip-flop 511 distinguishes the first analysis by the creatine analyzer 404 from the second analysis. Flip-flop 511 will be false for the first analysis and true for the second analysis.

Returning now to the timer 400 in FIG. 16, gate 919 has an input from one-shot 503 in FIG. 18A. A second input to gate 919 is from gate 464. Gate 464 will have a true output when the timer 400 indicates that a "calibrate" analysis is to be made by the analyzers on the calibrate fluid. Gate 919 will have a false output, then, when both of its inputs are true. The output of gate 919 is an input to gate 921 and will result in a true output from that gate which is inverted false by inverter 923 setting the valve control counting means in FIG. 18A to the one-count configuration.

Note that if the timer 400 has determined that a "calibrate" analysis to be made by the analyzers, the second analysis by the creatine analyzer 404 will proceed immediately following the termination of the first analysis by the analyzer. If, however, the timer 400 has indicated that an analysis is to be made on the urine in the accumulator chamber, the second analysis will proceed only after the urine remaining in the accumulator chamber has been forced into the analyzer lines.

The second analysis by the analyzer 404 is exactly the same as the first analysis described above with the exception of VC4 and VC9.

In the fourth count configuration of the valve control counting means during the second analysis by the analyzer, the valves V1 and V2 are both rotated to their respective "blocked" valve positions, generating a false output from gate 621. The false output of gate 621 is inverted true by inverter 673 (FIG. 18B) and connected as an input to gate 811. The second input to gate 811 is the true output of flip-flop 511 (FIG. 18A) in the valve control counting means. Flip-flop 511 will be true for the second analysis by the analyzer. Gate 811 will generate a false output to inverter 813 and gate 819 when both of its inputs are true. The output of inverter 813 will become true when the output of gate 811 becomes false. Inverter 813 is an input to flip-flop 815, 817. The false input to gate 819 will result in a true output from that gate to gate 821 and to flip-flops 825, 827 and 829. As previously discussed, a true output from gate 819 will enable the flip-flops of the counter to advance in response to the five-minute clock pulses received by gate 821. After one five-minute clock pulse has been counted by the counter, the output of gate 857 is a one-set input to flip-flop 815, 817. Since the output of inverter 813 has been changed from a false to a true state, a false output from gate 857 will one-set flip-flop 815, 817, turning on the high temperature coils associated with the test cell to heat the test fluid in the test cell. After five more five-minute clock pulses have been received by the gate 821, gate 859 will generate a false output. The output of gate 859 is a reset input to flip-flop 815, 817 and will reset the flip-flop when its output is false. When the flip-flop 815, 817 is reset, the current is removed from the heating coils in the test cell. Five minutes after the flip-flop 815, 817 has been reset, the output of gate 861 will become false. The output of gate 861 is inverted true by inverter 863 and connected as an input to gate 745. A second input to gate 745 is from inverter 673 which is true at this time. A false output to gate 757 will be generated by gate 745 when both of its inputs are true. A false input to gate 757 will result in a true output from that gate, causing the valve control counting means to advance one count to the five count configuration.

The second variation in the second analysis by the analyzer 404 occurs in VC9. All functions for th second analysis in VC9 are the same as they were for the first analysis, with the exception of the data readout. Recall that the time delay counting means was enabled by a false output from gate 853 (FIG. 18B). After six five-minute clock pulses had been counted by the counting means, the output of gate 859 became false. The output of gate 859 was inverted by inverter 865 and applied to the input of gate 867. The output of gate 853 which was false was inverted by inverter 855 and applied to gate 867. Since both of the inputs to gate 867 are true, a false output will be inverted by inverter 869 and applied as an input to gate 871, enabling that gate. The data handling time delay means, then, was allowed to advance in response to the one-minute clock pulse inputs to gate 871. After one clock pulse had been received, gate 881 generated a false output which was inverted by inverter 833 and applied to gates 885 and 887. For the second analysis by the analyzer, flip-flop 511 would be true, thus enabling gate 887 to generate a false output to preset word 6. The first analysis by the analyzer resulted in a false output by gate 885 to preset word 4. After two one-minute clock pulses had been counted, the output of gate 889 became false to gate 891 and inverter 897. A false input to gate 891 resulted in a trigger for words 4, 5, 6 or 7 to the data handling system. Inverter 897 inverted the false output of gate 889 true and connected it as an input to gates 899 and 901. For the second analysis by the analyzer, gate 901 generates a false output to preset word 7 and drive word 6 in the data handling system. After four one-minute clock pulses have been received, gate 903 will generate a false output to gate 891 and inverter 905. The false input to gate 891 will trigger words 4, 5, 6 or 7 in the data handling system. Inverter 905 inverts the false output of 903 and connects it as an input to gates 907 and 909. For the second analysis, gate 909 will have a false output driving word 7 in a data handling system.

When the system has sequenced through its second analysis and the valve control counting means is in the 13 count configuration, the pulse into the valve control counting means to advance it will result in the output of gate 561 becoming false instead of gate 559 due to the state of flip-flop 511. The output of gate 561 is an input to a flip-flop comprising gates 939 and 941 in the timer 400 circuit of FIG. 16. A false output by gate 561 will set the flip-flop 939, 941. The true output of flip-flop 939, 941 is an input to gate 500.

When the creatine sequencer 404 was initiated by a "start" command from gate 500 in the timer 400, a false output was generated by gate 535, FIG. 18A. The false output of gate 535 is a reset input to flip-flop 939, 941. This results in the output from the flip-flop connected to the gate 500 remaining true throughout the sequence, disabling the gate 500. When the flip-flop 939, 941 is set at the termination of both analyses by the analyzer, the gate 500 is then enabled since the output from flip-flop 939, 941 is true.

It will be remembered that in conjunction with FIG. 10 it was explained that the detected output voltage from the test cell during the calcium test was amplified by data amplifier 313. The amplitude of the analog signal produced by the data amplifier 313 is a measure of the calcium in the tested sample. Also mentioned was a resistor/thermistor system used to detect the temperature of the test cell during the calcium measurement which is designated block 800 in FIG. 19. The amplitude of the signal developed by the sensor 800 is a measure of the temperature of the cell during the calcium measurement. Likewise, a data amplifier 802, in FIG. 19, produces an analog signal representative of the creatinine concentration in the sample measured in the creatine/creatinine analyzer 404 and a resistor thermistor system 804 produces an analog signal representative of the temperature of the test cell during the creatine/creatinine measurement.

A multiplexer 810 has a plurality of input channels. The various signals derived from the amplifiers in FIG. 19 are connected to the input channels of multiplexer 810. The various input channels are actuated in sequence to permit the analog signals input from the amplifiers to be successively connected to the output of the multiplexer 810. The calcium sequencer 402 generates drive signals for words 1 and 2 which are inputs to the multiplexer 810. When the word 1 drive signal is generated, the input analog signal generated by the calcium data amplifier 313 is connected as the output of the multiplexer 810. The output from the calcium temperature sensor 800 is connected to the output of multiplexer 810 when the drive word 2 signal is generated by the calcium sequencer 402.

The CR/CR sequencer 404 generates drive signals for words 4, 5, 6 or 7 and are connected as inputs to the multiplexer 810. The generation of the drive word 4 and drive word 5 signals by the CR/CR sequencer 404 will result in the input from amplifier 802 and 804 being successively connected as the output for multiplexer 810. The generation of these drive signals will occur during the first analysis by the CR/CR sequencer 404. During the second analysis by the CR/CR sequencer 404, the drive word 6 and drive word 7 signals will be generated. The signals will also result in the outputs of amplifiers 802 and 804 being successively connected as the output of multiplexer 810.

The output of multiplexer 810 is an input to an analog to pulse width converter (APW) 812. The converter 812 will produce two output pulses. The time between pulses is an exact and direct measurement of the corresponding analog signal passed to the converter 812 by the multiplexer 810. The analog input to pulse width output conversion by converter 812 is initiated by the trigger words 1 and 2 input signals from the calcium sequencer 402 and the trigger words 4, 5, 6 or 7 input signals from the CR/CR sequencer 404.

The pulse pair generated by converter 812 are inputs to data handling system 814. System 814 comprises a plurality of counting means. Each counting means corresponding to a word. The counting means will be preset to an initial condition by the preset words 1 and 2 signals generated by the calcium sequencer 402 and preset words 4, 5, 6 or 7 signals generated by the CR/CR sequencer 404. System 814 also includes a pulse source and gating means.

The first pulse received by the system 814 from the converter 812 will enable the gating means. The second pulse from converter 812 will disable the gating means. While the gating means is enabled, the output of the gating means will follow the output of the pulse source. Each counting means in the system 814 also has an input gate associated with it. The pulsing output of the gating means is connected as an input to each of the input gates associated with each counting means in the system 814. The drive words 1 and 2 input signal from calcium sequencer 402 and the drive words 4, 5, 6 and 7 input signals from the CR/CR sequencer 404 will enable a particular input gate to the counting means. For example, when the sequencer 402 generates the drive word 1 signal, the input gate to the counting means in system 814 corresponding to word 1 will be enabled allowing the counting means for word 1 to advance in response to the pulse source. Recall that the duration of the pulses received by the counting means is dependent upon the time between pulses received from the analog to pulse width converter 812. Therefore, the final number contained in the counting means is a digital representation of the analog signal input to the converter 812.

The details of the multiplexer 810 are shown in FIG. 20. The multiplexer has a series of input terminals 820, 822, 824, 826, 828, 830 and 832 which are connected to the various data amplifiers and sensors seen in FIG. 19. The multiplexer 810 includes a group of field effect transistors Q1–Q7 which are all connected to a common output terminal 834. The output terminal 834 as shown in FIG. 19 is connected to the APW converter 812. The multiplexer 810 also includes a series of NPN transistors Q11–Q17. The input drive signals on terminals 836, 838, 840 842, 844, 846 and 848 are connected to the bases of the transistors Q11–Q17. The inputs to the input terminals 836–838 are derived from the logic control circuits associated with the calcium sequencer 402 and the CR/CR sequencer 404.

Whenever one of the drive signals connected to terminals 836–848 becomes false, a positive potential, the corresponding transistor Q11–Q17 is turned on, lowering the collector voltage of the particular transistor, back-biasing the corresponding diode CR1–CR7. Each of the transistors Q11–Q17 has one of the field effect transistors Q1–Q7 associated with it. When one of the drive transistors Q11–Q17 is turned on, the associated field effect transistor is operated with zero gate-source voltage and minimum resistance from drain to source. This results in the corresponding analog input being switched to the output terminal 834.

Figure 22A:
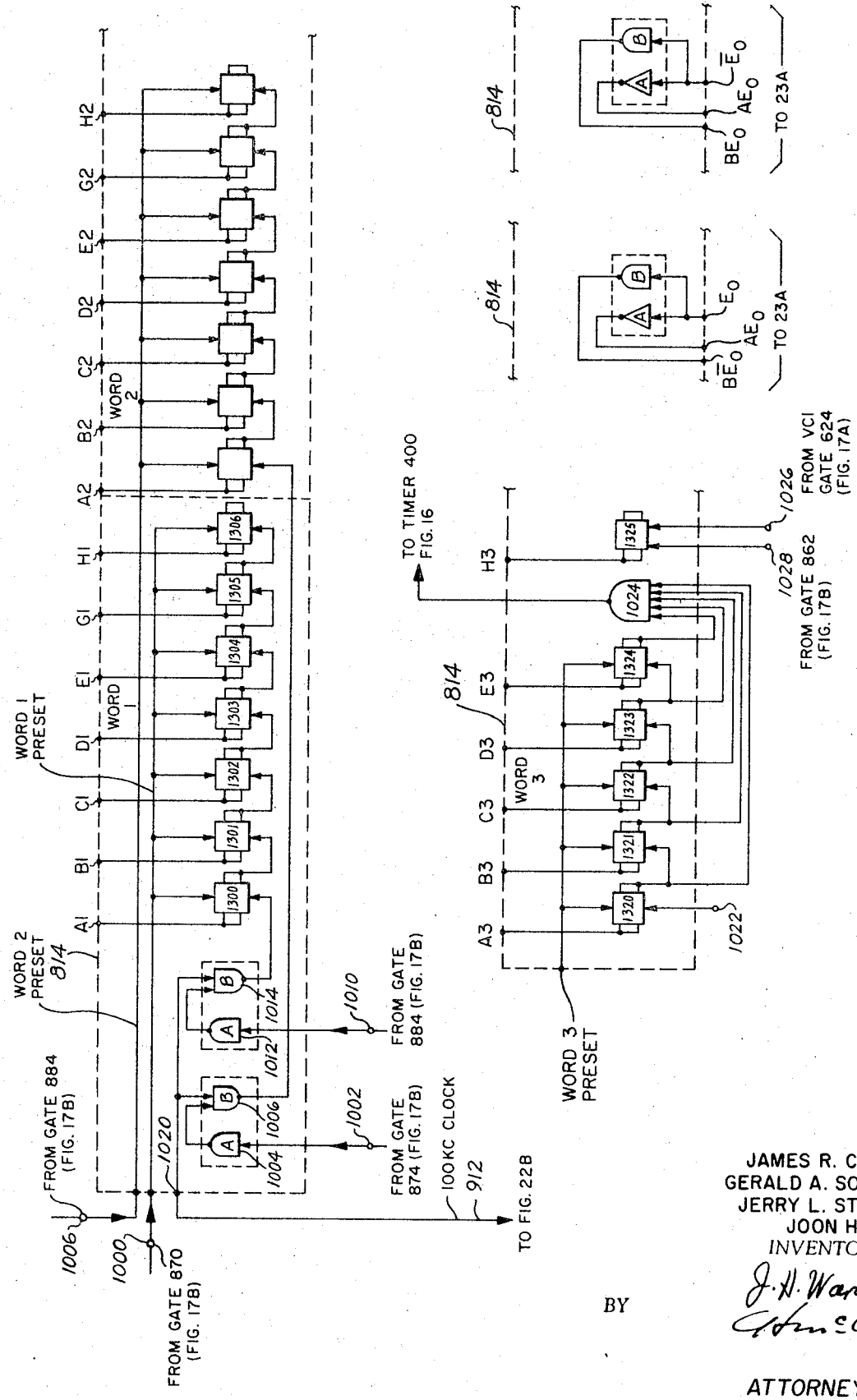
Figure 22B:
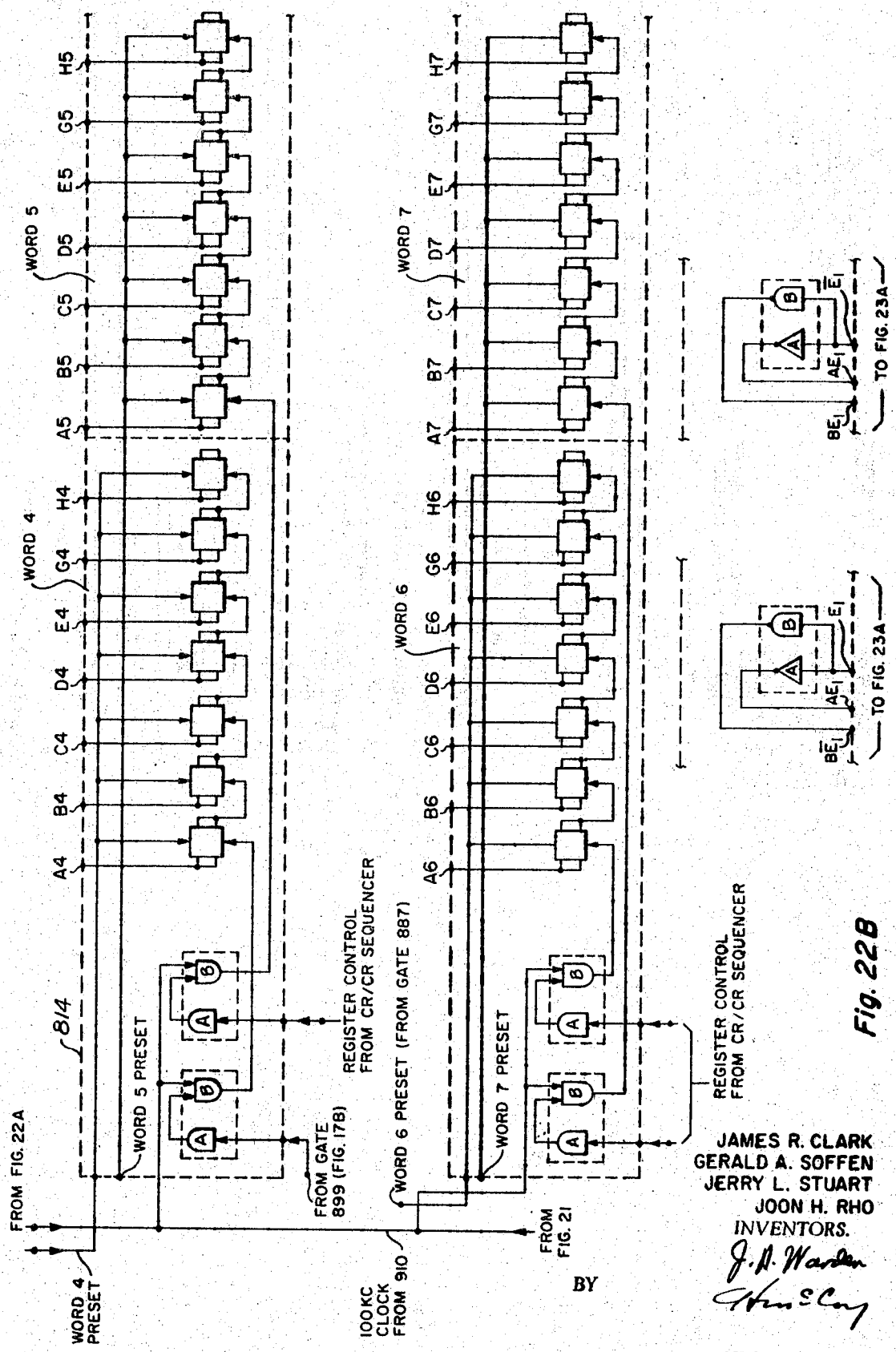

The data handling system 814 is shown in FIGS. 22A and 22B, and includes a plurality of counting means, or registers, designated as words 1–7. Each word, or register, corresponds to a particular data word. Before a word is introduced into a particular register, the register is first preset. For example, the output of gate 870, seen in FIG. 17B, is connected as an input to word 1 at terminal 1000 in FIG. 22A. When the output of gate 870 becomes false, word 1 comprising flip-flops 1300–1306 is preset to a zero count configuration.

Referring now to FIG 21, the pulse pair generated by the APW converter 812 are connected as inputs to the data handling system 814 at terminals 900 and 902. The signals on terminals 900 and 902 are set and reset inputs to a flip-flop comprising gate 904 and 906. When the first pulse from the APW converter 812 is received on terminal 900, flip-flop 904, 906 will be set. The second pulse input from the converter 812 on terminal 902 will reset the flip-flop. The true output of flip-flop 904, 906 is an input to gate 908. A second input to gate 908 is the output of a 200 kc. pulse source. When the gate 908 is enabled by flip-flop 904, 906 being set true, its output will follow the pulse source input. The output of gate 908 is an input to a one-shot multivibrator 910. The one-shot 910 will divide the pulse output of gate 908 by two, generating a 100 kc. pulse rate on line 912. The pulse rate on line 912 will continue until the second pulse input to the data handling system 814 is received from the APW converter 812 on terminal 902, resetting flip-flop 904, 906.

Each counting means has an input gating means associated with it. For example, in FIG. 22A, word 1 has an input gating means comprising inverter 1012 and gate 1014. The 100 kc. pulse rate on line 912 from one-shot 910, FIG. 21, is connected as an input on terminal 1020. The drive word 1 signal generated by inverter 884 in FIG. 17B is connected as an input on terminal 1010. Inverter 1012 inverts the signal input on terminal 1010 and connects it as an input to gate 1014. When the output of inverter 884 is false, inverter 1012 inverts it true and enables gate 1014. The second input to gate 1014 is from input terminal 1020. The output of gate 1014 then will follow the pulses received on terminal 1020, so long as the drive signal from inverter 884 is present. The output of gate 814 is an input to binary 1300 in the word 1 counting means. Binaries 1300 through 1306 in the word 1 counting means are interconnected to form a binary counter. The word 1 counting means will therefore advance one configuration for each pulse received on terminal 1020.

In summary, then, it will be recalled, referring to FIG. 17B, that gate 870 will generate a false output to preset word 1 in FIG. 22A. Inverter 884 will then generate a false output and is connected as an input to the multiplexer 810 and the data handling system 814. The drive word 1 output of inverter 884 will result in the analog output from the calcium data amplifier 313, seen in FIG. 19, being connected as the output of the multiplexer 810 to APW converter 812. At the same time that the drive word 1 signal is generated by inverter 884, the output of inverter 880, trigger word 1, is generated as an input to the APW converter 812, resulting in the converter 812 generating a pair of pulses having a time interval dependent upon the magnitude of the analog output of amplifier 313. The pulse pair output of converter 812 to data handling system 814 will enable a pulse source which is connected as an input to register word 1. The drive word 1 output of inverter 884 enables the input gating means to register word 1, allowing the counting means to count the number of pulses appearing from the pulse source. In a like manner, the analog signals generated by the amplifiers seen in FIG. 19 as inputs to multiplexer 810, are converted from analog signals to digital representations in the data handling system 814.

Word 3 in the data handling system 814, shown in FIG. 22A, is not used for data storage but instead is employed by the system. Referring to the timer 400 circuit shown in FIG. 16, it will be recalled that flip-flop 508, 510 was one-set each time a predetermined amount of urine was dumped into the accumulator chamber. The true output of flip-flop 508, 510 is an input to terminal 1022 in FIG. 22A. The counting means comprising binaries 1320 through 1324 for word 3 will be advanced one count configuration each time the flip-flop 508, 510 is one-set. At any given time, then the count configuration of the binaries in word 3 will reflect the number of urine dumps received by the accumulator chamber. The outputs of the flip-flops 1320–1324 are connected as inputs to gate 1024. Gate 1024 will generate a false output when the flip-flops in word 3 indicate that two or more urine dumps have been made into the accumulator chamber. The output of gae 1024 is a reset input to flip-flop 478, 480. FIG. 16. Recall that the state of flip-flop 478, 480 is the means by which the timer 400 determines whether a sufficient amount of urine is present in the accumulator chamber to perform a urine analysis. If the output of gate 1024 is not false, the flip-flop 478, 480 will remain true, indicating to the timer 400 that a calibrate analysis must be made instead of a urine analysis.

Also contained in word 3 is a flip-flop 1325. Flip-flop 1325 will be set true by a false signal input on terminal 1026 and will be set false by a false signal input on terminal 1028. Referring now to FIGS. 17A and 17B, the output of gate 624 is connected as an input to flip-flop 1325 on terminal 1026. When the calcium sequencer 402 is initiated as indicated by a false output from gate 624, flip-flop 1325 will be one-set. If, during the analysis, the output of gate 862, FIG. 17B, becomes false indicating that the analyzer 402 must further dilute the test fluid in the test cell, flip-flop 1325 will be reset.

In the timer 400 circuitry in FIG. 16, inverter 454 generated a false output for each of the 3, 9, 15, 21 hour test times plus one hour. The output of gate 454 is the preset input to word 3, seen in FIG. 22A. A false input to word 3 on the preset line will set all the flip-flops in word 3 false. This allows word 3 to count the number of urine dumps into the accumulator chamber during the ten-minute sampling time following each test hour. The false output of inverter 454 also one-set flip-flop 478, 480. At the end of the ten-minute sampling period, flip-flop 478, 480, then, will be reset if the output of gate 1024 indicates that a sufficient amount of urine has been dumped into the accumulator chamber.

Figure 23B:
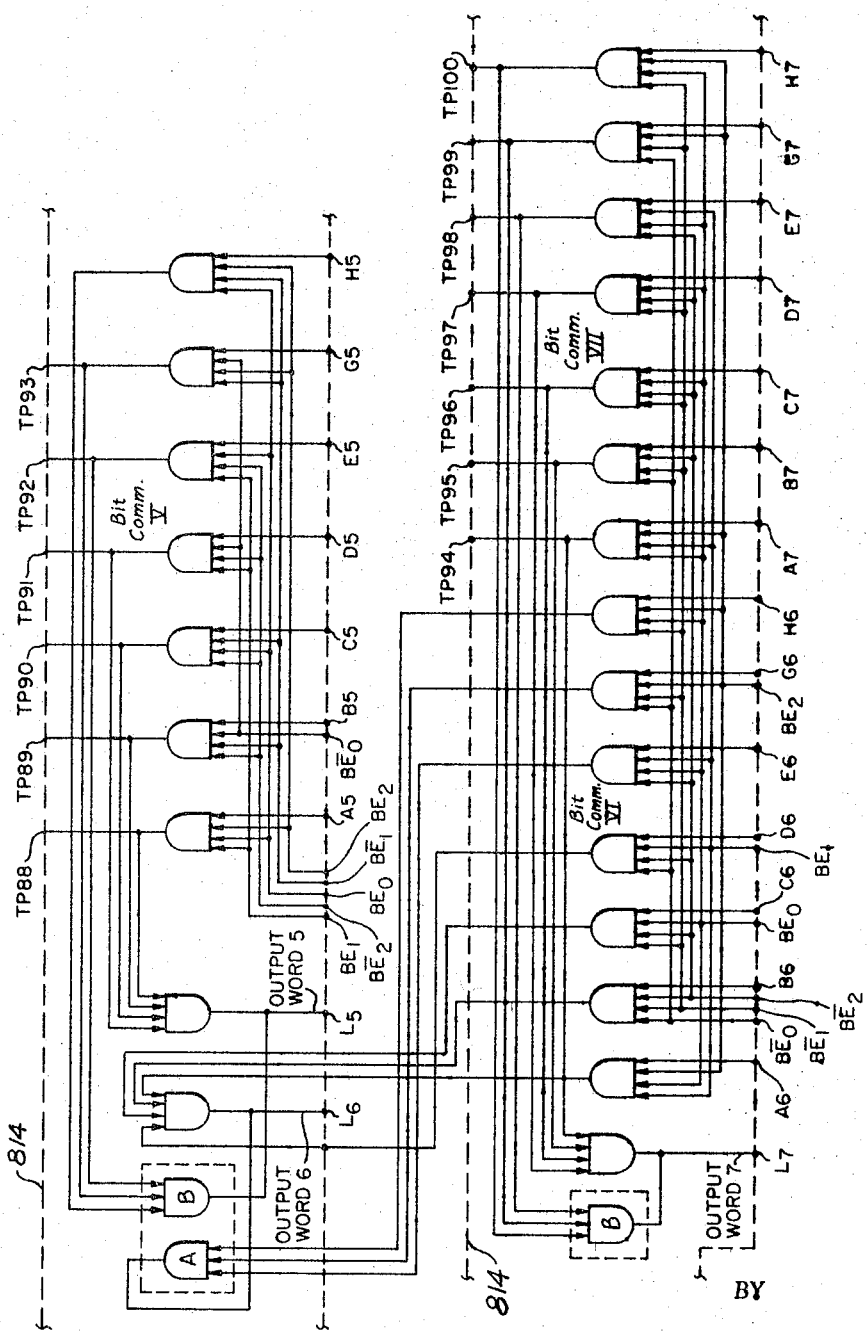

Each of the registers seen in FIGS. 22A and 22B has a bit commutating means associated with it. For example, the outputs of binaries 1300 through 1306 comprising the Word 1 register are connected as inputs to Bit Commutator I comprising gates 1370 through 1376 seen in FIG. 23A. The system also includes a bit counting means seen in FIG. 21 comprising flip-flops $E_0$, $E_1$ and $E_2$. A clock input to flip-flop $E_0$ will advance the bit counter. The true and false outputs of the flip-flops $E_0$, $E_1$ and $E_2$ are amplified and inverted. For example, the true output of flip-flop $E_2$ is an input to amplifier 920 and to inverter amplifier 922. The amplified true and false outputs from the flip-flops in the bit counting means are connected as inputs to each of the bit commutating means. Each of the bit commutating means associated with each word register has seven decoding gates, each gate corresponding to a particular bit contained in each word register. As the bit counting means advances from one configuration to the next, the decoding gates in the bit commutating means are sequentially enabled. For example, in the bit commutating means corresponding to the word 1 register, seen in FIG. 23A, gate 1370 is enabled by the bit counting means in its first count configuration. Gate 1371 is enabled by the bit counting means in its second count configuration, and so on. At the end of seven count configurations then, each of the gates comprising the bit commutating means has been enabled. The decoding gates in bit commutating means I are connected as inputs to gates 1100 and 1102. Gates 1100 and 1102 have a common output designated "output word 1" in FIG. 23A. As the bit counting means advances from one count configuration to another, the gates 1100 and 1102 will have outputs determined by the bits contained in the corresponding word register. At the end of seven counts, the signals appearing as the output of gates 1100 and 1102, then, represent in serial form the information contained within the word 1 register. At the same time that the register word 1 is being transformed into a serial representation on "output word 1," the other word registers are also being serially read out on their corresponding word lines, seen in FIGS. 23A and 23B.

The data handling system 814 also includes a word counting means comprising flip-flops, $F_0$, $F_1$, $F_2$ and $F_3$ seen in FIG. 21. The true output of flip-flop $E_2$ in the bit counting means is an input to flip-flop $F_0$ in the word counting means. Each time the bit counting means has completed a seven-state cycle, the word counting means will be advanced one count configuration. The outputs of the flip-flops in the word counting means are connected as inputs to word scanning means comprising gates 1200, 1202, 1204, 1206, 1208, 1210, 1212 and 1250 seen in FIG. 24. For each particular count configuration of the word counting means, a corresponding gate in the word scanning means will be enabled. For example, for the first count configuration, the gate 1200 will be enabled; for the second count configuration, the gate 1202 will be enabled; and so on. The gates 1200 through 1212 also have inputs from the bit commutating means. The outputs of gates 1100 and 1102, corresponding to word 1, seen in FIG. 23A, are connected as input to gate 1200 in FIG. 24. Word 2 is an input to gate 1202 etc. Each of the gates 1200–1212 will be sequentially enabled for one word time. Therefore, when a gate is enabled by the word counter, the output of that gate will correspond to the contents of a particular word register. For example, the output of gate 1200, when the word counting means is in the first count configuration, will represent the contents of word 1 in serial form.

The outputs of the gates 1200–1212 are connected as inputs to gate 1250. The output at gate 1250 will depend upon the output from whichever gate is enabled. At the end of seven word times, then, the output signal generated by gate 1250 will have represented the contents of each of the seven word registers converted to serial form. That is, during count configuration 1 of the word counting means, the contents of word register 1 will appear serially as an output from gate 1250. During count configuration 2 of the word counting means, the contents of word register 2 will appear serially as an output from gate 1250, etc.

The following detailed discussion of the preferred chemical systems, is presented to provide a better understanding of the operation of the apparatus of this invention and the specific microchemistry which has been developed for use with this apparatus.

ANALYSIS FOR CALCIUM

The amount of calcium in a fluid sample may be determined with the apparatus of this invention, for example, by fluorometric analysis. The calcium is combined in the apparatus in a 2:1 ratio with 3,6 dihydroxy-2,4-bis-N,N' (carboxymethyl)aminomethyl fluoran (Calcein) to form a fluorescent complex (chelate). The reagent itself possesses little fluorescence in 0.8 M KOH, but strong fluorescence appears in the presence of calcium, barium or strontium in the urine. Other ions, such as sodium, potassium, magnesium, chloride, and phosphate which may be present in the urine do not interfere with the fluorescent process, nor does protein. The working reagent consists, for example, of 0.02 mg./ml. calcein in 0.8 M KOH. This solution is stable for at least a month when kept in a polyethylene bottle at room temperature in the dark. When the amount of calcium in the urine is to be determined, a 50:1 ratio of reagent to urine is suitable. Because there is a negative temperature coefficient of fluorescence of 1 percent degree centigrade between 20° and 30°, the reagent and urine are allowed to reach an equilibrium state at, for example, 25°±1° centigrade for ten minutes after mixing and before reading the fluorescence. Maximum excitation of the chelate occurs at 490 millimicrons, and emission occurs at 520 millimicrons, but other suitable wave lengths are easily chosen.

ANALYSIS FOR UREA

Urinary urea is another example of a selected constituent which can be quantitatively determined by the apparatus of this invention fluorimetrically by the use of a reagent such as alpha-isonitrosopropiophenone or diacetyl derivatives in an acid solution. The reaction with alpha-isonitrosopropiophenone requires special precautions because of the long heating time required for the production of color and because of the photosensitivity of the color form. The compounds produced by the reaction of urea with diacetylmonoxime in acid solution exhibit two fluorescence maxima, one at 420 millimicrons and the other at 520 millimicrons, when irradiated at a single excitation maximum. The use of the second fluorescent peak for quantitative analytical method is preferred. The reaction is specific to urea, as shown by experimental results. The linearity of the fluorescence intensity against the sample concentration extends over a large portion of the fluorescence scale, without decreasing the sensitivity of the method. The diacetylmonoxime reagent solution may consist of 0.2 percent by weight diacetylmonoxime and 5 percent by weight sodium chloride in 3.6 N sulfuric acid. The urine sample may be analyzed in the apparatus by mixing it with the reagent solution in a volume ratio 1:19 to 1:40. For the determination it is only necessary that the diacetyl moiety of the reagent be in excess of the urea content of the urine, however, to obtain an accurate reading for all of the urea. The solutions are then heated at 100° centigrade for 20 minutes, and after cooling to room temperature, the fluorescence is read at 520 millimicrons.

ANALYSIS FOR CREATININE AND CREATINE

A fluid, such as urine, is analyzed to determine the amount of creatinine therein with the apparatus of this invention using a colorimetric analyzer unit by first premixing a sample of the urine with sulfuric acid to adjust the pH to a range favorable for the conversion of creatine to creatinine. A reagent consisting of picric acid, a hydroxide and a stabilizer is then mixed with the acidified urine. Preferably, the molar ratio of picric acid in the reagent to urine is at least 4 to 1. The volume ratio of reagent to urine may be 40 to 1 depending upon the picric acid concentration of the reagent. After mixing in the mixing chamber, as described in sequencing Table 1, the optical density of the mixture is determined for a wave length of 480 to 490 millimicrons. This density is then compared with a predetermined standard curve to obtain the quantity of creatinine present in the fluid.

To determine the quantity of creatine present in the urine an equivalent acidified sample without reagent is heated to about 100° centigride for about 30 minutes.

This converts all of the creatine to creatinine. Another creatinine determination, as described, is then made and the results obtained without heating are subtracted from the results obtained after heating to provide an accurate determination of the quantity of creatine.

With the small quantities of reagents and urine samples analyzed by the apparatus of this invention, best results have been obtained by using a concentrated acid such as 2 normal to 8 normal sulfuric acid to adjust the pH of the sample. The concentration of the acid, however, is dependent upon the total volume of the urine sample and the volume of the acid added thereto.

The quantity of acid added may be best expressed as the amount sufficient to bring the pH of the urine sample within the range from 0.1 to 1.0. A pH of 0.2 is preferred since it has been found that when the pH of the urine sample is about 0.2 practically all of the creatine is converted to creatinine upon heating.

The conversion is preferably carried out at a temperature of about 100° centigrade and a heating time of 30 minutes. The temperature can be varied between 95 to 105° centigrade, however, and the heating time may be varied from 20 to 35 minutes without adversely affecting the conversion.

The constituents of the reagent may be varied within broad limits as long as certain overall functions of the reagent are satisfied. In general the picric acid may be varied from .1 to 1.30 percent by weight and the metal salt may be varied from .01 to 1 percent by weight. The remainder of the reagent is aqueous metal hydroxide having a normality of less than 1.5 and preferably greater than 0.48. The preferred lower concentration of the hydroxide is in excess of that amount of hydroxide necessary to neutralize the acid added to the urine sample and the normal urine acidity so as to provide an alkaline environment for the creatinine determination. If the urine sample has not been acid treated, or, has been acid treated and then diluted with an alkaline solution, the hydroxide concentration of the reagent can be reduced to about 0.08 N NaOH or less. The limiting factor is that the concentration of hydroxide must be sufficient to provide an alkaline environment for the colorimetric determination of creatinine.

The stabilizer may be any metal salt which does not interfere with the colorimetric determination such as potassium chloride, sodium acetate etc. The alkali metal halides are preferred and the most preferred salt is sodium chloride since it is already present in urine. The alkaline solution may be any metal hydroxide such as potassium hydroxide or sodium hydroxide with the alkali metal hydroxides being preferred and with sodium hydroxide being most preferred.

The preferred reagent mixture used in the process of this invention is about .1 to .3 percent by weight saturated picric acid, about 2 to 2.5 percent by weight sodium hydroxide, .3 to .6 percent by weight sodium chloride and the balance water. Picric acid provides alkaline picrate for combination with the creatinine to form a red chromogen which exhibits an optical density for a 480 to 490 millimicron wave length peak which is linearly proportional to the amount of creatinine present. It has been found necessary to use about 0.015 normal picric acid or about 0.3 percent by weight in the reagent for combining with the creatinine in primate urine under most conditions of muscle deterioration. This concentration of picric acid provides sufficient picrate for formation of the reaction product. For fluids containing less amounts of creatinine, of course, the picric acid content of the reagent can be reduced. The most concentrated picric acid tolerable in the reagent is about 0.06 normal or about 1.3 percent by weight since alkaline picrate absorbs the energy from the wave length of a 360 millimicron peak and this absorption interferes with the creatinine determination.

The picric acid concentration may also be expressed in terms of the creatinine concentration of the urine sample.

It has been found that the molar ratio of picric acid to creatinine in the reagent-urine mixture should be at least 4 to 1 to assure a reliable determination. For this reason, it is preferred to use a volumetric ratio of reagent to sample of at least 4 to 1 or greater for the range of picric acid employed in the reagent and the concentrations of creatinine in primate urine.

The sodium hydroxide or other alkali metal hydroxide is added to the reagent to provide an alkaline environment for formation of the alkaline picrate-creatinine reaction product. The hydroxide concentration of the reagent must be sufficient so that all acids in the sample will be neutralized and the reagent-sample mixture will be alkaline. The picric acid begins to crystallize out of the reagent if the sodium hydroxide concentration is above 1.5 normal. Thus it has been found necessary to maintain the alkaline concentration in the reagent below this level.

The salt is added to stabilize the mixture of picric acid and hydroxide. Consequently the concentration of salt in the reagent is dependent upon the concentrations of picric acid and sodium hydroxide. For practical purposes the salt concentrations may be varied from 0.1 to 1.0 percent and the preferred amount is about 0.45 percent by weight. Any amount of the salt is effective, however, in the reagent as a stabilizer.

To determine the effectiveness of the premixed creatinine and creatine reagent and the apparatus of this invention, a known quantity of creatinine was added to a sample of urine in suffiient amount, to provide a 10 millimolar concentration of creatinine in a 100 microliter quantity of the sample.

A reagent was prepared by premixing 100 microliters of a 40 millimolar solution of picric acid with 250 microliters of a 2.4 N sodium hydroxide solution and 350 microliters of an aqueous solution of 0.9 percent by volume sodium chloride as a stabilizer.

The sample with creatinine added was mixed with 200 microliters of 2 N sulfuric acid and the premixed reagent to provide a mixture having an alkaline picrate to creatinine molar ratio of 4:1. The optical density of the mixture at a wave length of 480 millimicrons was measured at 100° centigrade and was found to be 0.84. This measurement of optical density corresponded with the predetermined standard reading for a 1 millimolar concentration of creatinine.

Similar experiments were carried out in the apparatus of this invention after storing the premixed reagent at various temperatures for from 1 to 44 days. For example, colorimetric creatinine determinations were made with the reagent after storing at 4° centigrade for 4, 7, 16, 18, 22, 28, 32, 35 and 44 days with acidified urine samples known to contain creatinine concentrations of 2.5 millimolar, 5 millimolar, 10 millimolar, 15 millimolar, 20 millimolar and 25 millimolar. The reliability of the reagent remained consistently good throughout the tests with the quantitative determination of creatinine varying from 90 to 100 percent accuracy. Another quantity of reagent was stored at 25° centigrade and colorimetric creatinine determinations were made using this reagent at the same time periods as the reagent stored at 4° centigrade on equivalent urine samples. The reliability of the reagent stored at 25° centigrade remained consistently good up to 35 days with the quantitative determination of creatinine varying from 90 to 100 percent accuracy. After 35 days the reagent decreased appreciably in effectiveness. The results of these tests are tabulated in Table 3.

TABLE 3.—Optical Density
[Creatinine concentration]

|  | 2.5 mM. | 5 mM. | 10 mM. | 15 mM. | 20 mM. | 25 mM. |
|---|---|---|---|---|---|---|
| Days stored at 4° C.: | | | | | | |
| 0 | .13 | .25 | .49 | .72 | .91 | 1.15 |
| 4 | .13 | .25 | .50 | .73 | .95 | 1.15 |
| 7 | .14 | .25 | .49 | .73 | .94 | 1.15 |
| 16 | .13 | .27 | .51 | .75 | .95 | 1.18 |
| 18 | .14 | .27 | .51 | .76 | .95 | 1.20 |
| 22 | .13 | .25 | .51 | .75 | .96 | 1.18 |
| 28 | .13 | .27 | .52 | .75 | .98 | 1.18 |
| 32 | .13 | .26 | .51 | -- | .94 | 1.14 |
| 35 | .13 | .26 | .53 | .76 | 98 | 1.20 |
| 44 | .13 | .25 | .50 | .71 | .99 | 1.15 |
| Days stored at 25° C.: | | | | | | |
| 0 | .13 | .24 | .47 | .71 | -- | 1.14 |
| 4 | .13 | .25 | .50 | .73 | .95 | 1.15 |
| 7 | .13 | .27 | .50 | .76 | .97 | 1.16 |
| 18 | .14 | .27 | .50 | .74 | .95 | 1.15 |
| 22 | .14 | .26 | .50 | .73 | .95 | 1.15 |
| 28 | .14 | .26 | .50 | .71 | .90 | 1.10 |
| 32 | .14 | .25 | .49 | .71 | .90 | 1.05 |
| 35 | .13 | .25 | .48 | .69 | .88 | 1.03 |
| 44 | .13 | .25 | .45 | .65 | .81 | 0.95 |

Another series of tests were run using one embodiment of the apparatus of this invention with a reagent containing fixed amounts of sodium hydroxide and sodium chloride but varying amounts of picric acid to determine the most favorable molar ratio of picric acid to creatinine. These reagents were mixed with equivalent liquid samples containing constant concentrations of creatinine and sulfuric acid. The results of these tests are set forth in Table 4.

TABLE 4

| Creatinine [1], mM. | Picric acid [2], mM. | Ratio, acid: creatinine | Optical density at 480 mu |
|---|---|---|---|
| 1 | 0.5 | 5:1 | 0.18 |
| 1 | 1.0 | 1:1 | 0.46 |
| 1 | 2.0 | 2:1 | 0.73 |
| 1 | 4.0 | 4:1 | 0.84 |
| 1 | 6.0 | 6:1 | 0.84 |
| 1 | 8.0 | 8:1 | 0.84 |

[1] 100 microliters of a 10 millimolar solution of creatinine mixed with 200 microliters of $2NH_2SO_4$.

[2] Reagent also contained 250 microliters of 2.4 N sodium hydroxide and 350 microliters of 0.9 percent by volume sodium chloride stabilizer.

The apparatus of the invention provides, in general, a compact, mobile laboratory for microchemical fluid analysis and has the capability of operating independently of water availability, and on its own batteries independently of external power sources. That is, the apparatus of the invention is a completely self-contained portable unit. Although the apparatus is described herein in conjunction with a specific utilization, it should be understood that it has general utility, in that it has capabilities for providing a continuous automatic independent monitoring of a large number of blood and urinary constituents or other fluids.

What is claimed is:

1. Electronically controlled apparatus for the automated analysis of a selected fluid comprising:

a source of fluid to be analyzed;

a source of reagent to be mixed with said fluid;

a test cell;

a mixing chamber for the fluid and reagent;

feed means for alternately coupling said source of fluid and said source of reagent to said test cell for introducing said fluid and reagent into said test cell in predetermined proportions and for coupling said test cell to said mixing chamber after said introduction and before measurement to provide a mixture of fluid and reagent in said test cell;

electrically controlled means for selectively coupling said feed means to said source of fluid and to said source of reagent and for selectively coupling said test cell to said mixing chamber;

electrical logic control circuitry coupled to said electrically controlled means and to said feed means for automatically sequencing said electrically controlled means and for selectively activating said feed means; and means operatively associated with said test cell for quantitatively measuring a characteristic of the fluid and reagent mixture and for producing an electrical signal representative of the amount of a selected constituent in said fluid.

2. An apparatus as defined in claim 1 further comprising means self-contained within said apparatus for periodically calibrating said apparatus.

3. An apparatus as defined in claim 1 further comprising means self-contained within said apparatus for continually monitoring the condition of said reagent.

4. Apparatus for the analysis of a selected fluid as defined in claim 1 wherein said feed means comprises means for supplying said fluid and said reagent to said test cell and means for metering said predetermined portions of said fluid and said reagent into said test cell and transfer means for transferring said fluid and reagent from said cell to said chamber.

5. Apparatus for the analysis of a selected fluid as defined in claim 4 wherein said source of fluid and said source of reagent comprises collapsible compartments within said apparatus containing said fluid and said reagent and wherein said supplying means comprises means for collapsing said compartments and forcing said fluid and said reagent to the entrance to said test cell and said metering and transfer means comprises syringe means mounted within said test cell for selectively drawing said fluid and said reagent into said test cell and for transferring said introduced mixture between said cell and said chamber.

6. Apparatus as defined in claim 5 wherein said means for collapsing said compartments comprises a pressure-tight container surrounding said compartments and means for applying a pressurized atmosphere to said container.

7. The apparatus defined in claim 1 further comprising means for providing temperature control of said test cell during the operation of said apparatus.

8. The apparatus defined in claim 1 further comprising a reference cell, said measuring means being further operatively associated with said reference cell so as to provide a reference level for the electrical signal produced thereby.

9. Apparatus as defined in claim 1 wherein said feed means comprises pumping means and said electrically controlled means comprise valve means.

10. Apparatus as defined in claim 9 wherein said valve means selectively couples said pumping means to said mixing chamber.

11. Apparatus as defined in claim 10 and further comprising control circuitry for electrically actuating said pumping means through a predetermined number of pumping-mix cycles when said valve means couples said pumping means to said mixing chamber.

12. Apparatus as defined in claim 11 further comprising limit defining means operatively associated with said pumping means for defining the terminal positions of said pumping means during a mix cycle, means responsive to actuation of said limit defining means for counting the number of mix cycles and means for disabling said pumping means when a predetermined number of mix cycles have been counted.

13. Apparatus as defined in claim 1 wherein said feed means includes a piston extending into said test cell, and further includes electrically actuated drive means for reciprocally moving said piston with respect to said test cell to meter said fluid and said reagent and to said test cell and subsequently to discharge the same therefrom.

14. Apparatus as defined in claim 1 and further comprising a waste system including an electrically actuated waste pump; valve means for selectively coupling said test cell to said waste system; and electrical logic control circuitry for energizing said waste pump.

15. The apparatus as defined in claim 1 wherein said measuring means comprise an electro-optical system for producing an analog signal representative of the amount of said selected constituent in said fluid.

16. Apparatus for the analysis of a selected fluid as defined in claim 1 further comprising a reference cell coupled to said source of reagent and to said test cell and said measuring means being associated with said reference cell for monitoring the condition of said reagent.

17. Apparatus as defined in claim 1 wherein said feed means includes a piston member extending into said test cell and further includes electrically actuated drive means for moving said piston member reciprocally with respect to said test cell.

18. Apparatus as defined in claim 1 and further comprising temperature sensing means coupled to said test cell and temperature control means responsive to said sensing means for providing temperature control of said test cell to assure availability of requisite energy for chemical reaction and end product stability.

19. Apparatus as defined in claim 1 wherein said feed means includes pumping means and said logic control circuitry after said introduction but before measurement selectively actuates said pumping means through a predetermined number of pumping cycles to drive the fluid and reagent in said test cell periodically into said mixing chamber and to pump said fluid and said reagent back out of said mixing chamber into said test cell.

20. Apparatus as defined in claim 19 wherein said mixing chamber includes a resilient diaphragm, said diaphragm acting to mix said reagent and said fluid as the same are periodically driven into and withdrawn from said mixing chamber by said pumping means.

21. An apparatus as defined in claim 1 wherein said fluid is urine containing urea and wherein said source of reagent is a compartment in said apparatus containing a diacetyl derivative capable of releasing the diacetyl moiety into said urine for combination with the urea therein and wherein said apparatus includes means for introducing an excess of reagent into said test cell with said fluid.

22. An apparatus as defined in claim 21 wherein said measuring means comprise electro-optical means including a source of ultraviolet light having a wave length of from 350 to 400 millimicrons and a detector for detecting the 525 millimicron excitation peak of the reaction product of the urea in said fluid with the diacetyl moiety of said reagent.

23. An apparatus as defined in claim 1 wherein said fluid contains creatine and creatinine and wherein said source of reagent is a compartment in said apparatus containing a premixture of picric acid, an alkali metal hydroxide and a stabilizer.

24. An apparatus as defined in claim 23 further comprising a source of acid, said feed means being coupled to said source of fluid and said source of acid before being coupled to said source of reagent to form a mixture of fluid and acid in said test cell prior to the addition of reagent thereto.

25. An apparatus as defined in claim 24 further comprising means to heat said fluid and acid mixture to a sufficient temperature for a sufficient time to convert all of the creatine therein to creatinine.

26. Apparatus as defined in claim 1 further comprising a plurality of refillable compartments respectively containing reagents, fluid to be analyzed, calibrate solutions, and rinse solutions and wherein said electrically controlled means comprises valve means for selectively coupling said feed means to said refillable compartments.

27. Apparatus as defined in claim 26 wherein said valve means connect said feed means to said compartments and to a waste receptable in the following sequence:
  (a) Rinse
  (b) Calibrate
  (c) Reagent
  (d) Waste
  (e) Rinse
  (f) Fluid to be analyzed
  (g) Reagent
  (h) Rinse.

28. Apparatus as defined in claim 26 wherein said fluid is being analyzed for creatine and said compartments include rinse, calibrate, acid, reagent and fluid and wherein said valve means is controlled to connect said feed means to said compartments and to a waste receptacle in the following sequence: calibrate, acid, rinse, reagent, waste, rinse, fluid, acid, rinse, reagent and rinse.

29. Apparatus as defined in claim 26 wherein said fluid is being analyzed for calcium and said valve means is controlled to connect said feed means to said compartments in the following order: calibrate, reagent, rinse, fluid, reagent, and rinse.

30. Apparatus as defined in claim 29 wherein said valve means is controlled to connect said feed means to said compartments in the following order: calibrate solution or fluid, reagent, rinse solution.

31. Apparatus as defined in claim 30 including means for premixing said fluid with a solution for adjusting the pH of said fluid.

32. Apparatus for analyzing a fluid for a quantitative amount of a preselected constituent comprising:
  a source of fluid to be analyzed;
  chemical analyzers mounted within said apparatus for receiving said fluid and producing electrical signals proportional to the quantity of constituent being measured;
  logic and sequencer control circuitry mounted within said apparatus for operating said analyzers;
  means within said analyzers and operated by said circuitry for periodically calibrating said analyzers; and
  data handling means mounted within said apparatus for receiving said electrical signals from said analyzers and for processing said signals in a predetermined manner.

33. A compact, portable microchemical analyzer apparatus for the analysis of a fluid for a selected constituent comprising:
  accumulator means for collecting fluid from a fluid source;
  means for indicating the amount of fluid in said accumulator;

logic and sequencer control circuitry for automatically removing fluid from said accumulator at predetermined time intervals; and chemical analyzer means mounted within said apparatus for receiving said fluid and producing electrical signals proportional to the quantity of constituent being measured.

34. The apparatus of claim 33 wherein said accumulator receives said fluid in predetermined amounts and wherein said fluid amount indicating means comprises:
counting means for counting the number of times a predetermined amount of fluid is received by said accumulator; and
decoding means for generating an adequate amount of fluid present signal when said counting means assumes a predetermined count configuration.

35. The apparatus of claim 33 wherein said logic and sequencer control circuitry comprises:
counting means for assuming progressive configurations at predetermined time intervals;
decoding means operatively connected to said counting means for generating test time signals at predetermined configurations of said counting means; and
means responsive to said fluid amount indicating means and said test time signals for generating analyzer test signals to selected analyzers at said test times if said adequate amount of fluid present signal has been generated.

36. The apparatus of claim 35 wherein said fluid amount indicator means generates analyzer calibrate signals to selected analyzers at said test times if said adequate amount of fluid present signal has not been generated.

37. The apparatus of claim 36 wherein said test indicator means comprises:
first binary means having a first and a second state responsive to said test time signals for assuming said first state for particular test time signals and assuming said second state for the remaining test time signals;
timed output gate responsive to said adequate amount of fluid present signal and said test time signals for generating an output a predetermined amount of time after a test time signal is generated if said adequate amount of fluid present signal has been generated; and
second binary means having a first and a second state responsive to said test time signals and to said timed output gate for assuming said first state when said test time signals are generated and assuming said second state when said timed output gate generates an output, said first state representing said analyzer test signal and said second state representing said analyzer calibrate signal.

38. An apparatus as defined in claim 33 further comprising:
a source of reagent connected to said analyzer means for mixing with said fluid to be analyzed;
electrically actuated transfer means for transferring fluid from said accumulator to said analyzer;
a source of calibrate solution connected to said analyzer and said transfer means;
means for sensing the amount of fluid in said accumulator;
and wherein said logic and control circuitry includes means for actuating said transfer means to transfer fluid from said accumulator to said analyzer at predetermined time intervals if said sensing means indicate that a predetermined level of fluid has been collected in said accumulator at that time interval; and
means for actuating said transfer means to transfer said calibrate solution to said analyzer when the fluid in said accumulator is below a predetermined amount at said time interval.

39. An apparatus as defined in claim 38 wherein said transfer means is actuated to transfer fluid from said accumulator to said analyzer at certain ones of said predetermined time intervals and said transfer means is actuated to transfer calibrate solution to said analyzer at other ones of said predetermined time intervals.

40. An electronic apparatus for controlling the analysis of a test fluid contained in an accumulator chamber by a fluid analyzer comprising:
fluid indicating means connected to said accumulator chamber for generating a signal when a predetermined amount of said test fluid is present within said accumulator chamber;
counting means advancing from one count configuration to another at predetermined time intervals;
decoding means connected to said counting means for generating test time signals for particular configurations of said counting means;
binary means having a first and a second state, said binary means being set to said first state at each test time by said decoding means;
time delay means generating an output a predetermined period of time following each said test time if said fluid indicating means indicates that a predetermined amount of test fluid is contained in said accumulator chamber, said output from said time delay means setting said binary means to said second state, said second state of said binary means representing a command to said fluid analyzer to analyze said test fluid contained in said accumulator chamber;
fluid delivery means operatively connected to said time delay means for delivering a predetermined amount of said test fluid to said fluid analyzer when said time delay means indicates a predetermined period of time has elapsed since said decoding means generated a test time signal;
start command generating means responsive to said fluid delivery means generating a start command to said analyzer initiating the test fluid analysis by said analyzer;
inhibiting means connected to said start command generating means for inhibiting subsequent start commands to said analyzer while said analyzer is analyzing said test fluid;
second fluid indicating means operatively connected to said accumulator chamber generating a signal when said accumulator chamber is not empty, said not empty signal actuating said fluid delivery means for causing said test fluid in said accumulator chamber to be delivered to said analyzer, said second fluid indicating means generating an accumulator chamber empty signal when all said test fluid has been removed; and
second fluid analysis start command generating means responsive to said accumulator empty signal generated by said second fluid indicating means for initiating a second fluid analysis by said fluid analyzer.

41. The apparatus of claim 40 wherein said fluid analyzer will perform an analysis of a test fluid contained in an accumulator chamber or upon a calibration fluid contained in a calibration fluid source, said test fluid analysis being performed by said fluid analyzer upon receipt of said start command from said start command generating means when said binary means is in said second state and said fluid analyzer performing a calibration analysis on said calibration fluid when said binary means is in said first state.

42. Apparatus for the analysis of a selected fluid comprising:
a source of fluid to be analyzed;
a source of reagent to be mixed with said fluid;
a reference cell coupled to said source of reagent;
a test cell;
pumping means;
valve means for connecting said pumping means to said source of fluid and said reference cell for introducing said fluid and reagent into said test cell in predetermined proportions to form a mixture of fluid and reagent therein;

electrical logic control circuitry means for sequentially operating said valve means for alternately connecting said pumping means to said fluid source and to said reference cell; and means operatively associated with said test cell and reference cell for quantitatively measuring a characteristic of the fluid and reagent mixture.

43. Apparatus as defined in claim 42 wherein said control circuitry controls said pumping means to cause said fluid and said reagent to be metered into said test cell in a predetermined proportion.

44. Apparatus as defined in claim 42 wherein said electrical logic control circuitry includes means for receiving an electrical signal, gate means for decoding said electrical signal and activating said valve means to make said selective coupling, and means on said valve means for inactivating said valve means when said selective coupling has been made.

45. Apparatus for analyzing a fluid for a selected constituent comprising:
   a source of fluid to be analyzed;
   a source of calibrate solution;
   a source of rinse solution;
   a source of reagent;
   a rotatable selector valve adapted to be connected alternately to said source of fluid, said calibrate solution and said rinse solution;
   a test chamber;
   a rotatable control valve for selectively connecting the entrance of said test chamber to said selector valve, said source of reagent and a waste receptacle;
   sequencing means for rotating said selector valve and said control valve through a series of positions for sequentially connecting said test chamber to said source of reagent, said waste receptacle, and through said selector valve, to said source of fluid, said calibrate solution and said rinse solution;
   pumping means for metering fluids therein when said control valve and said selector valve are sequenced to the proper position;
   means for transferring the respective fluids from their source to the entrance to said chamber to enable said pumping means to meter said fluids into said chamber; and
   means associated with said chamber for measuring the quantity of a selected constituent in a liquid-reagent mixture in said chamber.

46. Apparatus as defined in claim 45 wherein said control valve and said selector valve comprise ducted cylinders rotatably mounted in a solid analyzer block.

47. Apparatus as defined in claim 45 wherein said valve means connects said pumping means to said fluid, said reagent, said rinse solution and said calibrate solution in the following sequence:
   (a) Rinse
   (b) Calibrate
   (c) Reagent
   (d) Rinse
   (e) Fluid to be analyzed
   (f) Reagent
   (g) Rinse.

48. An apparatus for controlling a fluid analyzer which includes a fluid testing chamber and associated electro-optical means for testing said fluid for a particular constituent, a source of fluid to be analyzed, a source of reagent to be mixed with said fluid, and at least two valve means for selectively coupling said fluid source and said reagent source to said test chamber comprising:
   counting means for sequentially advancing from one configuration to another;
   decoding means for decoding said counting means;
   valve driving means responsive to said decoding means for positioning said valve means to particular valve positions in response to particular configurations of said counting means;
   valve position decoding means for generating outputs corresponding to the particular valve position;
   pumping means operatively connected to said valve decoding means for pumping said fluid and said reagent through said valves to said test chamber for particular valve positions;
   metering means operatively connected to said valve decoding means for metering predetermined amounts of said fluid to be analyzed and said reagent into said test chamber for particular valve positions;
   mixing means operatively connected to said valve decoding means for mixing the contents of said test chamber for particular valve positions; and,
   heating means operatively connected to said valve decoding means for heating the contents of said test chamber for particular valve positions.

49. The apparatus of claim 48 further including comparator means sensitive to said electro-optical analyzer means for re-initiating said counting means to a particular configuration so that subsequent configurations assumed by said counting means will result in said valves being positioned, said metering means being actuated to reduce the amount of fluid in said test chamber to a predetermined volume, and said pumping means actuated to introduce reagents into said test chamber to further dilute said fluid.

50. The apparatus of claim 49 further including a data handling means operatively connected to said valve position decoding means for converting an analog signal output from said electro-optical analyzing means representing a particular constituent in said fluid to a digital representation of the magnitude of said analog signal.

References Cited

UNITED STATES PATENTS

| | | | |
|---|---|---|---|
| 2,396,934 | 3/1946 | Wallace | 23—253X |
| 3,019,091 | 1/1962 | Schneider, Jr. | 23—253 |
| 3,043,303 | 7/1962 | Still | 128—214 |
| 3,097,927 | 7/1963 | Skeggs | 23—253X |
| 3,098,717 | 7/1963 | Ferrari, Jr. | 23—253X |
| 3,186,799 | 6/1965 | Hach | 23—253 |
| 3,186,800 | 6/1965 | Strickler | 23—253 |
| 3,241,432 | 3/1966 | Skeggs et al. | 23—253X |
| 3,427,135 | 2/1969 | Pelavin et al. | 23—253 |

JOSEPH SCOVRONEK, Primary Examiner

U.S. Cl. X.R.

23—230; 128—2; 137—551; 252—408; 340—347; 417—415